(12) United States Patent
Yamamoto et al.

(10) Patent No.: US 7,092,594 B2
(45) Date of Patent: Aug. 15, 2006

(54) WAVELENGTH SELECTOR SWITCH

(75) Inventors: Tsuyoshi Yamamoto, Kawasaki (JP); Shinji Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 142 days.

(21) Appl. No.: 10/811,978

(22) Filed: Mar. 30, 2004

(65) Prior Publication Data

US 2004/0190822 A1    Sep. 30, 2004

(30) Foreign Application Priority Data

Mar. 31, 2003  (JP)  ............................. 2003-097402
Aug. 26, 2003  (JP)  ............................. 2003-301725

(51) Int. Cl.
*G02B 6/28* (2006.01)

(52) U.S. Cl. ............................. 385/24; 385/11; 385/16; 385/37

(58) Field of Classification Search .................. 385/11, 385/16, 24, 37
See application file for complete search history.

(56) References Cited

U.S. PATENT DOCUMENTS

| | | | | |
|---|---|---|---|---|
| 5,414,540 | A * | 5/1995 | Patel et al. | 385/37 |
| 6,097,518 | A * | 8/2000 | Wu et al. | 398/1 |
| 6,535,311 | B1 * | 3/2003 | Lindquist | 359/495 |
| 6,901,175 | B1 * | 5/2005 | Baxter et al. | 385/11 |
| 2002/0024704 | A1 | 2/2002 | Erdogan et al. | |
| 2003/0072512 | A1 * | 4/2003 | Nagaeda et al. | 385/11 |
| 2003/0091261 | A1 * | 5/2003 | Wu et al. | 385/11 |
| 2003/0223670 | A1 * | 12/2003 | Nikolov et al. | 385/11 |
| 2005/0036202 | A1 * | 2/2005 | Cohen et al. | 385/16 |

FOREIGN PATENT DOCUMENTS

JP    2001-337299    12/2001

OTHER PUBLICATIONS

Sato, Kenichi, et al., "Envisaged IP Over Photonic Networks of the Year 2010 (2) Cutting-Edge Technologies on Photonic Backone Networks", The Journal of the Institute of Electronics, Information and Communication Engineers, vol. 85, No. 2, pp. 94-103.
Fujita, Hiroyuki, et al., "Micro Mechnical Optical Devices", The Journal of Society for Applied Physics, 2000, vol. 69, No. 11, pp. 1274-1284.

* cited by examiner

*Primary Examiner*—Frank G. Font
*Assistant Examiner*—James P. Hughes
(74) *Attorney, Agent, or Firm*—Staas & Halsey LLP

(57) ABSTRACT

A wavelength selector switch includes first and second refracting plates, an optical splitter, first and second optical systems, an optical coupler polarization controller, and second refracting plate. The first refracting plate refracts the second wavelength-multiplexed light beam. The optical splitter spatially splits into a plurality of wavelength components light beams. The first optical system changes the wavelength components into parallel light beams. The polarization controller selectively changes a polarization angle of each of the parallel light beams. The second optical system condenses the parallel light beams. The optical coupler multiplexes into a third wavelength-multiplexed light beam the parallel light beams condensed. The second refracting plate directs wavelength components of the third wavelength-multiplexed light beam to the first and second optical output ports depending on their polarization angles.

6 Claims, 26 Drawing Sheets

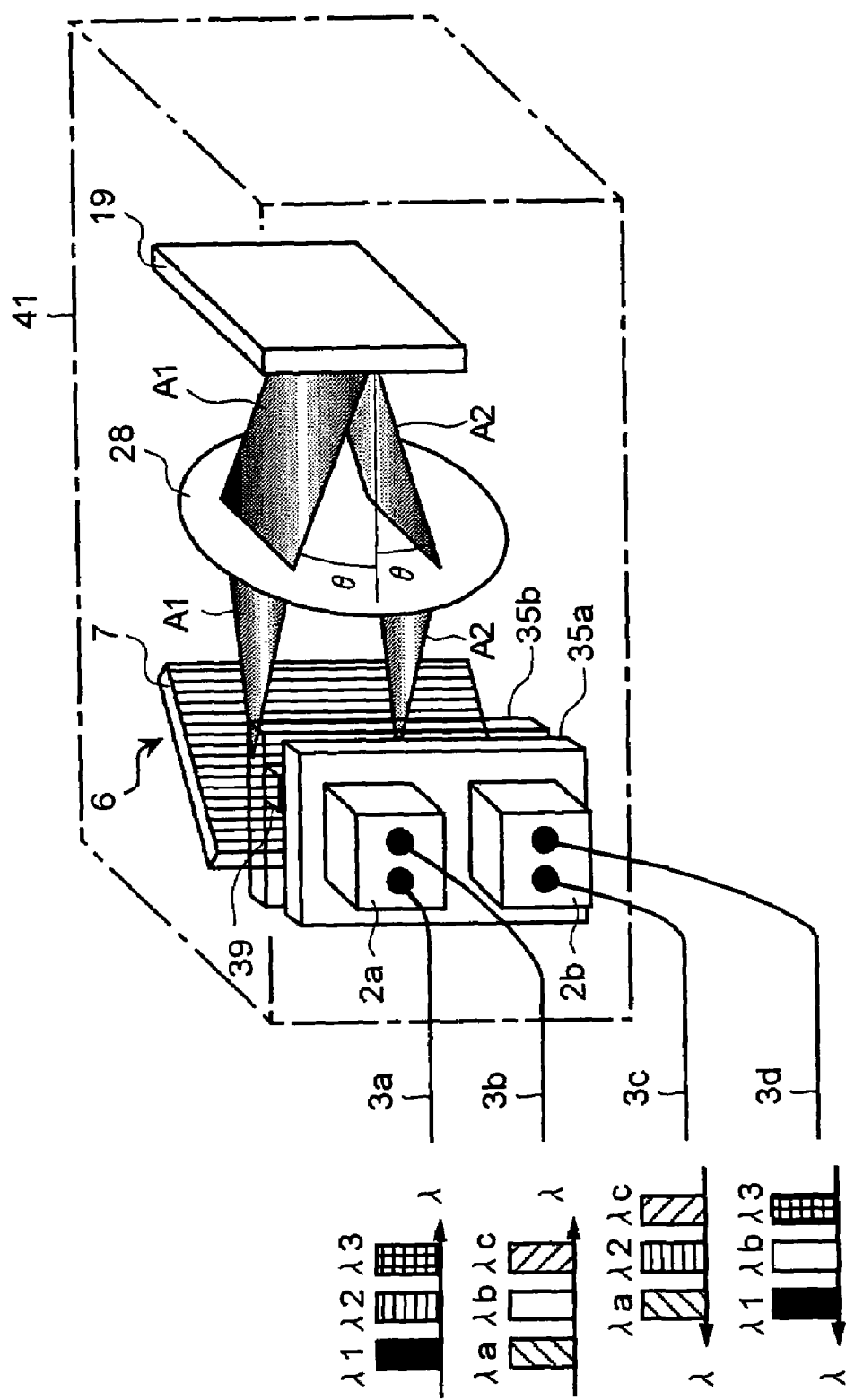

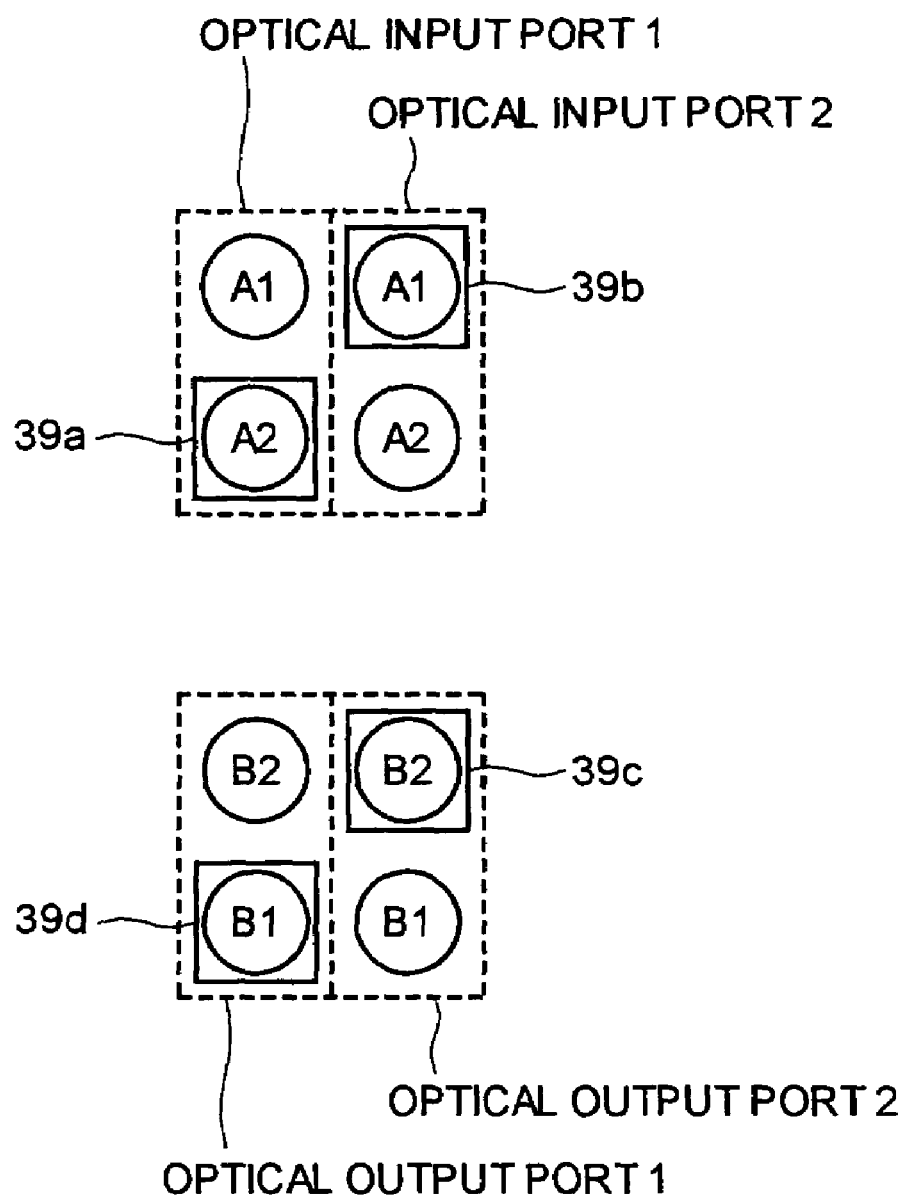

WAVELENGTH SELECTOR SWITCH

CROSS-REFERENCE TO RELATED APPLICATIONS

This application is based upon and claims the benefit of priorities from the prior Japanese Patent Application No. 2003-097402, filed on Mar. 31, 2003, and Japanese Patent Application No. 2003-301725, filed on Aug. 26, 2003, the entire contents of which are incorporated herein by reference.

BACKGROUND OF THE INVENTION

1) Field of the Invention

The present invention relates to a wavelength selector switch that selects wavelength-multiplexed light according to wavelengths and outputs the selected light to a desired port. The present invention, particularly, relates to the wavelength selector switch which allows all-optical cross-connect.

2) Description of the Related Art

Optical networks, which use wavelength-division multiplexing (WDM) communication, have been progressing rapidly to allow increasing traffic due to spread of the Internet and to make use of the existing optical fiber networks. The WDM communication, which is applied to a point-to-point network at present, has been researched for application to a ring network and a mesh network. Such a network allows optical processing in its network node with an optical add/drop multiplexer (OADM), which divides and combines light of desired wavelength, and an optical cross connect (OXC), which does not need opto-electric conversion. This optical processing can lead to control (e.g. setting and cancellation) of a dynamic path based on wavelength information. Progress of a photonic network technology which uses such optical technology fully is disclosed in, for example, U.S. Pat. No. 6,204,946.

The OADM or OXC includes a wavelength selector switch. FIG. 34 is a schematic diagram of the wavelength selector switch. As shown in FIG. 34, optical transmission paths of two system, i.e. a first optical transmission path 111a is operated as a main line of an optical fiber transmission linear path and a second optical transmission path 111b is operated as a branched line.

A wavelength selector switch 110 is disposed between the first optical transmission path 111a and the second optical transmission path 111b such that the wavelength selector switch 110 connects nodes of the first optical transmission 111a and the second optical transmission path 111b. The wavelength selector switch 110 includes two optical input ports In and Add and two optical output ports Pass and Drop. Concretely, the ports are named as an input port In, a combining port Add, a passing optical output port Pass, and a dividing optical output port Drop respectively.

Light that is input via the optical input ports In and Add, is a WDM signal that includes a plurality of wavelength components. The typical wavelength space is 100 GHz (0.8 nm) and a number of wavelengths is from a few wavelengths to a few tens of wavelengths (for example 32 wavelengths; in this case, for $\lambda n$, n=32). A circulator 112a is combined with (inserted into) the node of the first optical transmission path 111a and a circulator 112b is combined with (inserted into) the node of the second optical transmission path 111b. The circulators 112a and 112b have a function of outputting light that is input to an optical input port C1 from an optical input-output port C2 and a function of outputting light that is input to the optical input-output port C2 from an optical output port C3 respectively.

An optical switch module 114 is disposed between optical input-output ports C2 of the circulators 112a and 112b. The optical switch module 114 includes optical systems 117, a diffraction grating 118, and a micro mirror array 121 formed by micro electromechanical systems (MEMS). The optical systems 117 (not shown in detail in the diagram) includes lenses like a collimating lens and a collective lens (Refer to U.S. Pat. No. 6,204,946).

According to such structure, light that is output from the optical input-output port C2 of the circulator 112a is incident on a grating surface of the diffraction grating 118 via the optical system 117. The diffraction grating 118 is an element that imparts a different diffraction angle to a different wavelength component that is incident at a predetermined angle. Therefore, a WDM signal that is reflected from the diffraction grating 118 is separated spatially for every component of wavelength $\lambda$ and is collected on the micro mirror array 121.

By controlling a micro mirror 122 for different wavelengths that are provided in the micro mirror array 121, the light of wavelengths from $\lambda 1$ to $\lambda n$ that is collected on the micro mirror array 121 is either reflected through the same optical path as that of the incident light or is reflected through a different optical path.

The micro mirror array 121 is a mirror that is manufactured by using a micro machine technology. The micro machine technology is disclosed in pages 94 to 103 of February 2002 issue of a Journal of IEICE (The Institute of Electronics, Information & Communication engineers) and "Micro mechanical optical device" on pages 1274 to 1284 of no. 11, 69th volume of JAPANESE JOURNAL OF APPLIED PHYSICS (published by The Japan Society of Applied Physics). The micro mirror 122 as shown in the diagram is an arrangement of a plurality of micro mirrors 122a to 122n that are arranged at a distance of tens of $\mu$m from each other. The number of micro mirrors 122n is same as the number n in which wavelengths $\lambda$ is split (separated) and one micro mirror corresponds to one wavelength component. Light of wavelengths from $\lambda 1$ to $\lambda n$ that is separated by the diffraction grating 118 is incident on the micro mirror 122 (122a to 122n) in a position corresponding to that particular wavelength.

FIG. 35 is a side view of a micro mirror arrangement that is provided in the micro mirror array. FIG. 36 is an illustration of an operation of the micro mirror. The micro mirror 122 includes a substrate 123, a support 124 that protrudes from the substrate 123, and a reflector 125 that is supported at a center by the support 124. Surface 125a of the reflector 125 is a total reflecting surface from which light A and B are reflected totally. The substrate 123 includes a pair of electrodes 126a and 126b in the form of a flat plate facing the reflector 125 with the support 124 sandwiched between the electrodes 126a, 126b and the reflector 125. An electrode 127 in the form of a flat plate is provided an overall rear surface of the reflector 125 facing the electrodes 126a and 126b.

When voltage is applied to the electrode 126a, static electricity is generated between the electrodes 126a and 127 that are facing each other. Due to the static electricity, the electrode 127 is attracted towards the electrode 126a and the reflector 125 is inclined to one side with the support 124 as a center, as shown in FIG. 35.

With the electrode 127 attracted towards the electrode 126a, light incident on the reflector 125 is allowed to be reflected in a direction same as that of the light beam A. Concretely, the surface 125a of the reflector 125 is adjusted such that the surface 125a is orthogonal (at right angles) to direction of light A that is incident. Due to this, the light that is input from the optical input port In can be returned in the same optical path and can be output from the optical output port Pass.

On the other, when voltage is applied to the electrode 126b, static electricity is generated between the electrodes 126b and 127 that are facing each other. Due to the static electricity, the electrode 127 is attracted towards the electrode 126b and the reflector 125 is inclined to one side with the support 124 as the center as shown in FIG. 18.

With the electrode 127 attracted towards the electrode 126b, light beams A and B that are incident on the reflector 125 are reflected to follow different optical paths. Concretely, the reflector 125 is adjusted such that the angle of the surface of the reflector 125 is at predetermined angles (θ) with the light beams A and B that are incident. This enables to output the light beam A that is input from the optical input port In from the optical output port Drop by switching to an optical path of the other light beam B. Similarly, the light beam B that is input from the optical input port Add can be output from the optical output port Pass by switching to an optical path of the other light beam A.

Thus, the light input to the optical input ports In and Add can be selected according to wavelengths λ1 to λn and can be output from the optical output ports Pass and Drop upon switching. For example, as shown in FIG. 34, let the light from the (optical input port) In of the first optical transmission path 111a has wavelengths λ1, λ2, and λ3 and the light from the (optical input port) Add of the second optical transmission path 111b has wavelengths λa, λb, and λc (where wavelengths λ1 =λa, λ2=λb, and λ3=λc). A certain wavelength can be selected and be made to switch to a different optical path by changing the angle of the micro mirror 122. Thus, the wavelengths λa, λ2, and λc can be output from the optical output port Pass of the first optical transmission path and the wavelengths λ1, λb, and λ3 can be output from the optical output port Drop of the second optical transmission path.

Thus, by using the micro mirror array 121, the direction of reflection of the light beams A and B of wavelengths λ1 to λn that are incident on the micro mirror array 121 can be switched for each frequency component. Thus, it is possible to use the second optical transmission path (branched line) as a back-up circuit of the first optical transmission path (main line) and to perform operations like transmitting by switching a specific wavelength λ only, for which the transmission was hindered in one of the optical transmission paths, to the other optical transmission path.

However, in the wavelength selector switch 110 that employs the micro mirror array, the all-optical cross-connect could not be achieved. The micro mirror 122 that is used in the micro mirror array 121 can switch the light from the second optical input ports In and Add and the second optical output ports Pass and Drop mutually when the angle is changed as shown in FIG. 36. Whereas, in a situation that is illustrated in FIG. 35, light incident from one of the optical input ports In of the first optical transmission path cannot be returned to the optical output port Pass.

In other words, in a situation that is illustrated in FIG. 35, it is not possible to switch an overall optical path of the other optical input port Add of the second optical transmission path 111b. In this situation, even if the light is incident from the optical input port Add, the micro mirror 122 is inclined at an angle such that the incident light cannot be reflected to any of the ports. Thus, the conventional wavelength selector switch 110, due to the arrangement in the micro mirror array 121 has not been able to achieve the all-optical cross-connect in which the light from the two optical input ports is always switched to any of the two optical output ports. An all-optical cross-connect at present implies a possibility of switching the light to a desired port for each wavelength by using a structure of 2×2 ports (i.e. two input ports and two output ports).

The voltage is to be applied continuously to either the electrode 126a or the electrode 126b to maintain the status in which the angle of the micro mirror 122 in the micro mirror array 121 is changed. If the voltage is stopped, the switching of the optical path that is maintained cannot be continued. Apart from this, an optical axis of the light incident on and output from the micro mirror 122 from the plurality of micro mirrors in the micro mirror 122 has to be adjusted which is a tedious job. Moreover, the components in the arrangement being the micro members, the component cost goes high and the durability of the structure that changes the angle of the micro mirrors 122 becomes an issue.

SUMMARY OF THE INVENTION

It is an object of the present invention to at least solve the problems in the conventional technology.

A wavelength selector switch according to one aspect of the present invention includes a first optical input port to which a first wavelength-multiplexed light beam with a first polarization angle is input; a second optical input port to which a second wavelength-multiplexed light beam with a second polarization angle is input; a first optical output port; and a second optical output port. The wavelength selector switch also includes a first refracting plate, a first optical system, a polarization controller, a second optical system, an optical coupler, and a second refracting plate. The first refracting plate refracts the second wavelength-multiplexed light beam at a refraction angle; an optical splitter that spatially splits into a plurality of wavelength components the first wavelength-multiplexed light beam and the second wavelength-multiplexed light beam refracted, respectively. The first optical system changes the wavelength components into parallel light beams. The polarization controller selectively changes a polarization angle of each of the parallel light beams between the first and second polarization angles, and passes the parallel light beams. The second optical system condenses the parallel light beams which are passed through the polarization controller. The optical coupler multiplexes into a third wavelength-multiplexed light beam the parallel light beams condensed. The second refracting plate refracts wavelength components, of the third wavelength-multiplexed light beam, having the second polarization angle at a refraction angle to direct the wavelength components having the second polarization angle to the second optical output port and to direct wavelength components, of the third wavelength-multiplexed light beam, having the first polarization angle to the first optical output port.

A wavelength selector switch according to another aspect of the present invention includes a first optical input/output port to which a first wavelength-multiplexed light beam with a first polarization angle is input; and a second optical input/output port to which a second wavelength-multiplexed light beam with a second polarization angle is input. The wavelength selector switch also includes a refracting plate that refracts the second wavelength-multiplexed light beam at a refraction angle; an optical splitter/coupler that spatially splits into a plurality of wavelength components the first wavelength-multiplexed light beam and the second wavelength-multiplexed light beam refracted, respectively; an optical system that changes the wavelength components into parallel light beams; and a polarization controller that selectively changes a polarization angle of each of the parallel light beams between the first and second polarization angles, and reflects the parallel light beams. The optical system condenses on the optical splitter/coupler the parallel light beams reflected. The optical splitter/coupler multiplexes into a third wavelength-multiplexed light beam the parallel light beams condensed. The refracting plate refracts wavelength components, of the third wavelength-multiplexed light beam, having the second polarization angle at a refraction angle to direct the wavelength components having the second polarization angle to the second optical input/output port and to direct wavelength components, of the third wavelength-multiplexed light beam, having the first polarization angle to the first optical input/output port.

A wavelength selector switch according to still another aspect of the present invention includes a first optical input port to which a first wavelength-multiplexed light beam with a first polarization angle is input; a second optical input port to which a second wavelength-multiplexed light beam with a second polarization angle is input; a first optical output port; and a second optical output port. The wavelength selector switch also includes a refracting plate that refracts the second wavelength-multiplexed light beam at a refraction angle; an optical splitter/coupler that spatially splits into a plurality of wavelength components the first wavelength-multiplexed light beam and the second wavelength-multiplexed light beam refracted, respectively; an optical system that changes the wavelength components into parallel light beams; and a polarization controller that selectively changes a polarization angle of each of the parallel light beams between the first and second polarization angles, and reflects the parallel light beams. The optical system condenses on the optical splitter/coupler the parallel light beams reflected. The optical splitter/coupler multiplexes into a third wavelength-multiplexed light beam the parallel light beams condensed. The refracting plate refracts wavelength components, of the third wavelength-multiplexed light beam, having the second polarization angle at a refraction angle to direct the wavelength components having the second polarization angle to the second optical output port and to direct wavelength components, of the third wavelength-multiplexed light beam, having the first polarization angle to the first optical output port.

A wavelength selector switch according to still another aspect of the present invention includes a first optical input/output port to which a first wavelength-multiplexed light beam is input; and a second optical input/output port to which a second wavelength-multiplexed light beam is input. The wavelength selector switch also includes a first refracting plate, a wavelength plate, a second refracting plate, an optical splitter/coupler, an optical system, and a polarization controller. The first refracting plate guides the first wavelength-multiplexed light beam having a first polarization angle to a first optical path, guides the first wavelength-multiplexed light beam having a second polarization angle to a second optical path by refracting the first wavelength-multiplexed light beam at a first refraction angle, passes the second wavelength-multiplexed light beam having the first polarization angle, and refracts the second wavelength-multiplexed light beam having the second polarization angle at the first refraction angle. The wavelength plate changes into the first polarization angle a polarization angle of the first wavelength-multiplexed light beam refracted, and changes into the second polarization angle a polarization angle of the second wavelength-multiplexed light beam not refracted. The second refracting plate refracts the second wavelength-multiplexed light beam changed by the wavelength plate at a second refraction angle to guide the second wavelength-multiplexed light beam to the first optical path, and refracts the second wavelength-multiplexed light beam not changed by the wavelength plate at the second refraction angle to guide the second wavelength-multiplexed light beam to the second optical path. The optical splitter/coupler spatially splits the light beams propagating on the first and second optical paths into a plurality of wavelength components. The optical system changes the wavelength components into parallel light beams. The polarization controller controls selectively changes a polarization angle of each of the parallel light beams between the first and second polarization angles, and reflects the parallel light beams controlled. The optical system also condenses on the optical splitter/coupler the parallel light beams reflected. The optical splitter/coupler also multiplexes into a third wavelength-multiplexed light beam the parallel light beams on the first optical path from the optical system, and multiplexes into a fourth wavelength-multiplexed light beam the parallel light beams on the second optical path from the optical system. The second refracting plate also refracts wavelength components of the third and fourth wavelength-multiplexed light beams which have the second polarization angle, at the second refraction angle. The wavelength plate also changes into the first polarization angle a polarization angle of the wavelength components of the third wavelength-multiplexed light beam refracted, and changes into the second polarization angle a polarization angle of the wavelength components of the fourth wavelength-multiplexed light beam not refracted. The first refracting plate also refracts the fourth wavelength-multiplexed light beam refracted by the second refracting plate, at the first refraction angle to guide the fourth wavelength-multiplexed light beam to the first input/output optical port, and refracts the third wavelength-multiplexed light beam refracted by the second refracting plate, at the first refraction angle to guide the third wavelength-multiplexed light beam to the second input/output optical port.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 13 is a perspective view of a structure of still another reflection-type wavelength selector switch according to a fifth embodiment of the present invention;

FIG. 14 is a front view of a position of a wavelength plate that is used in a wavelength selector switch according to a fifth embodiment of the present invention;

DETAILED DESCRIPTION

Exemplary embodiments of a wavelength selector switch according to the present invention are described in detail below with reference to the accompanying drawings. The wavelength selector switch according to the present invention does not employ a micro mirror array and realizes an all-optical cross-connect by switching an optical path by polarization control. Embodiments of the present invention are described below in detail. In the embodiments that are described below, a magneto-optic element is used as a polarization control device that forms the wavelength selector switch and a diffraction grating is used as a wavelength dispersing element.

Figure 1:
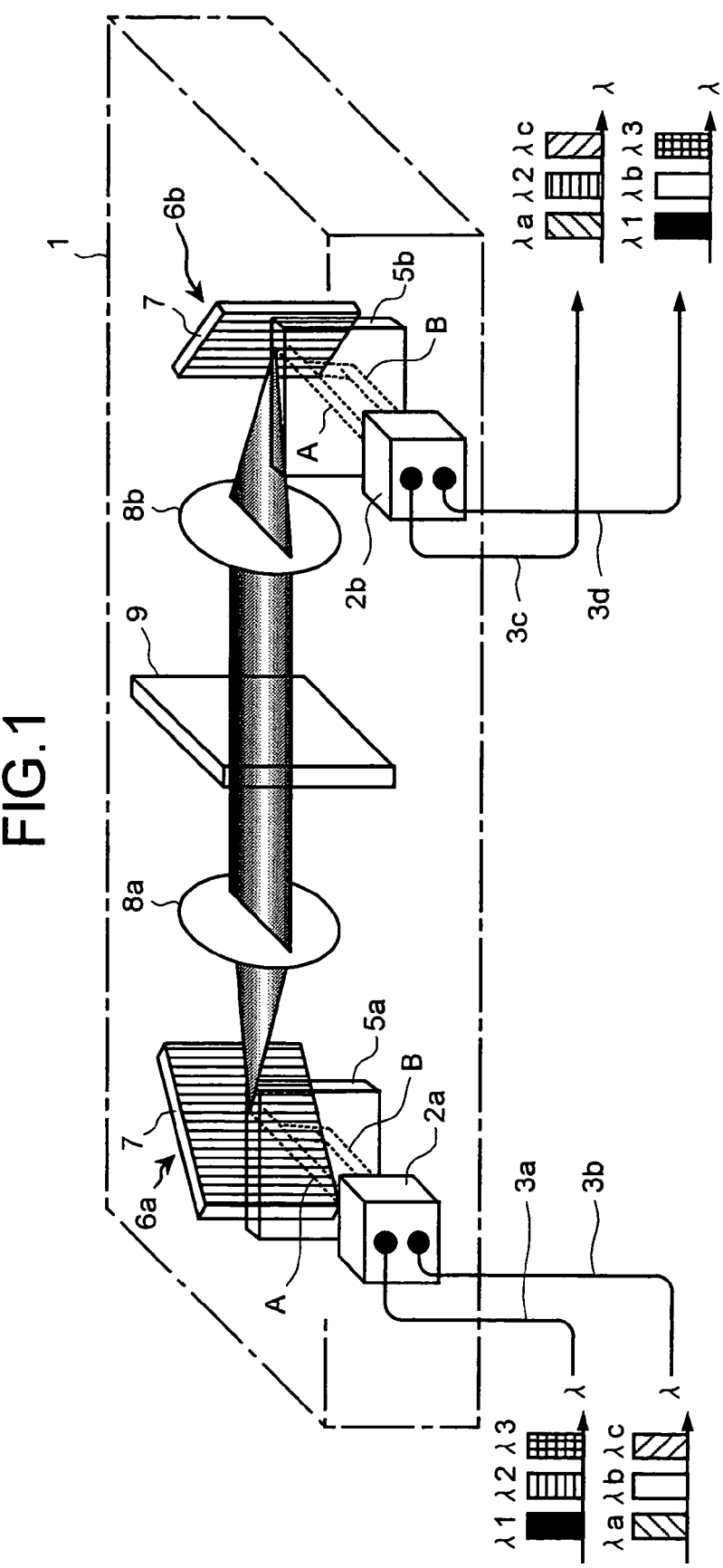
FIG. 1 is a perspective view of a structure of a transmission-type wavelength selector switch according to a first embodiment of the present invention.
Figure 2:
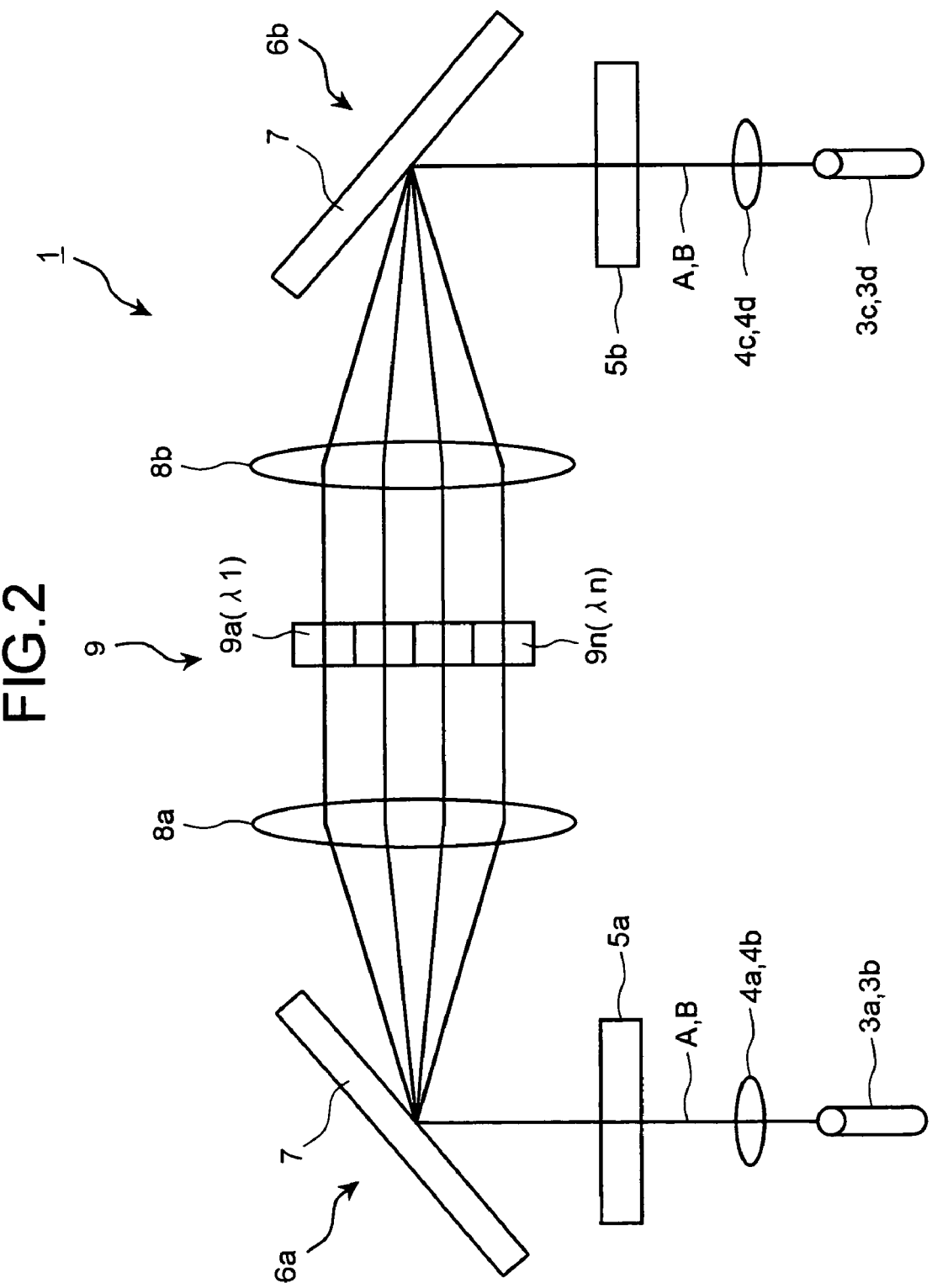
FIG. 2 is a top view of a wavelength selector switch according to the first embodiment of the present invention.
Figure 3:
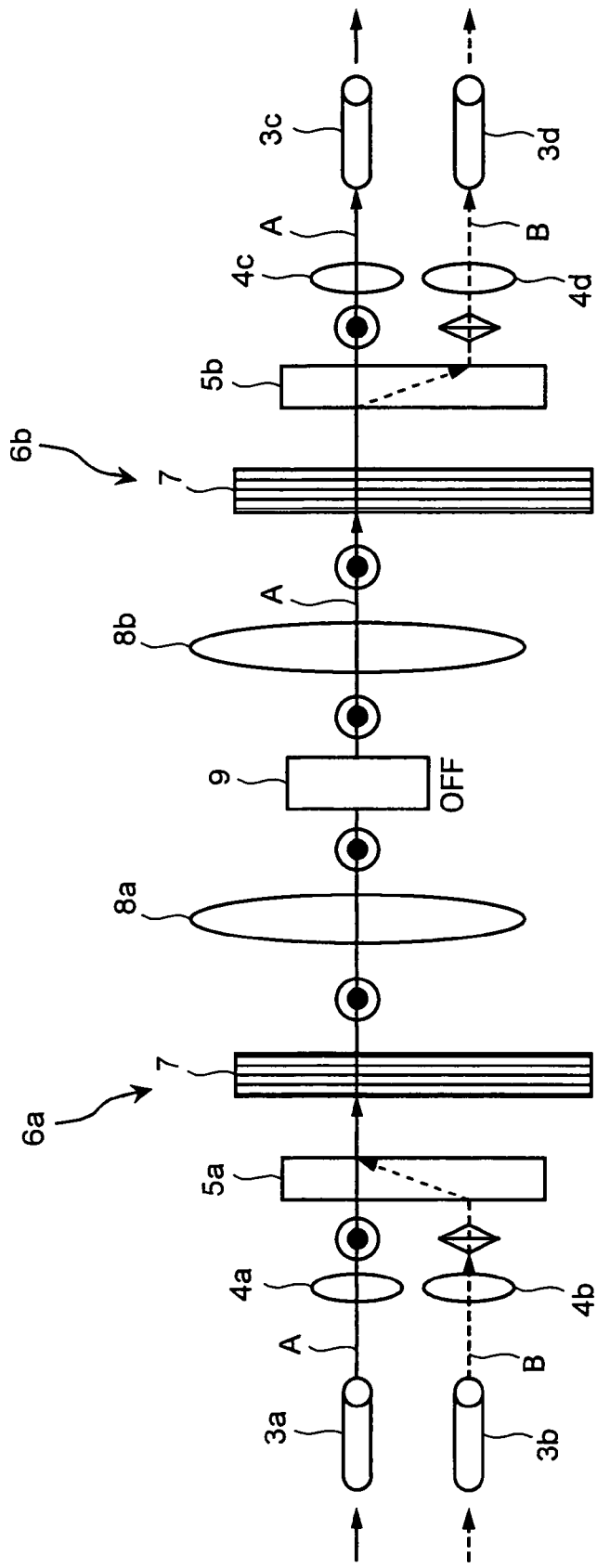
FIG. 3 is a side view of a wavelength selector switch according to the first embodiment of the present invention.

A first embodiment of the present invention is described below. FIG. 1 is a perspective view of a structure of a transmission-type wavelength selector switch according to the first embodiment of the present invention. FIG. 2 is a top view of the wavelength selector switch according to the first embodiment of the present invention and FIG. 3 is a side view of the wavelength selector switch according to the first embodiment of the present invention.

A wavelength selector switch 1 includes an optical fiber connector that is not shown in the diagram and a pair of fiber collimators 2a and 2b. The fiber collimators 2a and 2b have optical fibers 3 (3a to 3d) disposed in an upper and a lower positions and are fixed such that end surfaces of the optical fibers 3 are aligned side by side.

The fiber collimator 2a on an input side includes a first optical fiber 3a that is fixed in the upper position and a second optical fiber 3b that fixed in the lower position. The fiber collimator 2b on an output side includes a third optical fiber 3c in the upper position and a fourth optical fiber 3d in the lower position. The first and the third optical fibers 3a and 3c are a part of a first optical transmission path and the second and the fourth optical fibers 3b and 3d are a part of a second optical transmission path. A transmission-type wavelength selector switch 1 is disposed such that light passes through parts of these optical transmission paths.

Light that is input via the first and the second optical fibers 3a and 3b, which is the input side is a WDM signal that includes a plurality of wavelength components. A typical wavelength spacing is 100 GHz (0.8 nm) and a number of wavelengths is from a few wavelengths to a few tens of wavelengths (for example 32 wavelength; in this case for λ1 to λn, n=32).

Light beams A and B that are output from the end surfaces of the optical fibers 3a and 3b that are fixed in the upper position and the lower position of the fiber collimator 2a on the input side are changed into parallel light beams at a collimating lens 4 (4a and 4b: see FIG. 2) and are incident on a wavelength dispersing element 6a via a birefringent plate (doubly refracting plate) 5 (5a). The birefringent plate 5a varies an output position of a light beam that is transmitted along a polarization angle of the incident light.

The birefringent plate 5a is made of an anisotropic crystalline material like calcite and rutile and splits polarization components of light that is incident at an angle with respect to an optical axis (ordinary light is output straight whereas extraordinary light is output by a beam shift). For example, in a case of calcite, the light can be split at about 6 degrees inside the crystal. Therefore, by adjusting length of crystals in a direction of propagation to have a desired shift, the desired polarized separation can be performed. The polarization angles of the light beams A and B are different by 90 degrees. As shown in FIG. 3, the position of the birefringent plate 5a can be changed such that an optical path of light beam B is refracted through the same optical path of the light beam A.

A diffraction grating 7 shown in FIG. 1 can be used as the wavelength dispersing element 6a. By using the diffraction grating 7, components of light of wavelengths λ1 to λn that are included in the light beams A and B which are incident, can be output by splitting in different directions according to the wavelengths λ1 to λn. The components of light are split in directions contained in a horizontal sector. A VIPA can be used instead of the diffraction grating 7 as the wavelength dispersing element 6a. The VIPA is described below in brief.

Figure 4:
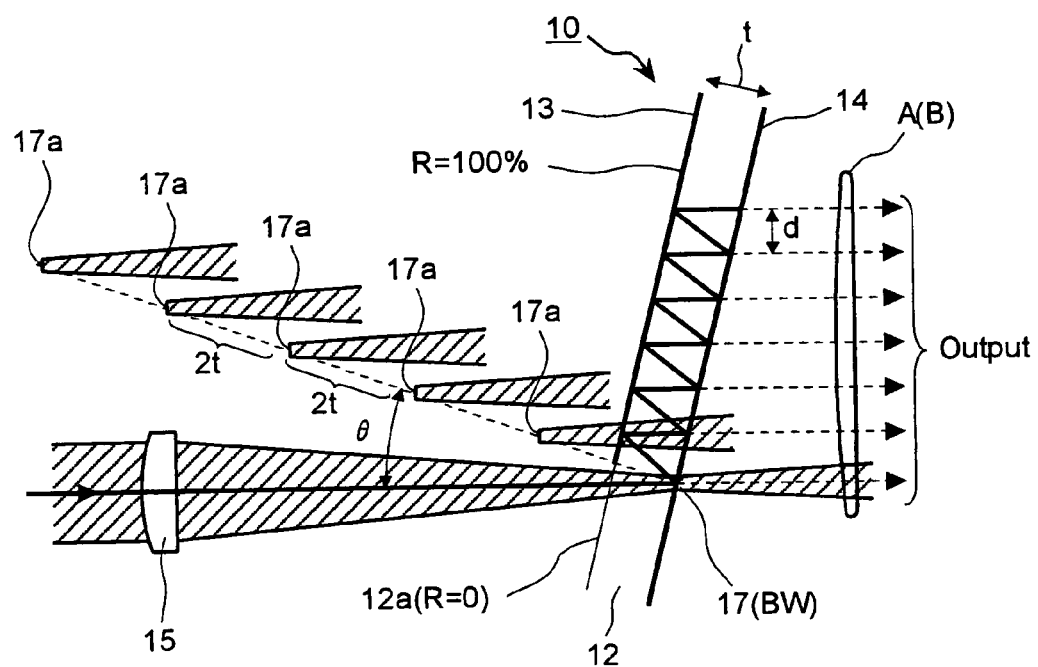
FIG. 4 is a cross-sectional view of a part of a side of a virtually imaged phase array (VIPA) that is used as a wavelength dispersing element.

FIG. 4 is a cross-sectional view of a part of a side of the VIPA that is used as the wavelength dispersing element. A VIPA 10 includes a plate 12 made of glass etc. as a base material. Light reflecting films 13 and 14 are provided on both surfaces of the plate 12. The light reflecting film 13 that has 100% reflectivity (R=100) can be provided on an upper half of a surface (front surface) where the light is incident. A lower half is an irradiation window 12a that has a reflectivity of about 0% (R=0). The light reflecting film 14 that has reflectivity not less than 95% but less than 100% is provided on a surface from where the light is output (reverse surface).

A cylindrical lens 15 is provided in a position away from the VIPA 10 in a direction of incidence of light. The cylindrical lens 15 directs the light as shown in FIG. 4 such that the light is narrowed vertically and allowed to be incident on the VIPA 10 (in the form of a slit). The VIPA 10 is inclined at angle θ with respect to the light incident and light is incident at a position below a lower end of the light reflecting film 13. The incident light is focused in a focal line 17. The focal line 17 in on a surface of the light reflecting film 14 on the plate 12. Width of a line of the focal line 17 of the light that is focused by the cylindrical lens 15 is called as a beam waist.

As shown in FIG. 4, the light reflecting film 14 reflects about 95% of the light that is incident and remaining 5% of the light passes through the light reflecting film 14 and is output to exterior. 95% of the light that is reflected undergoes total reflection at the light reflecting film 13 on the front surface and is again divided into the reflected light and transmitted light. The light that is totally reflected from the light reflecting film 13 on the front surface strikes the light reflecting film 14 on the reverse surface and is shifted through a distance d. Similarly, the light is divided into a multiple number of paths through a fixed distance d. The beam form of each path is such that the light is spread from a virtual image 17a of the beam waist. The virtual image 17a is positioned at a fixed distance 2t along a straight line that is a normal with respect to the plate 12. In this case, t is a thickness of the plate 12. The position of the beam waist in the virtual image 17a being self aligned, there is no need to adjust the position. Further, the light spread from the virtual image 17a interferes mutually and is propagated in a direction that changes according to the wavelength of the light incident, thereby forming collimated light A (B).

Thus, as a result of multiplex reflection, The VIPA 10 is equivalent to a phased-array light-source. Due to mutual interference of light from a virtual phased-array light-source, the collimated light A (B) is resulted. The direction of output is a direction corresponding to a Bragg angle of the diffraction grating.

The distance d of the light path can be expressed by d=2t·sinθ. The difference between lengths of the paths between adjacent beams is 2t·cosθ. The angle dispersion is in proportion to a ratio of the two figures and is cotθ. As a result, the VIPA 10 can develop a large angel dispersion between the light beams of different carriers (of wavelengths from λ1 to λn). The VIPA 10 can realize the large angle dispersion that is 10 to 20 times as compared to that by the diffraction grating 7. Thus, when the VIPA 10 is used as the wavelength dispersing element 6, the light dispersion (wavelength division) with a large angel of dispersion can be performed with a simple structure.

A lens 8a and a light transmission-type polarization control device 9 are disposed on an input side where the light A is made parallel in the output direction of the light A that is divided by the wavelength dispersing element 6 which is made of the VIPA 10 and the diffraction grating 7. A crystal or a magneto-optic element can be used as the polarization control device 9. For example, a ferroelectric liquid crystal in which a main shaft is tilted at an angle of 22.5° (tilt angle is ±22.5°) is to be used. Further, a phase difference between the phases between a short axis and a long axis is adjusted to λ/2 by performing an ON/OFF control that switches the direction of the main shaft between 0° and 45°. By adjusting the phase difference to λ/2, it is possible to switch the polarization angle of light that passes through the polarization control device 9 to either a direction that is rotated through 0° or a direction that is rotated through 90°. Apart from the ferroelectric liquid crystal, a Faraday rotator can also be used as the polarization control device 9. Even when the main shaft is tilted by 22.5° by using a Faraday rotator that has a Faraday rotation angle of 22.5°, the switching of the polarization angle to 0° and 90° is performed similarly.

Thus, the polarization control device 9 can perform polarization control of light having wavelengths from λ1 to λn that is incident upon division of wavelength. Therefore, as shown in FIG. 2, the polarization control device 9 includes a plurality of elements 9a to 9n that are in an array form along the direction of width of the light with a predetermined distance between the elements. The elements 9a to 9n perform polarization control according to wavelengths λ1 to λn. In OFF condition, the polarization angle is not changed (0°) and during the ON control, the switching is made to rotate the direction of rotation through 90°.

An optical system on the output side that has a structure similar to the optical system on the input side is disposed behind the polarization control device 9. The optical system on the output side is disposed symmetrically with the optical system on the input side with the polarization control device 9 at a center of the symmetrical formation. Concretely, the same components viz. the fiber collimators 2a and 2b, the optical fibers 3a and 3b, the collimating lenses 4a and 4b, the birefringent plate 5a, the wavelength dispersing element 6a, and the lens 8a as in the optical system on the input side are arranged in the optical system on the output side. Therefore, the optical system on the output side includes components arranged behind the polarization control device 9 in an order of a lens 8b, a wavelength dispersing element 6b, a birefringent plate 5b, collimating lenses 4c and 4d, the optical fibers 3c and 3d, the fiber collimators 2a and 2b (see FIG. 1) in a direction of advancing of light. The diffraction grating 7 and the VIPA 10 can be used as the wavelength dispersing element 6b similar to the wavelength dispersing element 6a.

An operation of switching of an optical path according to the wavelength by the polarization control according to the first embodiment is described below. When a light beam A that has a predetermined polarization is output from the end surface of the optical fiber 3a, the light beam A passes straight through the birefringent plate 5a via the collimating lens 4a and the wavelength of the light is dispersed by the wavelength dispersing element 6a in the optical system on the input side. Thus, the wavelength dispersing element 6a splits a plurality of light beams in the light A according to wavelengths $\lambda 1$ to $\lambda n$ in different directions and outputs. The light beams of wavelengths $\lambda 1$ to $\lambda n$ which have their wavelengths dispersed are passed as horizontal beams from the lens 8a and the light beams of wavelengths $\lambda 1$ to $\lambda n$ are incident on the polarization control device 9.

The polarization control device 9 is an array of polarization control elements 9a to 9n as shown in FIG. 2. The light beams of wavelengths $\lambda 1$ to $\lambda n$ are incident with a distance between the light beams that is matched with a pitch of the array of the elements 9a to 9n. Therefore, the polarization angle can be switched separately (independently) for the light beams of wavelengths $\lambda 1$ to $\lambda n$. In this case, if the elements 9a to 9n in the array of the polarization control device 9 are OFF as they are already, the polarization control device 9 does not perform control of any light beam among the light beams of wavelengths $\lambda 1$ to $\lambda n$. Therefore, the light beam A passes through the polarization control device 9 (polarization control elements 9a to 9n) with the same polarization as when incident. As shown in FIG. 3, the light beam A that is passed through the polarization control device 9 is incident on the wavelength dispersing element 6b from the lens 8b. Further, the light beams of wavelengths $\lambda 1$ to $\lambda n$ are converged as one light beam A. The light beam A that is converged, passes through the birefringent plate 5b and is incident on the optical fiber 3c.

Figure 5:
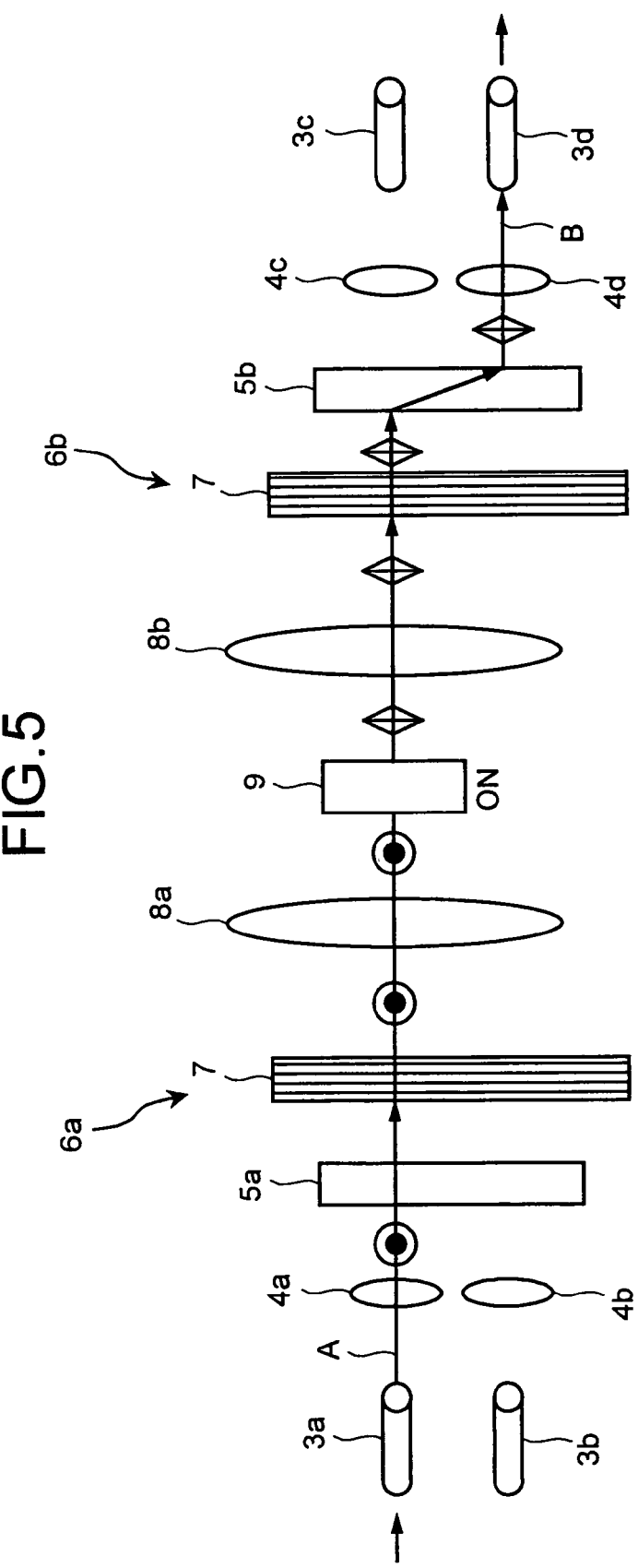
FIG. 5 is an illustration of a switching operation of an optical path according to wavelength by the transmission-type wavelength selector switch according to the first embodiment of the present invention.

An operation when the polarization control device 9 (polarization control elements 9a to 9n) is ON, is described below. FIG. 5 is an illustration of a switching operation of the optical path according to wavelengths by the transmission-type wavelength selector switch according to the first embodiment of the present invention. When an optical path of light beams of desired wavelengths $\lambda 1$ to $\lambda n$ in the light beam A from the optical fiber 3a is switched, the control of the corresponding array of the polarization control elements 9a to 9n of the polarization control device 9 is put ON.

For example, for switching the light beam of wavelength $\lambda 1$ that is included in the light beam A, the control of the polarization control element 9a in the polarization control device 9 is put ON. Due to this, the light beam A that is passed through the array 9a of the polarization control device 9 is switched such that the polarization angle of light beam A that has a wavelength $\lambda 1$ only, is rotated through 90°. When the light beam A that is passed through the polarization control device 9 passes through the birefringent plate 5b, an optical path of the light beam having wavelength $\lambda 1$ for which the polarization angle is rotated through 90° only is switched in a direction of an optical path of the light B and is incident on the optical fiber 3d. Other light beams of wavelengths $\lambda 2$ to $\lambda n$ in the light beam A are incident on the optical fiber 3c after passing straight through the optical path of the light beam A.

Thus, an optical path of light of the desired wavelength only can be switched to another system. By doing so, light of components of certain wavelengths $\lambda 1$ to $\lambda n$ in the light beam A that is operated in the first optical transmission path (standard circuit) can be switched to an optical path of the other light beam B, i.e. towards the second optical transmission path (spare circuit). Moreover, since the polarization control of the wavelengths $\lambda 1$ to $\lambda n$ separately by the wavelength selector switch 9 is possible, the optical path of wavelengths $\lambda 1, \lambda 2, \ldots, \lambda n$ of the light beam A can be switched separately (independently) or an optical path of wavelengths $\lambda 1, \lambda 2, \ldots, \lambda n$ together can be switched.

So far, a structure for switching that has one input and two outputs is described. In the structure for switching that has one input and two outputs, light that is input from the single optical fiber 3a is incident on the optical fiber 3c or the optical fiber 3d. However, this structure is not limited to the number of inputs and outputs mentioned here. In the structure for switching that has one input and two outputs, the arrangement of the birefringent plate 5a on the input side shown in FIGS. 1 to 3 is not necessary. By providing the birefringent plate 5a on the input side, switching of light of an all-optical cross-connect that has two inputs and two outputs becomes possible.

Further, as shown in FIG. 3, the setting is such that the polarization angle of the light beam B that is incident on the optical fiber 3b is rotated through 90° with respect to the polarization angle of the light beam A that is incident on the optical fiber 3a. Due to this, the light beam B that is incident from the optical fiber 3b passes through an optical path A due to the birefringent plate 5a. Further, the polarization control according to the wavelengths $\lambda 1$ to $\lambda n$ can be performed by the ON/OFF control of the polarization control device 9.

For example, when the polarization control element 9a in the array of the polarization control device 9 is OFF, components of all the wavelengths $\lambda 1$ to $\lambda n$ of the light beam B are output from the optical fiber 3d in the optical path of the light beam B. Due to ON control of the polarization control element 9a in the array of the polarization control device 9, the polarization angle of the light beam of wavelength $\lambda 1$ only, in the light beam B, can be rotated through 90°. In this case, the birefringent plate 5b on the output side allows the light beam of wavelength $\lambda 1$ only, to be output to the optical fiber 3c following the same optical path A and the light beams of wavelengths $\lambda 2$ to $\lambda n$ can be allowed to be output to the optical fiber 3d in the optical path of the light beam B that is refracted.

Due to this, as shown in FIG. 1, when the light beams of wavelengths $\lambda 1, \lambda 2$, and $\lambda 3$ from the optical fiber 3a and the light beams of wavelengths $\lambda a, \lambda b$, and $\lambda c$ from the optical fiber 3b are input to the wavelength selector switch 1, by switching the optical path upon selecting the desired wavelengths only, the light beams of wavelengths $\lambda a, \lambda b$, and $\lambda c$ are output to the optical fiber 3c as well as the light beams of wavelengths λ1, λ2, and λ3 are output to the optical fiber 3c. In this case, λ1=λa, λ2=λb, and λ3=λc.

Thus, according to the transmission type wavelength selector switch 1 according to the first embodiment, the optical path of the desired wavelengths of light beams of two systems or all wavelengths of light beams of two systems can be switched to the optical path of the other system. Therefore, an all-optical cross-connect that has two inputs and two outputs is possible.

Figure 6:
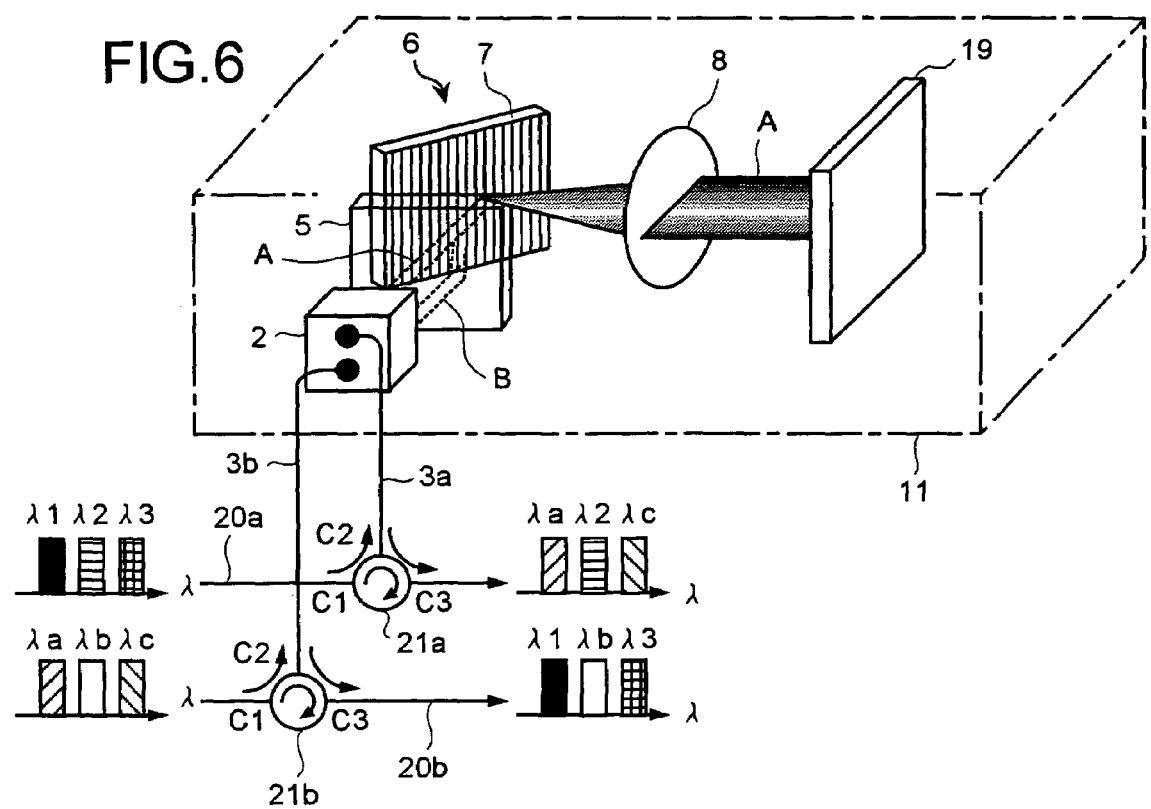
FIG. 6 is a perspective view of a structure of a reflection-type wavelength selector switch according to a second embodiment of the present invention.
Figure 7:
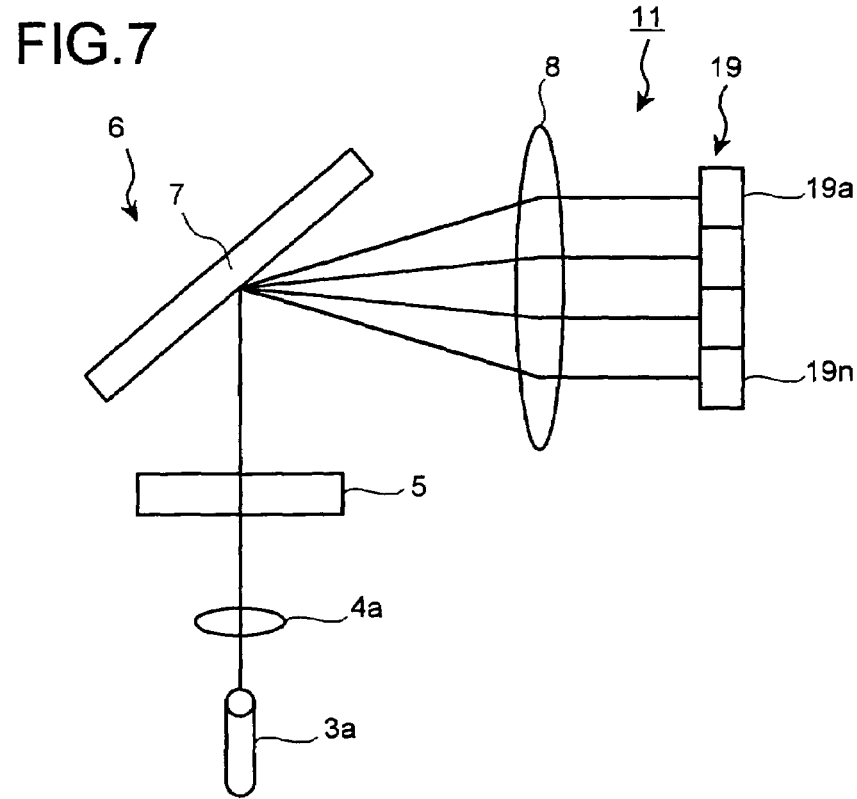
FIG. 7 is a top view of a wavelength selector switch according to the second embodiment of the present invention.
Figure 8:
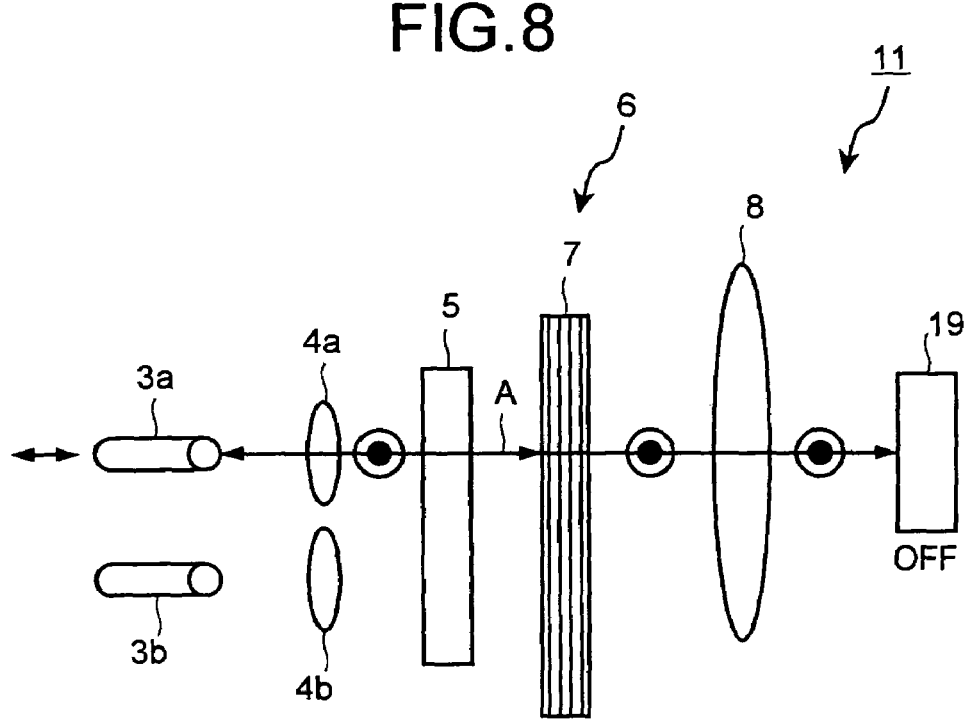
FIG. 8 is a side view of a wavelength selector switch according to the second embodiment of the present invention.

A second embodiment of a wavelength selector switch according to the present invention is described below. FIG. 6 is a perspective view of a structure of a reflection-type wavelength selector switch according to the second embodiment of the present invention. FIG. 7 is a tow view of the wavelength selector switch according to the second embodiment of the present invention. FIG. 8 is a side view of the wavelength selector switch according to the second embodiment of the present invention. A wavelength selector switch 11 according to the second embodiment has a structure similar to the wavelength selector switch 1 according to the first embodiment excluding the optical system on the output side. Therefore, the wavelength selector switch 11 includes an optical system that is common for the input and the output side and a reflection type polarization control device. In the second embodiment, the components that are identical to the components in the first embodiment (FIGS. 6 to 8) are indicated by the same reference numerals.

Following is a concrete description of the structure of the wavelength selector switch 11 according to the second embodiment. The wavelength selector switch 11 includes a fiber collimator 2 and an optical fiber connector that is not shown in the diagram, as two input and two output ports. The fiber collimator 2 includes optical fibers 3 (3a and 3b) that are disposed in an upper position and a lower position respectively. The optical fibers 3a and 3b are fixed such that the end surfaces of the optical fibers are aligned. As shown in FIG. 6, the optical fiber 3a is connected to a first optical transmission path 20a via a circulator 21a. The optical fiber 3b is connected to a second optical transmission path 20b via a circulator 20b. The circulators 21a and 21b have a function of outputting light that is input to an optical input port C1 from an optical input-output port C2 and a function of outputting light that is input to the optical input-output port C2 from an optical output port C3 respectively.

Light beams A and B that are output from the end surfaces of the optical fibers 3a and 3b in the fiber collimator 2 are changed to parallel light beams at the collimating lenses 4a and 4b (see FIG. 8) and are incident on a wavelength dispersing element 6 via the birefringent plate 5. The birefringent plate 5 changes an output position of a light beam that is transmitted along a polarization angle of the incident light. The birefringent plate 5, similar to the birefringent plate 5a in the first embodiment, is made of an anisotropic crystalline material like calcite and rutile. The diffraction grating 7 and the VIPA 10 can be used as the wavelength dispersing element 6 similarly as in the first embodiment.

A lens 8 that changes the light beam A to a parallel light beam and outputs to a polarization control device 19, is disposed in an output direction of the light beam A that is separated by the wavelength dispersing element 6. The polarization control device 19, unlike in the first embodiment, is a reflection-type device that reflects the incident light. As described in the first embodiment, the ferroelectric liquid crystal and the Faraday rotator can be used as the polarization control device 19. The reflection-type polarization control device 19 can be reduced to about half the thickness as compared to a transmission-type polarization control device. Therefore, it is possible to have a thin polarization control device at a low cost.

A switching operation of an optical path according to the wavelength by the polarization control according to the second embodiment is described below. A light signal on the first optical transmission path 20a is input to the optical fiber 3a of the wavelength selector switch 11 via the circulator 21a. When a light beam A that has a predetermined polarization is output from the optical fiber 3a, the light beam A passes straight through the birefringent plate 5 via the collimating lens 4a and the wavelength of the light is dispersed by the wavelength dispersing element 6 in the optical system on the input side. Thus, the wavelength dispersing element 6 splits a plurality of light beams in the light beam A according to wavelengths λ1 to λn in different directions and outputs these light beams. The light beams of wavelengths λ1 to λn which have their wavelengths dispersed are incident on the polarization control device 19.

The polarization control device 19 is an array of polarization control elements 19a to 19n that have different wavelengths as shown in FIG. 7 and can switch the polarization angle of light according to the wavelengths λ1 to λn. In this case, if all the elements 19a to 19n in the array of the polarization control device 19 are OFF as they are already, the polarization control device 19 does not perform the polarization control of any light beam among the light beams of wavelengths λ1 to λn and all the light beams of wavelengths λ1 to λn are reflected. In this case, as shown in FIG. 8, the light beam A is reflected in the same polarized state as when incident on the polarization control device 19. The light beam A that is reflected, returns to the wavelength dispersing element 6 via the lens 8. The light beam A that is converged, passes through the birefringent plate 5 as it is and is incident on the optical fiber 3a by returning.

Thus, the light from the optical fiber 3a is returned to the first optical transmission path via the circulator 21a. As it is explained above, when the polarization control elements 19a to 19n in the array of the polarization control device 19 are all OFF, the optical signal in the first optical transmission path 20a is returned to the first optical transmission path 20a without the optical path of the wavelengths λ1 to λn being switched.

Figure 9:
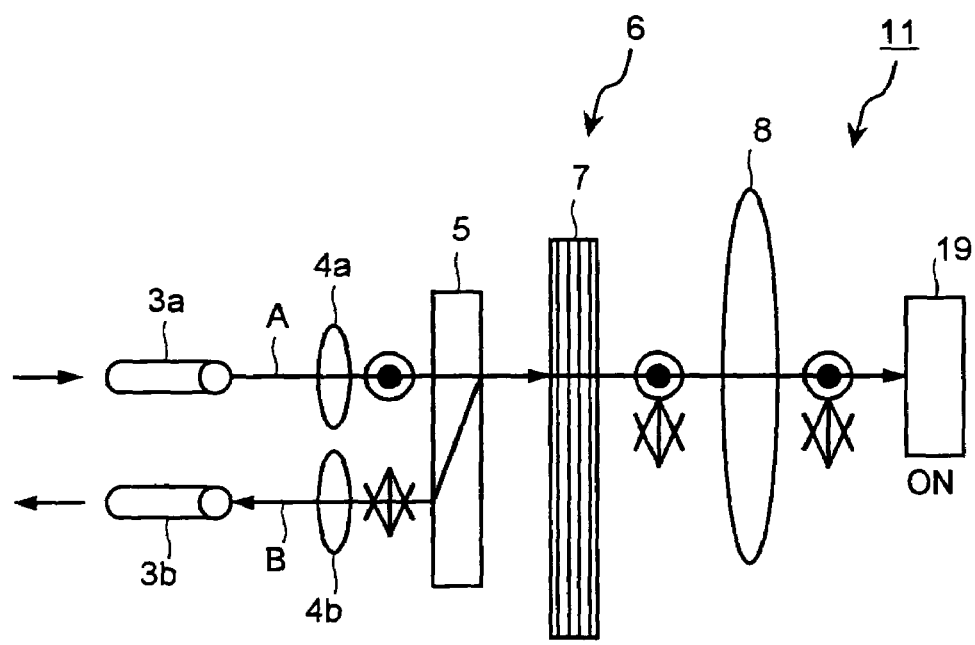
FIG. 9 is an illustration of a switching operation of an optical path according to wavelength by the transmission-type wavelength selector switch according to the second embodiment of the present invention.

An operation when the polarization control device 19 (polarization control elements 19a to 19n) is ON is described below. FIG. 9 is an illustration of a switching operation of the optical path according to wavelengths by the reflection-type wavelength selector switch according to the second embodiment of the present invention. When an optical path of light beams of desired wavelengths λ1 to λn in the beam A from the optical fiber 3a is to be switched, the control of the corresponding array of the polarization control elements 19a to 19n of the polarization control device 19 is put ON For example, for switching the light beam of wavelength λ1 that is included in the light beam A, the control of the polarization control element 19a in the polarization control device 19 is put ON. Due to this, from the light beam A that is incident on the polarization control element 19a, only the polarization angle of the light beam A that has a wavelength λ1 only, is rotated through 90° and the light beam A is reflected. When the light beam A that is reflected from the polarization control device 19 passes through the birefringent plate 5, an optical path of the light beam that has wavelength λ1 for which the polarization angle is rotated through 90° only, is switched in a direction of an optical path of the light B and is incident on the optical fiber 3b. The other light beams of wavelengths λ2 to λn in the light beam A are incident on the optical fiber 3*a* after passing straight through the optical path of the light beam A.

Thus, an optical path of light of the desired wavelength only can be switched to another system. By doing so, as shown in FIG. 6, light of components of certain wavelengths λ1, λ3 in the light beam A that is operated in the first optical transmission path (standard circuit) can be switched to an optical path of the other light beam B, i.e. to the second optical transmission path (spare circuit) 20*b*. Moreover, since the wavelength selector switch 19 can perform the polarization control of the wavelengths λ1 to λn separately, the optical path of wavelengths λ1, λ2, . . . , λn of the light beam A can be switched separately (independently) or an optical path of all wavelengths λ1 to λn together can be switched.

Further, as shown in FIG. 9, the setting is such that the polarization angle of the light beam B that is incident on the optical fiber 3*b* is rotated through 90° with respect to the polarization angle of the light beam A that is incident on the optical fiber 3*a*. The light beam B that is incident from the optical fiber 3*b* passes through an optical path A due to the birefringent plate 5. Further, the polarization control according to the wavelengths λ1 to λn can be performed by an ON/OFF control of the polarization control device 19. For example, when the polarization control element 19*a* in the array of the polarization control device 19 is OFF, components of all the wavelengths λ1 to λn of the light beam B that is reflected, are returned to the optical fiber 3*b* in the optical path of the light beam B.

Due to an ON control of the polarization control element 19*a* in the array of the polarization control device 19, the polarization angle of the light beam of wavelength λ1 only, in the light beam B that is reflected can be rotated through 90°. In this case, the birefringent plate 5 outputs the light beam of wavelength λ1 only that is reflected such that it returns to the optical fiber 3*a* after passing through the same optical path A and the light beams of wavelengths λ2 to λn can be refracted and output such that the light beams return to the optical fiber 3*b* after passing through the optical path of the light beam B.

Due to this, as shown in FIG. 6, when the light beam of wavelengths λ1, λ2, and λ3 that follows the first optical transmission path 20*a* and the light beam of wavelengths λa, λb, and λc that follows the second optical transmission path 20*b* are input to the wavelength selector switch 11, by switching the optical path upon selecting the desired wavelengths only, the light beam of wavelengths λ1, λb, and λ3 are returned to the first optical transmission path 20*a* as well as the light beam of wavelengths λa, λ2, and λc are output to the second optical transmission path 20*b*. In this case, λ1=λa, λ2=λb, and λ3=λc.

Thus, according to the reflection-type wavelength selector switch 11 according to the second embodiment, the optical path of the desired wavelengths of light beams of two systems or all wavelengths of light beams of two systems can be switched to the optical path of the other system. Therefore, an all-optical cross-connect that has two inputs and two outputs, is possible. According to the structure in the second embodiment, due to the use of the reflection-type polarization control device 19, length of an optical path in an apparatus can be reduced to half as compared to that in the first embodiment. Moreover, the optical system on the output side (that includes the wavelength dispersing element 6*b*, the birefringent plate 5*b*, and the lens 8*b*) that is described in the first embodiment is not required. This enables to reduce the number of components and the additional cost of these components.

Figure 10:
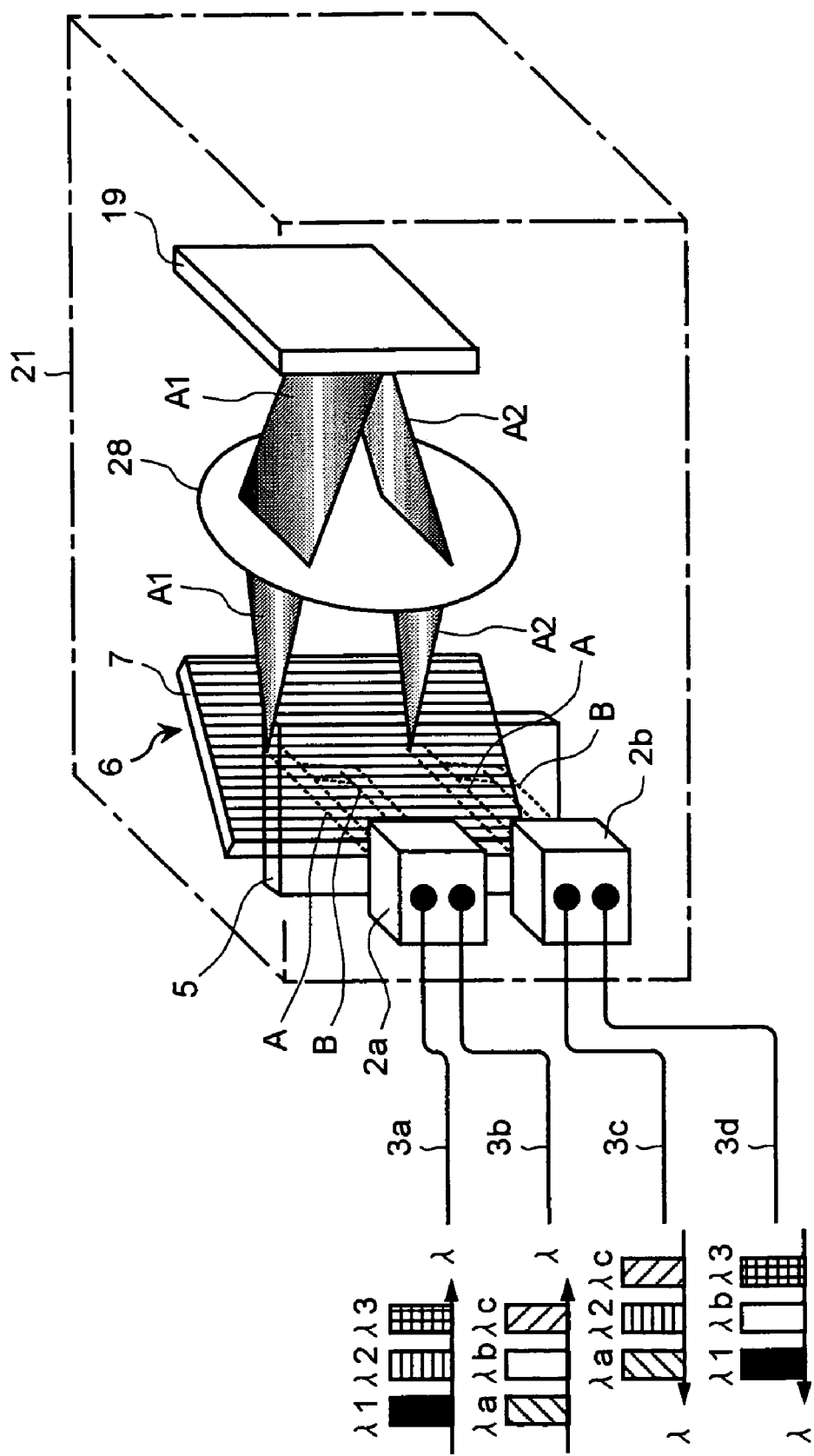
FIG. 10 is a perspective view of a structure of a reflection-type wavelength selector switch according to a third embodiment of the present invention.
Figure 11:
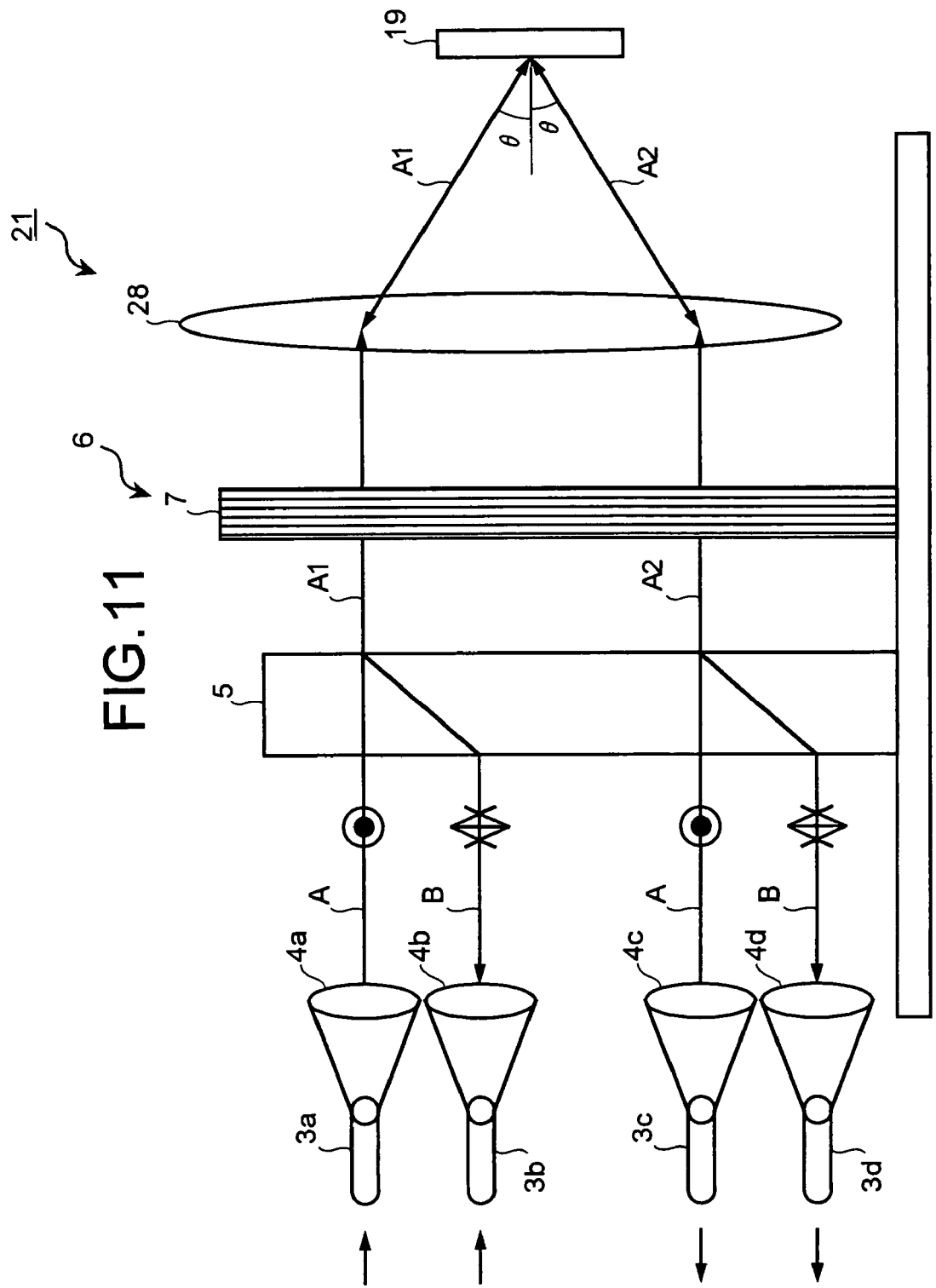
FIG. 11 is a side view of a wavelength selector switch according to the third embodiment of the present invention.

A third embodiment of a wavelength selector switch according to the present invention is described below. FIG. 10 is a perspective view of a structure of another reflection-type wavelength selector switch according to the third embodiment of the present invention. FIG. 11 is a side view of another wavelength selector switch of reflection-type according to the third embodiment of the present invention. A wavelength selector switch 21 according to the third embodiment has a structure similar to the reflection-type wavelength selector switch 11 that is described in the second embodiment (by referring to FIGS. 6 to 9). However, the wavelength selector switch 21 according to the third embodiment is structured such that an optical path on the input side and an optical path on the output side are different optical paths. Due to such structure, the circulators 21*a* and 21*b* provided according to the second embodiment are not required. In the third embodiment, the components that are identical to the components the first and the second embodiments are indicated by the same reference numerals.

Following is a concrete description of the structure of the wavelength selector switch 21 according to the third embodiment. The wavelength selector switch 21, similar to the wavelength selector switch 11 in the second embodiment, includes an optical system that is common for the output and the input side, and the reflecting-type polarization control device. The wavelength selector switch 21 includes the fiber collimator 2 and the optical fiber connector that is not shown in the diagram as two input ports and two output ports. The fiber collimator 2 includes an input side fiber collimator 2*a* and an output side fiber collimator 2*b*. The input side fiber collimator 2*a* includes input side optical fibers 3 (3*a* and 3*b*) that are disposed in an upper position and a lower position respectively. The output side fiber collimator 2*b* includes output side optical fibers 3 (3*c* and 3*d*) that are disposed in an upper position and a lower position respectively. The fiber collimator 2 includes the optical fibers 3 such that the end surfaces of the optical fibers are aligned.

The polarization angles of light beams A and B that are output from the optical fibers 3*a* and 3*b* in the fiber collimator 2*a* differ by 90°. The light beams A and B are changed to parallel light beams at the collimating lenses 4*a* and 4*b* (see FIG. 11). At the birefringent plate 5, the parallel light beams are changed to an optical beam A1 that follows one optical path and the optical beam A1 is incident on the wavelength dispersing element 6.

A lens 28 that turns the light beam A1 into a parallel light beam and outputs to the polarization control device 19 is disposed in the direction of output of the light beam A1 that is divided into different wavelengths λ1 to λn by the wavelength dispersing element 6. As shown in FIG. 11, the lens 28 causes the light beam A1 to incident on the polarization control device 19 with a predetermined angle of incidence θ. The polarization control element 19 is of a reflection type similar to that in the first and the second embodiments. Therefore, the light beam A1 that is incident on the polarization control device 19 with the angle of incidence θ is output to the lens 28 as a light beam A2 that has a similar angle of reflection θ.

The light beam A2 that is reflected, follows the optical path on the output side. The light beam A2 is incident on the wavelength dispersing element 6 via the lens 28. The wavelength dispersing element 6 combines the light beam A2 that is divided into different wavelengths λ1 to λn, into a single multiplexed light beam and outputs to the birefringent plate 5. The birefringent plate 5 outputs light beams A and B having different optical paths due to the polarization angle that is included in the light beam A2. The light beams A and B are incident on the optical fibers 3c and 3d on the output side by the collimating lenses 4c and 4d respectively on the output side.

The wavelength dispersing element 6 that is used in the third embodiment is the diffraction grating 7 similar to that in the first and the second embodiments. Apart from the diffracting grating, the VIPA 10 can also be used as the wavelength dispersing element 6. The ferroelectric liquid crystal and the Faraday rotator can be used as the polarization control device 19. The reflection-type polarization control device can be reduced to about half the thickness as compared to a transmission type polarization control device. Therefore, it is possible to have thin polarization control device at a low cost similarly as in the second embodiment.

An operation of switching of an optical path according to the wavelength by the polarization control according to the third embodiment is described below. When a light beam A that has a predetermined polarization is output from the optical fiber 3a, the light beam A passes straight through the birefringent plate 5 via the collimating lens 4a as a light beam A1 and the wavelength of the light is dispersed by the wavelength dispersing element 6 in the optical system on the input side. The wavelength dispersing element 6 disperses a plurality of light beams in the light beam A according to wavelengths $\lambda 1$ to $\lambda n$ in different directions and outputs these light beams. The light beams of wavelengths $\lambda 1$ to $\lambda n$ which have their wavelengths dispersed are incident on the polarization control device 19.

The polarization control device 19 has a structure similar to that mentioned in the second embodiment. As shown in FIG. 7, the polarization control device 19 is an array of polarization control elements 19a to 19n that have different wavelengths and can switch the polarization angle of light according to the wavelengths $\lambda 1$ to $\lambda n$. In this case, if all the elements 19a to 19n in the array of the polarization control device 19 are OFF as they are already, the polarization control device 19 does not perform the polarization control of light beams of wavelengths $\lambda 1$ to $\lambda n$ and reflects the light beam A1 that is incident.

In this case, as shown in FIG. 11, the polarization control device 19 reflects a light beam A2 that is output at a same angle θ as the angle of incidence θ of the light beam A1 that is incident. The light beam A2 is reflected in the same polarized state as when incident on the polarization control device 19. The light beam A2 that is reflected returns to the wavelength dispersing element 6 via the lens 28. The light beam A2 that is converged, passes through the birefringent plate 5 as it is, and is incident on the optical fiber 3c on the output side. As shown in FIG. 11, optical paths of the light beams A1 and A2 pass through different upper and lower positions within the space that includes the optical fibers 3, the collimating lenses 4, the birefringent plate 5, and the wavelength dispersing element 6.

Thus, when the polarization control elements 19a to 19n in the array of the polarization control device 19 are OFF, the optical signal that is input from the optical fiber 3a can be output from the optical fiber 3c without the optical path of the wavelengths $\lambda 1$ to $\lambda n$ being switched.

An operation when the polarization control device 19 (polarization control elements 19a to 19n) is ON is described below. When an optical path of light beams of desired wavelengths $\lambda 1$ to $\lambda n$ in the beam A that is output from the optical fiber 3a is to be switched, the control of the corresponding array of the polarization control elements 19a to 19n of the polarization control device 19 is put ON.

For example, for switching the light beam of wavelength $\lambda 1$ that is included in the light beam A, the control of the polarization control element 19a in the polarization control device 19 is put ON. Due to this, from the light beam A1 that is incident on the polarization control element 19a, only the polarization angle of the light beam A1 that has a wavelength $\lambda 1$ only, is rotated through 90° and the light beam A1 is reflected as a light beam A2. When the light beam A2 that is reflected from the polarization control device 19 passes through the birefringent plate 5, an optical path of the light beam having wavelength $\lambda 1$ for which the polarization angle is rotated through 90° only, is switched to an optical path of light B and is incident on the optical fiber 3d. The other light beams of wavelengths $\lambda 2$ to $\lambda n$ in the light beam A2 are incident on the optical fiber 3c after passing straight through the optical path of the light beam A2.

Thus, an optical path of light of the desired wavelength only can be switched to another system. By doing so, light of components of certain wavelengths $\lambda 1$, $\lambda 3$ in the light beam A that is operated in the first optical transmission path (standard circuit) can be switched to an optical path of the other light beam B, i.e. can be switched towards the second optical transmission path (spare circuit), similarly as in the first and the second embodiments. Moreover, since the wavelength selector switch 19 can perform the polarization control of the wavelengths $\lambda 1$ to $\lambda n$ separately, the optical path of wavelengths $\lambda 1, \lambda 2, \ldots, \lambda n$ of the light beam A can be switched separately or an optical path of all wavelengths $\lambda 1$ to $\lambda n$ together can be switched collectively.

Further, as shown in FIG. 11, the setting is such that the polarization angle of the light beam B that is incident on the optical fiber 3b is rotated through 90° with respect to the polarization angle of the light beam A that is incident on the optical fiber 3a. The light beam B that is incident from the optical fiber 3b passes through an optical path A1 due to the birefringent plate 5. Further, the polarization control according to the wavelengths $\lambda 1$ to $\lambda n$ can be performed by an ON/OFF control of the polarization control device 19. For example, when the polarization control element 19a in the array of the polarization control device 19 is OFF, components of all the wavelengths $\lambda 1$ to $\lambda n$ of the light beam A2 that is reflected are output from the optical fiber 3d via the optical path B.

Due to an ON control of the polarization control element 19a in the array of the polarization control device 19, the polarization angle of the light beam of wavelength $\lambda 1$ only, in the light beam A2 that is reflected can be rotated through 90°. In this case, the birefringent plate 5 allows the optical fiber 3c to outputs the light beam of wavelength $\lambda 1$ only, that is reflected following the same optical path A and the light beams of wavelengths $\lambda 2$ to $\lambda n$ can be refracted and output from the optical fiber 3d in the optical path of the light beam B.

Thus, according to the reflection-type wavelength selector switch 21 according to the third embodiment, the optical path of the desired wavelengths of light beams of two systems or all wavelengths of light beams of two systems can be switched to the optical path of the other system. Therefore, an all-optical cross-connect that has two inputs and two outputs is possible. According to the structure in the third embodiment, due to the use of the reflection-type polarization control device 19, length of an optical path in an apparatus can be reduced to half as compared to that in the first embodiment. Moreover, the optical system on the output side (that includes the wavelength dispersing element 6b, the birefringent plate 5b, and the lens 8b) that is described in the first embodiment is not required. This enables to reduce the number of components and the additional cost of these components. Furthermore, due to provision of independent ports of two inputs and two outputs, the circulator that is used in the second embodiment is not required.

Figure 12:
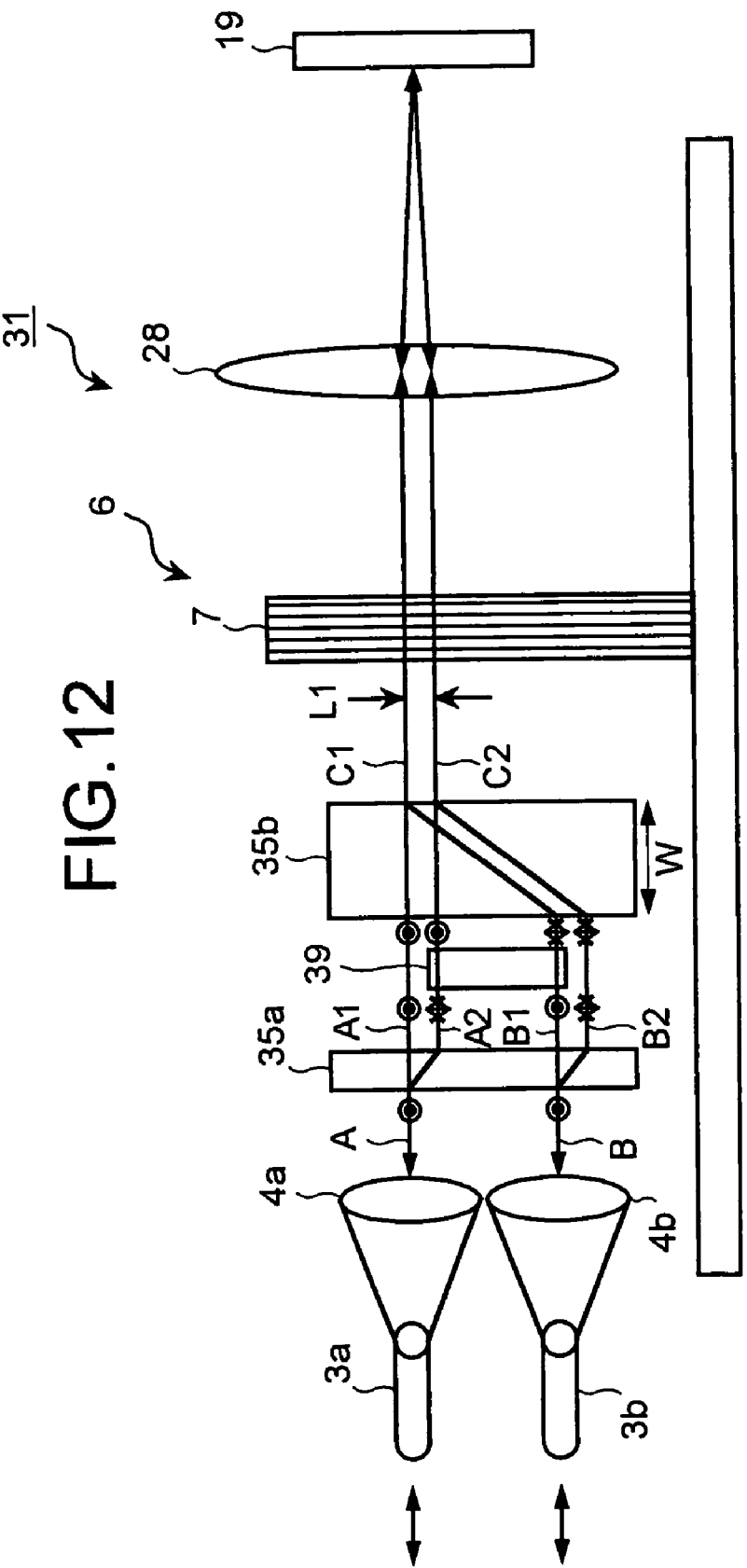
FIG. 12 is a side view of a structure of still another reflection-type wavelength selector switch according to a fourth embodiment of the present invention.

A fourth embodiment of a wavelength selector switch according to the present invention is described below. FIG. 12 is a side view of a structure of still another wavelength selector switch of reflection-type according to the fourth embodiment of the present invention. A wavelength selector switch 31 according to the fourth embodiment has a structure that is almost similar to the reflection-type wavelength selector switch 21 that is described in the third embodiment (see FIGS. 10 and 11). The wavelength selector switch 31 unlike the wavelength selector switch according to the third embodiment uses two birefringent plates and a λ/2 plate as a wavelength plate that rotates the polarization angle of light by 90° between the two birefringent plates. In the fourth embodiment, the components that are identical to those components in the first, second, and the third embodiments are indicated by the same reference numerals.

Following is a concrete description of the structure of the wavelength selector switch 31 according to the fourth embodiment. In the fourth embodiment, a light signal is input or output from the optical fiber 3a via the circulator that is connected to the first optical transmission path and a light signal is input or output from the optical fiber 3b via the circulator that is connected to the second optical transmission path (see FIG. 1).

A light beam A that is output from the end surface of the optical fiber 3a, which transmits light from the first optical transmission path is changed to a parallel light beam by the collimating lens 4a. The parallel light beam is incident on a birefringent plate 35a. The birefringent plate 35a switches an output angle according to polarization of the light beam A. In an example shown in the diagram, when the polarization angle of the light beam A that is incident is 0°, the light beam is allowed to pass straight and output as a light beam A1. When the polarization angle of the light beam A that is incident is rotated through 90°, the beam is refracted in a direction inclined downward and is output as a light beam A2 from a position that is away by a predetermined distance L1.

The collimating lens 4a and the optical fiber 3b that transmits light from the second optical transmission path are provided below the optical fiber 3a and the collimating lens 4a. When the angle of polarization of the light beam B is 0°, the birefringent plate 35a allows the light beam B1 to pass straight. When the angle of polarization of the light beam B is rotated through 90°, the birefringent plate 35a refracts the light beam in a direction inclined downward and outputs as a light beam B2 from a position that is away by a predetermined distance L1.

A wavelength plate 39 that is disposed behind the birefringent plate 35a is provided between the light beams A2 and B1. Further, the polarization angle of the light beams A2 and B1 are rotated through 90°. By doing so, regarding the light beam A, the polarization angle of the light beam A1 that does not pass through the wavelength plate 39 and the direction of the light beam A2 that has passed through the wavelength plate 39 are matched (polarization angle 0°). Regarding the light beam B, the polarization angle of the light beam B1 that has passed through the wavelength plate 39 and the polarization angle of the light beam B2 that does not pass through the wavelength plate 39 are matched (polarization angle 90°). The light beams A (A1, A2) and B (B1, B2) are incident on upper and lower positions respectively on a birefringent plate 35b.

The birefringent plate 35b allows the light beam A (A1, A2) that has the polarization angle 0° to pass straight and the light beam B (B1, B2) that has the polarization angle 90° is refracted. The birefringent plate 35b has a predetermined thickness W to match an output position of the light beam B that is refracted with an output position of the light beam A. Due to this, the birefringent plate 35b allows polarized multiplexing of the light beam A having the polarization angle of 0° and the light beam B having the polarization angle of 90° and outputs. The wavelength dispersing element 6, the lens 28, and the reflection-type polarization control device 19 that are described below are disposed behind the birefringent plate 35b.

An optical path when the light beam A having the polarization angle of 0° is incident on the optical fiber 3a is described below. Wavelength of a light beam C1 (polarization angle 0°) that has passed through the birefringent plate 35b is dispersed by the wavelength dispersing element 6 (diffraction grating 7 in an example in the diagram) according to the wavelengths λ1 to λn. The light beam C1 having the wavelength dispersed by the wavelength dispersing element 6 is incident on the lens 28. The lens 28 turns the light beam C1 having the wavelength dispersed into parallel light and allows to incident on the polarization control device 19 at a certain angle of incidence.

The polarization control device 19 is a reflection-type polarization control device and is formed as an array of a plurality of polarization control elements to switch the polarization angle according to wavelengths λ1 to λn. Each polarization control element in the array of the polarization control device 19 performs separate ON/OFF control. When the polarization angle of the light beam C1 is not switched, the polarization control device 19 is OFF and does not change the polarization angle of the light beam C1 of wavelengths λ1 to λn that is incident.

The polarization control device 19 reflects a light beam C2 with an angle of output same as the angle of incidence. The light beam C2 is combined at the wavelength dispersing element 6 after passing through the lens 28 and then incident on the birefringent plate 35b. The birefringent plate 35b allows the light beam C2 to pass straight as a light beam A2 with the polarization angle of 0°. The wavelength plate 39 rotates the polarization angle of the light beam A2 through 90°. The light beam A2 is then refracted at the birefringent plate 35a and is output to the optical fiber 3a after passing through the collimating lens 4a.

Further, a switching operation of an optical path of desired wavelength λ1 in the light beam A after the light beam A with the polarization angle of 0° is incident on the optical fiber 3a, is described below. The light beam C1 with the polarization angle 0° is incident on the polarization control device 19. Due to ON control of the polarization control device 19, the polarization control device 19 rotates only the polarization angle of the wavelength λ1 in the light beam C1 that is incident through 90° and reflects it. A light beam C2 that is rotated through 90° and reflected from the polarization control device 19 is refracted at the birefringent plate 35b and is switched towards the light beam B2. The light beam B2 is incident on the birefringent plate 35a without passing through the wavelength plate 39. The light beam B2 in refracted by the birefringent plate 35a and is output to the optical fiber 3b via the collimating lens 4b. The light beam A of components other than the wavelength λ1 (i.e. components of wavelengths λ2 to λn) in the light beam A that is incident on the optical fiber 3a is output from the optical fiber 3a without the optical path of the light beam A being switched.

An optical path when the light A is incident on the optical fiber 3a with the polarization angle of 90° is described below. The light beam A advances through an optical path of the light beam A2 that is refracted by the birefringent plate 35a. The polarization angle of the light beam A is rotated through 90° by the wavelength plate 39 and the light beam A is incident on the birefringent plate 35b with the polarization angle of 0°. The light beam C2 that has passed through the birefringent plate 35b (polarization angle 0°) is turned into a parallel light beam and is incident on the polarization control device 19 with a certain angle of incidence.

When the polarization angle of the light beam C2 is not switched, the polarization control device 19 is OFF and the polarization angle of the light beam C2 having wavelengths λ1 to λn that is incident, is not changed. In this case, the polarization control device 19 causes the light beam C1 to reflect with an angle of output that is same as the angle of incidence. The light beam C1 is combined at the wavelength dispersing element 6 after passing through the lens 28 and incident on the birefringent plate 35b. The birefringent plate 35b allows the light beam C1 that is incident with the polarization angle of 0° to pass straight as it is, and outputs as a light beam A1. The light beam A1 without passing through the wavelength plate 39, passes straight through the birefringent plate 35a again and is output to the optical fiber 3a via the collimating lens 4a.

A switching operation of an optical path of the desired wavelength λ1 in the light beam A after the light beam A with the polarization angle of 90° is incident on the optical fiber 3a is described below. The light beam C2 with the polarization angle of 90° is incident on the polarization control device 19. When ON control of the polarization control device 19 is performed, the polarization control device 19 rotates only the polarization angle of the wavelength λ1 of the light beam C2 that is incident through 90° and reflects it. The light beam C1 that is reflected from the polarization control device 19 is refracted at the birefringent plate 35b and is switched towards the light beam B1. The polarization angle of the light beam B1 is rotated through 90° (polarization angle 0°) by the wavelength plate 39 and the light beam B1 is incident on the birefringent plate 35a. The light beam B1 passes straight through the birefringent plate 35a and is output to the optical fiber 3b via the collimating lens 4b. The light beam A of components other than the wavelength λ1 (i.e. components of wavelengths λ2 to λn) in the light beam A that is input to the optical fiber 3a is output from the optical fiber 3a without the optical path of the light beam A being switched.

Thus, the wavelength selector switch 31 is described by referring mainly to the input of the light beam to the optical fiber 3a. Similarly, an optical path of the light B that is input to the optical fiber 3b can also be switched.

Thus, according to the wavelength selector switch 31 according to the fourth embodiment, even if the polarization angle of the light beam A that is incident is 0° or 90°, the optical path can be switched similarly. In other words, the wavelength selector switch 31 that is not dependent on the polarization, can be structured. Moreover, optical path of only desirable wavelengths of light beams of two systems or all wavelengths of light beams of two systems can be switched to the optical path of the other system. Therefore, an all-optical cross-connect that has two inputs and two outputs is possible. According to the structure in the fourth embodiment, due to the use of the reflection-type polarization control device 19, length of an optical path in an apparatus can be reduced to half as compared to that in the first embodiment.

Figures 15A, 15B:
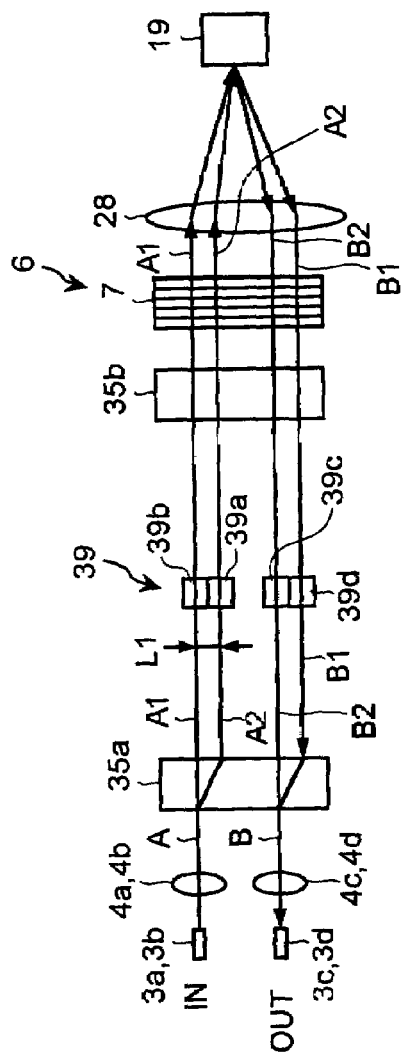
FIG. 15A is a side view of the wavelength selector switch according to the fifth embodiment of the present invention.
FIG. 15B is an illustration of optical path switching according to a polarization angle of a light beam according to the fifth embodiment of the present invention.

A fifth embodiment of a wavelength selector switch according to the present invention is described below. FIG. 13 is a perspective view of a structure of still another wavelength selector switch of reflection-type according to the fifth embodiment of the present invention. FIG. 14 is a front view of a position of a wavelength plate that is used in the wavelength selector switch according to the fifth embodiment of the present invention. FIG. 15A is a side view of the wavelength selector switch and FIG. 15B is an illustration of optical path switching according to a polarization angle of a light beam according to the. The polarization angle is indicated by arrows (→ and ↑). The arrow→ indicates the polarization angle of 0° and the arrow ↑ indicates the polarization angle of 90°.

A wavelength selector switch 41 according to the fifth embodiment has a structure that is almost similar to the reflection-type wavelength selector switch 31 that is described in the fourth embodiment (see FIG. 12). In the wavelength selector switch 41 unlike in the wavelength selector switch according to the fourth embodiment, two birefringent plates that are used are disposed in positions such that the angle of refraction of a light beam passing through the birefringent plates are perpendicular to each other and two optical input ports and two optical output ports are disposed by changing the position of the wavelength plate. Thus, according to the fifth embodiment, the all-optical cross-connect is possible without using the circulator. In the fifth embodiment, the components that are identical to those in the first, second, third, and fourth embodiment are indicated by the same reference numerals.

Following is a concrete description of the structure of the wavelength selector switch 31 according to the fifth embodiment. A light beam A that is output from the end surface of the optical fiber 3a of the optical input port after being transmitted from the first optical transmission path is turned into a parallel light beam by the collimating lens 4a. The parallel light beam is incident on the birefringent plate 35a. The birefringent plate 35a switches an output angle according to polarization of the light beam A. In an example shown in the diagram, when the polarization angle of the light beam A that is incident is 0°, the light beam A1 is allowed to pass straight and when the polarization angle of the light beam A that is incident is rotated through 90°, the beam is refracted in a direction inclined downward and is output as a light beam A2 from a position that is away by a predetermined distance. Detailed description on the side of the optical fiber 3b which is the optical input port 2 is omitted here. However, a structure similar to that of the optical input port 1 is disposed by the side.

The collimating lens 4c and the optical fiber 3c that is the optical output port 1 are provided below the collimating lens 4a and the optical fiber 3a that is the optical input port 1. Similarly, the collimating lens 4d and the optical fiber 3d that is the optical output port 2 are provided below the collimating lens 4b and the optical fiber 3b that is the optical input port 2.

The wavelength plate 39 that is a plate like λ/2 plate which is disposed behind the birefringent plate 35a includes a wavelength plate 39a in an optical path of the light beam A2 from the light beam A that is incident on the optical input port 1 (optical fiber 3a) as shown in FIG. 14. The wavelength plate 39a is also provided in an optical path of the light beam A1 in the light beam A that is incident on the optical input port 2 (optical fiber 3*b*). The wavelength plate 39 is also provided to the optical output port and includes a wavelength plate 39*c* in an optical path of a light beam B1 in a light beam B that is output to the optical output port 1 (optical fiber 3*c*). The wavelength plate 39*c* is also provided in a optical path of a light beam B2 in the light beam B that is output to the optical output port 2 (optical fiber 3*d*). Thus, the wavelength plate 39*a* rotates the polarization angle of the light beam A2 of the optical input port 1 through 90°. The wavelength plate 39*b* rotates the polarization angle of the light beam A1 of the optical input port 2 through 90°. The wavelength plate 39*c* rotates the polarization angle of the light beam B2 of the optical output port 1 through 90°. The wavelength plate 39*d* rotates the polarization angle of the light beam B1 of the optical output port 2 through 90°.

Due to this, in the light beam A of the optical input port 1, the polarization angle of the light beam A2 that has passed through the wavelength plate 39*a* is matched with the polarization angle of the light beam A1. The light beam A (A1 and A2) are incident on the birefringent plate 35*b*.

The birefringent plate 35*b* is provided for switching of optical paths such that the light beam A that is incident from the optical input port 1 and the optical input port 2, is output through the same optical path. The polarization angle of the light beam that is incident on the optical input port 1 and the polarization angle of the light beam that is incident on the optical input port 2 differ by 90°. The direction of refraction in the birefringent plate 35*b* is a horizontal direction in FIG. 15 and is perpendicular to the direction of refraction (upward and downward directions) in the birefringent plate 35*a*.

The thickness of the birefringent plate 35*b* corresponds to a distance of the light beams A that are incident from the optical input port 1 and the optical input port 2. Therefore, it is possible to shorten the distance between the positions of incidence as compared to that in the structure shown in the fourth embodiment and to have a thinner birefringent plate. In the light beam B of the optical output port 1, the polarization angle of the light beam B1 that has passed through the wavelength plate 39*d* is matched with the polarization angle of the light beam B2. The birefringent plate 35*b* is also positioned in the optical path of the light beam B of the optical output port 2 and the optical path of the light beam B can also be switched similarly.

The wavelength dispersing element 6, the lens 28, and the reflection-type polarization control device 19 that are described below are disposed behind the birefringent plate 35*b*. Optical paths of the light beam A and B are described by referring mainly the polarization control device 9. An angle of incidence of the light beam A1 and an output angle of the light beam B2 match with each other. Similarly, an angle of incidence of the light beam A2 and an output angle of the light beam B2 match with each other. Angles of incidence of the light beam A1 and A2 and output angles of the beams B1 and B2 corresponding to the polarization control device 19 are set by the lens 28.

Further, a switching operation of the optical path of the light beam A that is incident on the optical input port 1 is described by referring to FIG. 15A. Following is a description of an optical path when an optical beam A having the polarization angle of 0° is incident on the optical fiber 3*a* that is the optical input port 1. The optical beam A having the polarization angle of 0° passes straight through the birefringent plate 35*a* and passes through the optical path of the light beam A1. The light beam A then passes above the wavelength plate 39*a* (does not pass through the wavelength plate 39*a*) and is incident on the birefringent plate 35*b*. The polarization angle of the light beam A1 being 0°, the light beam passes straight through the birefringent plate 35*b* and is incident on the wavelength dispersing element (diffraction grating 7 in an example in the diagram). The wavelength dispersing element 6 disperses the wavelength of the light beam A1 into the wavelengths λ1 to λn. The light beam A1 having the wavelength dispersed, is incident on the lens 28. The lens 28 changes the light beam A1 to a parallel light and allows the parallel light to incident on the polarization control device 19 with a certain angle of incidence.

The polarization control device 19 is a reflection-type polarization control device similar to that in the third embodiment and is formed as an array of a plurality of polarization control elements to switch the polarization angle according to wavelengths λ1 to λn. Each polarization control element in the array of the polarization control device 19 performs separate (independent) ON/OFF control. When the polarization angle of the light beam A1 is not switched, the polarization control device 19 is OFF and does not change the polarization angle of the light beam A1 of wavelengths λ1 to λn that is incident.

The polarization control device 19 reflects a light beam B1 with an angle of output same as the angle of incidence. The light beam B1 is combined at the wavelength dispersing element 6 after passing through the lens 28 and then incident on the birefringent plate 35*b*. Since the polarization angle of the light beam B1 that is incident is 0°, the birefringent plate 35*b* allows the light beam B1 to pass straight and incident on the wavelength plate 39*d*. The wavelength plate 39*d* rotates the polarization angle of the light beam B1 through 90° and allows to incident on the birefringent plate 35*a*. The birefringent plate 35 refracts the light beam B1 having the polarization angle of 90° and outputs a light beam B. The light beam B is output to the optical fiber 3*c* of the optical output port via the collimating lens 4*c*.

Further, a switching operation of an optical path of desired wavelength λ1 in the light beam A after the light beam A with the polarization angle of 0° is incident on the optical fiber 3*a* of the optical input port 1 is described below. The light beam A1 with the polarization angle of 0° is incident on the polarization control device 19. Due to ON control of the polarization control device 19, the polarization control device 19 rotates only the polarization angle of the wavelength λ1 in the light beam A1 that is incident through 90° and reflects it. A light beam B1 that is rotated through 90° and reflected from the polarization control device 19 is combined in the wavelength dispersing element 6 and then switched from the optical path of port 1 to the optical path of port 2 by the birefringent plate 35*b*. The light beam B1 passes below the wavelength plate 39*c* (does not pass through the wavelength plate 39*c*) and is incident on the birefringent plate 35*a*. The light beam B1 is then refracted by the birefringent plate 35*a* and output from the optical fiber 3*d* of the optical output port 2 via the collimating lens 4*d*. The light beam A of components other than the wavelength λ1 (i.e. components of wavelengths λ2 to λn) in the light beam A that is input to the optical fiber 3*a* of the optical input port 1 is output from the optical fiber 3*c* of the optical output port 1 without the optical path of the light beam A being switched.

An optical path when the light A is incident on the optical fiber 3*a* of the optical input port 1 with the polarization angle of 90° is described below. The light beam A advances through an optical path of the beam light A2 that is refracted by the birefringent plate 35*a*. The polarization angle of the light beam A is rotated through 90° by the wavelength plate 39*a* and the light beam A is incident on the birefringent plate 35*b* with the polarization angle of 0°. The light beam A2 that has passed through the birefringent plate 35b (polarization angle 0°) is changed to a parallel light beam and is incident on the polarization control device 19 with a certain angle of incidence.

When the polarization angle of the light beam A2 is not switched, the polarization control device 19 is OFF and the polarization angle of the light beam A2 having wavelengths λ1 to λn that is incident is not changed. In this case, the polarization control device 19 causes the light beam B2 to reflect with an angle of output that is same as the. angle of incidence. The light beam B2 is combined at the wavelength dispersing element 6 after passing through the lens 28 and incident on the birefringent plate 35b. The birefringent plate 35b causes the light beam B2 that is incident with the polarization angle of 0° to pass straight as it is. The light beam B2 passes above the wavelength plate 39d (does not pass through the wavelength plate 39d) and is incident on the birefringent plate 35a. The light beam B2 then passes straight through the birefringent plate 35a and is output to the optical fiber 3a via the collimating lens 4a.

A switching operation of an optical path of the desired wavelength λ1 in the light beam A after the light beam A with the polarization angle of 90° is incident on the optical fiber 3a of the optical input port 1 is described below. The light beam A2 with the polarization angle of 0° is incident on the polarization control device 19. When ON control of the polarization control device 19 is performed, the polarization control device 19 rotates only the polarization angle of the wavelength λ1 of the light beam A2 that is incident through 90° and reflects it. The light beam B2 that is reflected from the polarization control device 19 and the polarization angle of which is rotated through 90° is refracted at the birefringent plate 35b and switched from the optical path of the port 1 to that of port 2. The polarization angle of the light beam B2 is rotated through 90° (polarization angle 0°) by the wavelength plate 39c and the light beam B2 is incident on the birefringent plate 35a. The light beam B2 then passes straight through the birefringent plate 35a and is output to the optical fiber 3d of the optical output port 2 via the collimating lens 4d. The light beam A of components other than the wavelength λ1 (i.e. components of wavelengths λ2 to λn) in the light beam A that is input to the optical fiber 3a of the optical input port 1 is output from the optical fiber 3c of the optical output port 1 without the optical path of the light beam A being switched.

Thus, the wavelength selector switch 41 is described by referring mainly to the optical path switching of the light beam A to the optical fiber 3a that is the optical input port 1. Similarly, an optical path of the light beam B that is input to the optical fiber that is the optical input port 2 can be switched and the light beam B can be output from the optical output ports 1 or 2.

Due to this, as shown in FIG. 13, when the light beam of wavelengths λ1, λ2, and λ3 of the optical fiber 3a that is the optical input port 1 and the light beam of wavelengths λa, λb, and λc of the optical fiber 3b that is the optical input port 2 are input to the wavelength selector switch 41, by switching the optical path upon selecting the desired wavelengths only, the light beams of wavelengths λa, λ2, and λc are output from the optical fiber 3c through the optical output port 1 as well as the light beam of wavelengths λ1, λb, and λ3 are output from the optical fiber 3d through the optical output port 2. In this case, λ1 =λa, λ2=kb, and λ3=λc.

Thus, according to the fifth embodiment, the size of the wavelength selector switch can be reduced by disposing a birefringent plate for dividing wavelengths and a birefringent plate for switching of an optical path such that the directions (angles) of refraction of the light beam (directions of shift of the beam) become perpendicular to each other. Particularly, in the structure that is shown in the fourth embodiment (FIG. 12), the directions (angles) of refraction of the light beam due to the two birefringent plates 35a and 35b are the same upward and downward directions. In such structure, the birefringent plate 35b in the rear part that is for switching the optical path has to have a considerable thickness W to match the two optical paths A and B with the optical path C. This results in increase in the size and the cost. Since the birefringent plate 35b has a constant angle of refraction, farther the positions of incidence of the optical paths A and B from each other, the thickness W increases inevitably.

According to the structure in the fifth embodiment, the directions of refraction of the light beams are made to be perpendicular to each other with the two birefringent plates 35a and 35b. Therefore, even if output positions of a plurality of light beams in the birefringent plate 35 in the front part are away from each other, there is no increase in the thickness W of the birefringent plate 35b in the rear part and a thin plate can be used as the birefringent plate 35b in the rear part.

Thus, according to the wavelength selector switch 41 according to the fifth embodiment, even if the polarization angle of the light beam A that is incident is 0° or 90°, the optical path can be switched similarly. In other words, the wavelength selector switch 41 that is not dependent on the polarization can be structured. Moreover, optical path of only desirable wavelengths of light beams of two systems or all wavelengths of light beams of two systems can be switched to the optical path of the other system. Therefore, an all-optical cross-connect that has two inputs and two outputs is possible. According to the structure in the fifth embodiment, due to the use of the reflection-type in the structure, length of an optical path in an apparatus can be reduced to half as compared to that in the first embodiment. Further, since it is possible to have a thin birefringent plate 35b for the switching of an optical path in the rear part, the component cost can be reduced and an optical path can be made shorter compared to that in the fourth embodiment.

Thus, according to the embodiments of the present invention, the all-optical cross-connect can be achieved without using the micro mirror array. Thus a setting and release (cancellation) of dynamic path based on wavelength information for each node of an optical network in WDM communication can be performed.

Figure 16:
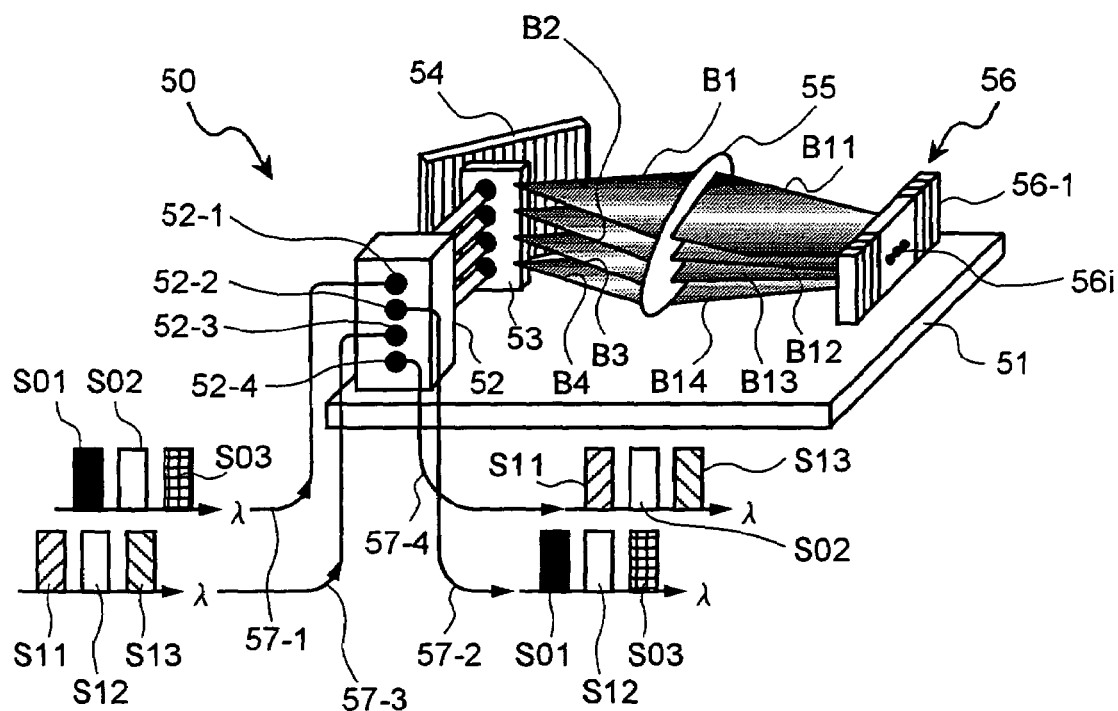
FIG. 16 is a schematic perspective view of a polarization-control wavelength-selector switch according to a sixth embodiment.
Figure 17:
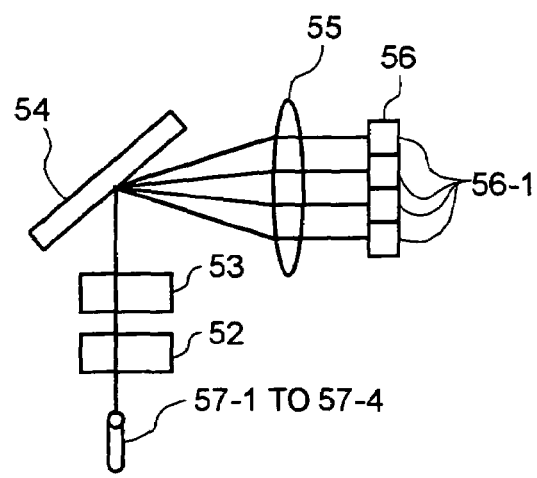
FIG. 17 is a top view of a positional relationship of components of the polarization-control wavelength-selector switch according to the sixth embodiment.

FIGS. 16 and 17 are diagrams of a sixth embodiment according to the present invention. FIG. 16 is a schematic perspective view of a polarization-control wavelength-selector switch 50 according to the sixth embodiment. FIG. 17 is a top view of a positional relationship of components of the polarization-control wavelength-selector switch 50. As shown in FIG. 16 or FIG. 17, the polarization-control wavelength-selector switch 50 includes a substrate 51. A fiber collimator 52, a polarization beam splitter 53, a diffraction grating 54, a lens 55, and a magneto-optical element array 56 are disposed on the substrate 51. The arrangement on the substrate 51 realizes an all-optical cross-connect.

In FIG. 16, although the components 52 to 56 of the polarization-control wavelength-selector switch 50 are disposed on the substrate 51, the components 52 to 56 may be-included in a casing.

The fiber collimator (a first collimator and a second collimator) 52 includes input ports 52-1 and 52-3 and output ports 52-2 and 52-4. The input ports 52-1 and 52-3 receive wavelength-multiplexed optical signal from optical fibers 57-1 and 57-3 and the output ports 52-2 and 52-4 receive wavelength-multiplexed optical signal from optical fibers 57-2 and 57-4. In other words, the optical fibers 57-1 and 57-3 for input are connected to the input ports 52-1 and 52-3 and the optical fibers 57-2 and 57-4 for output are connected to the output ports 52-2 and 52-4.

In the polarization-control wavelength-selector switch 50 shown in FIG. 16, wavelength-multiplexed optical signals S01 to S03 are incident from the optical fiber 57-1 and wavelength-multiplexed optical signals S11 to S13 are incident from the optical fiber 57-3. The optical signals S01 and S11 have same wavelength $\lambda 1$, the optical signals S02 and S12 have same wavelengths $\lambda 2$, and the optical signals S03 and S13 have same wavelengths $\lambda 3$.

In FIG. 16, due to the polarization-control wavelength-selector switch 50, the optical signals S02 and S12 of wavelength $\lambda 2$ are transmitted from the optical fibers 57-1 and 57-3 to optical fibers 57-4 and 57-2 respectively. The optical signals S01 and S11 of wavelength $\lambda 1$ are transmitted from the optical fibers 57-1 and 57-3 to the optical fibers 57-2 and 57-4 upon changing an output path. The optical signals S03 and S13 of wavelength $\lambda 3$ are transmitted from the optical fibers 57-1 and 57-3 to the optical fibers 57-2 and 57-4 upon changing an output path.

Due to this, the fiber collimator 52 collimates the wavelength-multiplexed optical signals from the input ports 52-1 and 52-3 roughly to parallel optical signals. The fiber collimator 52 collimates the wavelength-multiplexed output optical signals roughly to parallel optical signals and outputs the collimated optical signals to the optical fibers 57-2 and 57-4 via the output ports 52-2 and 52-4.

FIGS. 18 to 21 are illustrations of functions of the polarization beam splitter 53 and an optical combination of the diffraction grating 54, the lens 55, and the polarization control elements array 56 for a polarization component that is split at the polarization beam splitter 53.

Figure 18:
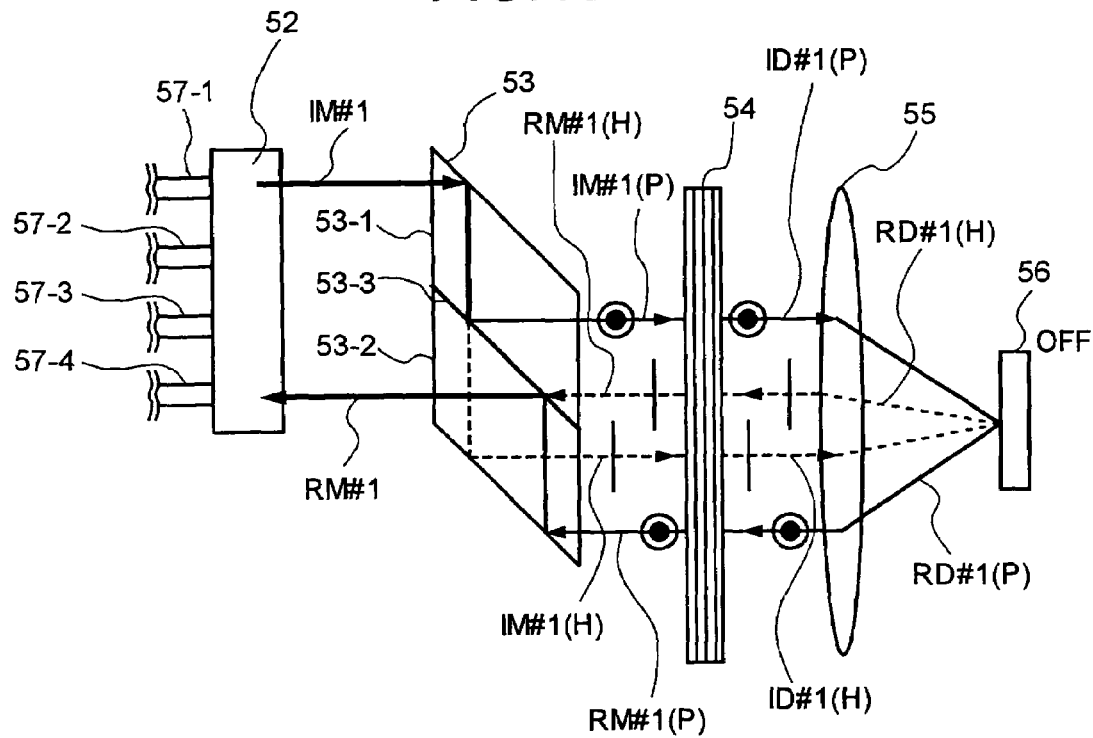
FIG. 18 is an illustration of key components of the polarization-control wavelength-selector switch according to the sixth embodiment.
Figure 19:
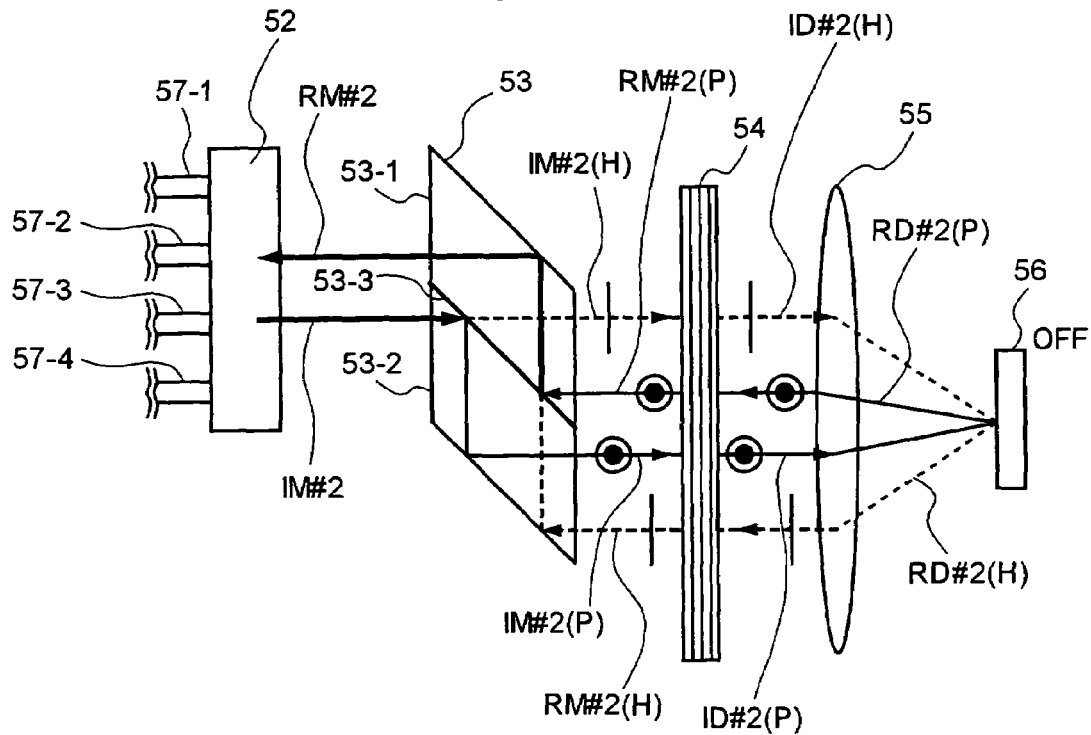
FIG. 19 is an illustration of key components of the polarization-control wavelength-selector switch according to the sixth embodiment.
Figure 20:
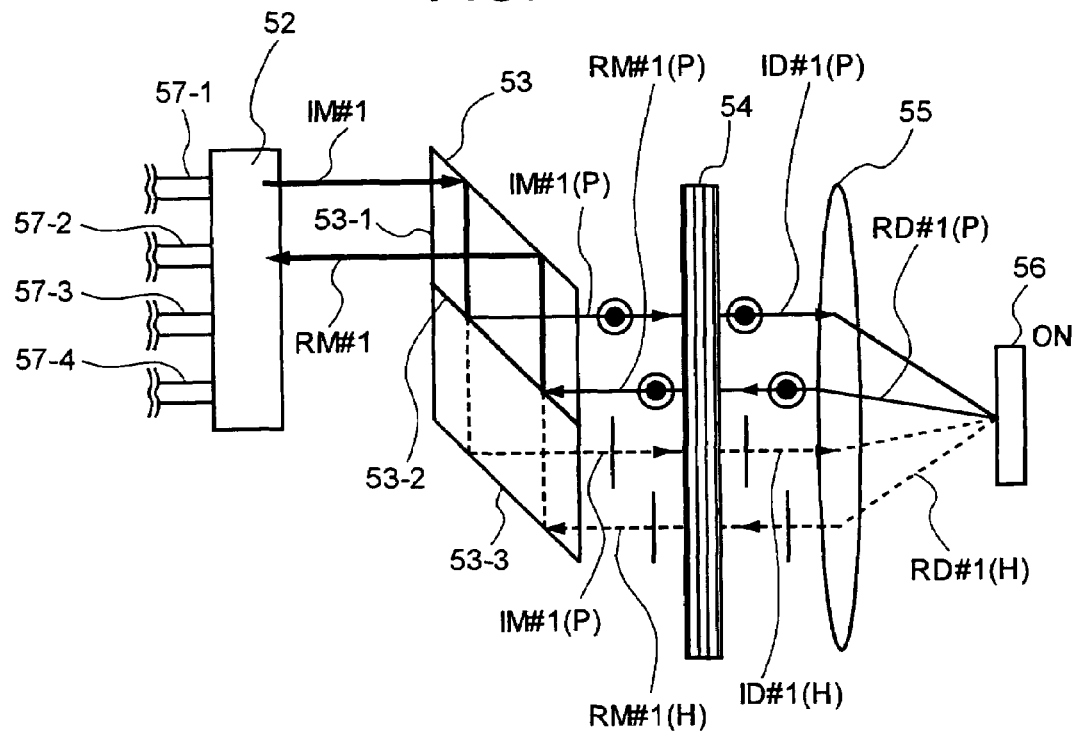
FIG. 20 is an illustration of key components of the polarization-control wavelength-selector switch according to the sixth embodiment.
Figure 21:
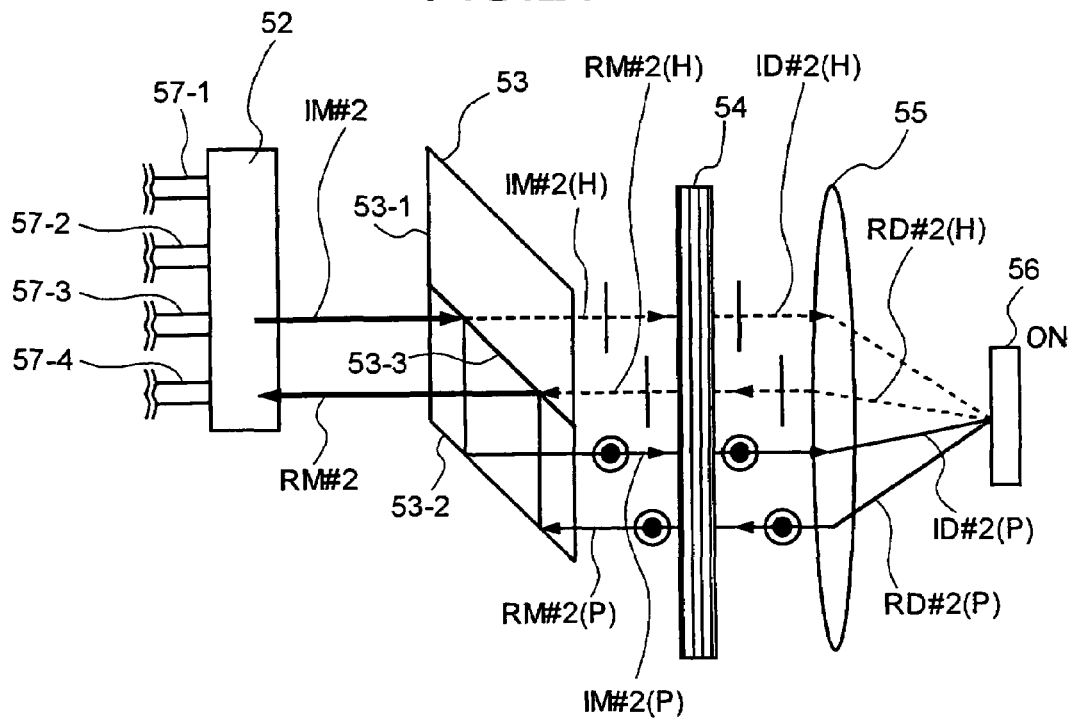
FIG. 21 is an illustration of key components of the polarization-control wavelength-selector switch according to the sixth embodiment.

FIG. 18 is an illustration of an optical path of an input optical signal from the optical fiber 57-1 when a corresponding polarization control element 56-1 (refer to FIG. 22) in the polarization control elements array 56 is put OFF. The input optical signal is output to the optical fiber 57-4. FIG. 19 is an illustration of an optical path of an input optical signal from the optical fiber 57-2 when a corresponding polarization control element 56-1 in the polarization control elements array 56 is put OFF. The input optical signal is output to the optical fiber 57-2. FIG. 20 is an illustration of an optical path of an input optical signal from the optical fiber 57-1 when a corresponding polarization control element 56-1 in the polarization control elements array 56 is put ON. The input optical signal is output to the optical fiber 57-2. FIG. 21 is an illustration of an optical path of an input optical signal from the optical fiber 57-3 when the corresponding polarization control element 56-1 in the polarization control elements array 56 is put ON. The input optical signal is output to the optical fiber 57-4.

The polarization beam splitter 53, as shown in FIG. 18 to 21, includes two optical glass materials 53-1 and 53-2 made of BK7 or quartz in a form of a rectangular pillar with cross sectional shape of a parallelogram, between which a dielectric multilayer 53-3 is sandwiched. A Glan laser prism, a Wollaston prism, and a Rochon prism can also be used to serve the purpose.

The polarization beam splitter 53 splits output positions of two wavelength-multiplexed optical signals from the fiber collimator 52 according to the positions of incidence and the directions of polarization. The wavelength-multiplexed optical signal that is split into two polarization components (for example, a vertical polarization component and a horizontal polarization component which are at right angles) functions as a polarization splitter that is output and functions as a polarization coupler as well as mentioned in the latter part. Thus, the incident optical signal is split into two polarization components that are at right angles and the two polarization components are output from different ports.

For example, the polarization beam splitter 53, as shown in FIG. 18 (or FIG. 20), splits a wavelength-multiplexed optical signal IM#1 that is propagated from the optical fiber 57-1 via the fiber collimator 52 into a vertical polarization component IM#1 (P) and a horizontal polarization component IM#1 (H). The two polarization components are output to the diffraction grating 54 from different output positions (for example, two points that are away from each other in direction perpendicular to a surface of the substrate 51).

Similarly, as shown in FIG. 19 (or FIG. 21), a wavelength-multiplexed optical signal IM#2 that is propagated from the optical fiber 57-3 via the fiber collimator 52 is split into a vertical polarization component IM#2(P) and a horizontal polarization component IM#2(H). The two polarization components are output to the diffraction grating 54 from different output positions.

The diffraction grating 54 functions as a wavelength splitter that splits each wavelength component of the wavelength-multiplexed optical signal from the polarization beam splitter 53 as a polarization splitter. The diffraction grating 54 also functions as a wavelength coupler that is mentioned in the latter part. In other words, the diffraction grating 54 as the wavelength splitter, outputs the wavelength-multiplexed optical signals for which the polarization component is split at the polarization beam splitter 53 into IM#1 (P), IM#1 (H), IM#2(P), and IM#2(H), to the lens 55. The diffraction grating 54 outputs the wavelength-multiplexed optical signals that are roughly parallel to the substrate 51 but at different angles for each wavelength component.

Thus, as shown in FIGS. 18 to 21, a vertical polarization beam ID#1 (P) in the form of a beam that is spread in (a plane) parallel to the substrate 51 as a wavelength-split optical signal of the vertical polarization beam IM#1 (P) is output from the diffraction grating 54 (refer to beam B1 in FIG. 16). Similarly, a horizontal polarization beam ID#1(H) (refer to beam B3 in FIG. 16) as a wavelength-split optical signal of the horizontal polarization beam IM#1 (H) in the similar form, a vertical polarization beam ID#2(P) (refer to beam B3 in FIG. 16) as a wavelength-split optical signal of the vertical polarization beam IM#2(P) in the similar form, and a horizontal polarization beam ID#2(H) (refer to beam B1 in FIG. 16) as a wavelength-split optical signal of the horizontal polarization beam IM#2(H) are output.

The lens 55 collimates each wavelength-split optical signal that is split by the diffraction grating 54 as wavelength splitter, roughly into parallel beams. Thus, the lens 55 functions as a first lens that outputs the optical signal to the polarization control elements array 56 and as a second lens that is described in the latter part.

In other words, as shown in FIG. 16, the lens 55 collimates beams B1 and B3 that are wavelength-split beams which are output at different angles according to the wavelength component by the diffraction grating 54 and each wavelength component (polarization split component) is output as belt beams B11 and B13 that are propagated in a belt form.

Figure 22:
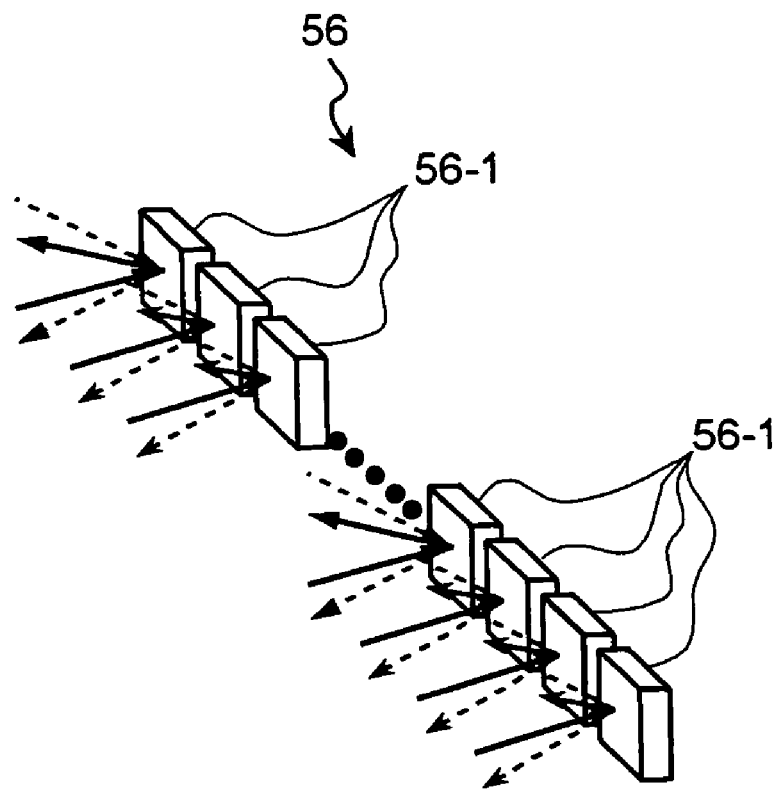
FIG. 22 is an illustration of key components of the polarization-control wavelength-selector switch according to the sixth embodiment.

The polarization control elements array 56 as shown in FIG. 22 includes the polarization control elements 56-1 disposed in an array form (a horizontal row in this case) with respect to wavelength-split beams from the lens 55. The polarization control elements 56-1 are arranged such that one polarization control element 56-1 is assigned to each wavelength-split beam corresponding to a type of wavelength of the wavelength-multiplexed optical signal from the optical fiber 57-1 or 57-3.

Each polarization control element 56-1 can change an angle of polarization of each wavelength-split beam by 90° by a control signal. The polarization control element includes for example, a magneto-optical element that turns the angel of polarization of an optical signal that is propagated by performing ON/OFF control of a magnetic field by a trigger signal caused by an electric signal. A polarization control element that includes Faraday rotators is desirable to be used as the polarization control element 56-1.

In other words, by using the magneto-optical element in the polarization control element 56-1, a switching in an order of a few hundreds of micro seconds is possible. By using a self-maintaining (self-holding) Faraday rotator, the electric power is required only while switching. Thus, as compared to a wavelength selector switch that uses an MEMS mirror in which the electric power is to be supplied continuously to maintain (hold) the mirror angle, the electric power required to operate equipment can be reduced to a great extent.

Figure 23:
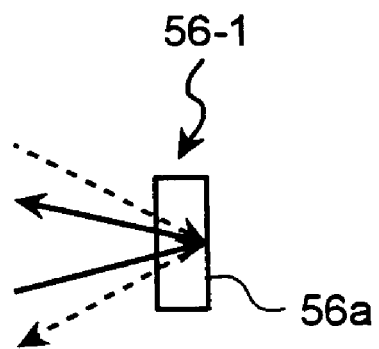
FIG. 23 is an illustration of key components of the polarization-control wavelength-selector switch according to the sixth embodiment.

As shown in FIG. 23, the polarization control element 56-1 includes a reflecting film 56a on a surface opposite to that facing the lens 55. The reflecting film 56a reflects the wavelength-split beam from an edge surface of incidence. Two polarization elements of the wavelength-split beam are incident on the reflecting film 56a on each polarization control element 56-1 after following different optical paths. By adjusting a curvature of lens 55 and a distance between the lens 55 and the polarization control element 56-1, beams of the polarization component are reflected through an optical path that is different than that of the incident beam. The reflected beams are subjected to polarization-coupling at the polarization beam splitter 53 and are incident on the optical fibers 57-2 and 57-4.

In other words, according to the sixth embodiment, the wavelength-multiplexed optical signals from the optical fiber 57-1 and 57-3 are subjected to wavelength selector switching. The wavelength-multiplexed optical signals that are subjected to the wavelength selector switching are propagated via the optical fibers 57-2 and 57-4 that are different than the optical fibers 57-1 and 57-3. For propagating the wavelength-multiplexed optical signal via the optical fibers 57-2 and 57-4 and not via the optical fibers 57-1 and 57-3, an optical path of the beam incident on the polarization control element 56-1 and an optical path of the beam output from the polarization control element 56-1 are different.

In FIG. 16, beams B12 and B14 are in the form of a belt. After the beams B1 3 and B11 in the belt form are reflected through different optical paths than those of the incident beams B13 and B11, each frequency component (for each polarization split element) is propagated as the beam B12 and B14 in the form of a belt. In other words, an angle of incidence of the beams 13 and 11 in the form of a belt on the polarization control element 56-1 is set to be different than 0°. By setting the angle of incidence different than 0°, the input ports 52-1 and 52-3 are made to be different than the output ports 52-2 and 52-4.

Thus, when a wavelength-split vertically polarized beam or horizontally polarized beam is incident on the polarization control element 56-1, the vertical polarization beam or the horizontal polarization beam is reflected from the reflecting film 56a. By changing the angle of polarization of each wavelength-split optical signal separately by the control signal, the vertical polarization beam that is reflected can be output as a horizontal polarization beam and the horizontal polarization beam that is reflected can be output as a vertical polarization beam.

In this case, the polarization control element 56-1 includes a Faraday rotator in which the angle of polarization can be changed to 0° or 45° by the control signal. The structure is such that when an optical signal passes through the polarization control element 56-1, the reflecting film 56a, and the polarization control element 56-1, a plane of polarization rotates through either 0° or 90° at an entrance and an exit of the polarization control element 56-1.

In the polarization control element 56-1 that has a control mode in which the polarization is not changed, the vertical polarization beam ID#1(P) that forms the beam B11 is reflected and output as a vertical polarization beam RD#1(P) that forms the reflected beam B14. The horizontal polarization beam ID#1(H) that forms the beam B13 is reflected and output as a horizontal polarization beam RD#1(H) (refer to FIGS. 16 and 18). Similarly, the vertical polarization beam ID#2(P) that forms the beam B13 is reflected and output as the vertical polarization beam RD#2(P) that forms the beam B12 and the horizontal polarization beam ID#2(H) that forms the beam B11 is reflected and output as the horizontal polarization beam RD#2(H) that forms the beam B14 (refer to FIGS. 16 and 19).

In the polarization control element 56-1 that has a control mode in which the polarization is changed, the vertical polarization beam ID#1(P) that forms the beam B11 is reflected upon turning the angle of polarization and is output as the horizontal polarization beam RD#1(H) that forms the beam B14 at an angle depending on an angel of incidence. The horizontal polarization beam ID#!(H) that forms the beam B13 is reflected upon turning the angle of polarization and is output as the vertical polarization beam RD#1(P) that forms the beam B12 at an angle depending on an angle of incidence (refer to FIG. 20). Similarly, the vertical polarization beam ID#2(P) that forms the beam B13 is reflected upon turning the angle of polarization and is output as the horizontal polarization beam RD#2(H) that forms the beam B12 and the horizontal polarization beam ID#2(H) that forms the beam B11 is reflected upon turning the angle of polarization and is output as the vertical polarization beam RD#2(P) (refer to FIG. 21).

The lens 55 functions as the first lens and the second lens. When the lens 55 functions as the first lens, the lens 55 makes parallel the two polarization components that are at right angles as the wavelength-split beams that are reflected from each polarization control element 56-1 of the polarization control elements array 56. On the other hand, the lens 55 collects the beams that are spread in the form of a belt as the wavelength-split beams.

The diffraction grating 54 functions as a wavelength splitter and the wavelength coupler. The diffraction grating 54 when functions as the wavelength coupler, couples all wavelength-split beams collected at the lens 55 and outputs as the wavelength-multiplexed beams. In other words, the diffraction grating 54 outputs the wavelength-split beams from the lens 55 to the polarization beam splitter at an identical angle. In this case, the polarization is split.

Concretely, the polarization component of each wavelength-split beam that forms the beam B4 (the beam RD#1(P) or the beam RD#1(H) turned through 90° and the beam RD#2(H) or the beam RD#2(P) turned through 90°) in which the belt shaped beam B14 is gathered, is wavelength-multiplexed and output to the polarization beam splitter 53. The polarization component of each wavelength-split beam that forms the beam B2 (the beam RD#1 (H) or the beam RD#1 (P) turned through 90° and the beam RD#2(P) or the beam RD#2(H) turned through 90°) in which the belt shaped beam B12 is gathered, is wavelength-multiplexed and output to the polarization beam splitter 53.

The polarization beam splitter 53 as the polarization coupler performs polarization-coupling of the polarization element that is split at the polarization beam splitter 53 to its original condition for the wavelength-multiplexed beam from the diffraction grating 54. The polarization beam splitter 53 as the polarization coupler outputs the wavelength-multiplexed beam to output ports 52-2 and 52-4 by changing between the output ports 52-2 and 52-4 for each wavelength component for which the angle of polarization is changed at the polarization control element 56-1.

For example, for a wavelength component that is reflected from the polarization control element 56-1 that has a control mode for which the polarization is not changed, according to the optical fiber that propagates the wavelength-multiplexed beam that is input, the wavelength component that forms the wavelength-multiplexed beam from the optical fiber 57-1 is output through an optical path to the optical fiber 57-4 shown in FIG. 18. The wavelength component that forms the wavelength-multiplexed beam from the optical fiber 57-3 is output through an optical path to the optical fiber 57-2 shown in FIG. 19.

In other words, as shown in FIG. 18, at the polarization beam splitter 53, a horizontal polarization component RM#1 (H) and a vertical polarization component RM#1(P) of the wavelength component for which the polarization is not changed, are incident on positions that are different than those of the output beams IM#1(H) and IM#1(P) output to the diffraction grating 54. These reflected beams are polarization-coupled to original condition and are output as the wavelength-multiplexed RM#1 to the fiber collimator 52 via an optical path to the optical fiber 57-4.

Similarly, as shown in FIG. 19, at the polarization beam splitter 53, a horizontal polarization component RM#2(H) and a vertical polarization component RM#2(P) of the wavelength component for which the polarization is not changed, are incident on positions that are different than those of the output beams IM#2(H) and IM#2(P) output to the diffraction grating 54. These reflected beams are polarization-coupled to original condition and are output as the wavelength-multiplexed beams RM#2 to the fiber collimator 52 via the optical path to the optical fiber 57-2.

For a wavelength component that is reflected from the polarization control element 56-1 that has a control mode for which the polarization is changed, according to the optical fiber that propagates the wavelength-multiplexed beam that is input, the wavelength component that forms the wavelength-multiplexed beam from the optical fiber 57-1 is output through an optical path to the optical fiber 57-2 shown in FIG. 20. The wavelength component that forms the wavelength-multiplexed beam from the optical fiber 57-3 is output via the optical path to the optical fiber 57-4 shown in FIG. 21.

In other words, as shown in FIG. 20, at the polarization beam splitter 53, the horizontal polarization component RM#1(H) and the vertical polarization component RM#1(P) that are reflected from the polarization control element 56-1 that has a control mode for which the polarization is changed, are incident on a position that are different than those of the output beams IM#1(H) and IM#1(P) output to the diffraction grating 54. These reflected beams are polarization-coupled to original condition and are output as the wavelength-multiplexed RM#1 to the fiber collimator 52 via the optical path to the optical fiber 57-2.

Similarly, as shown in FIG. 21, at the polarization beam splitter 53, the horizontal polarization component RM#2(H) and the vertical polarization component RM#2(P) that are reflected from the polarization control element 56-1 that has a control mode in which the polarization is not changed, are incident on positions that are different than those of the output beams IM#2(H) and IM#2(P) output to the diffraction grating 54. These reflected beams are polarization-coupled to original condition and are output as wavelength-multiplexed beams RM#2 to the fiber collimator 52 via the optical path to the optical beam 57-4.

Therefore, at the polarization beam splitter 53, for a beam of wavelength component for which the angle of polarization is rotated, a the polarization control element 56-1, the output ports 52-2 and 52-4 that lead to the optical fibers 57-2 and 57-4 are changed and is output as the wavelength-multiplexed beam with the beam of wavelength component for which the angle of polarization is not turned.

Thus, the polarization beam splitter 53, the diffraction grating 54, and the lens 55 form a polarization splitting/wavelength splitting member to output the wavelength-multiplexed beam on the input side from the two input ports 52-1 and 52-4 as wavelength-split beams split into two polarization components in a parallel beam direction. The polarization beam splitter 53, the diffraction grating 54, and the lens 55 also form a polarization coupling/wavelength multiplexing member to output each wavelength-split component from the polarization control elements array 56 as wavelength-multiplexed beams coupled into original polarization component to any one of the output ports 52-2 and 52-4.

Thus, with such a structure, in the polarization-control wavelength-selector switch 50 according to the sixth embodiment of the present invention, according to the change in the angle of polarization of each wavelength-split beam due to the polarization control element 56-1 that forms the polarization control elements array 56, the output port is changed between the output ports 52-2 and 52-4 to which the optical signal is output for each wavelength component of the wavelength-multiplexed beam on the input side from each of the input ports 52-1 and 52-3. By changing the output port, the wavelength-multiplexed beam on the output side for which the wavelength component of the wavelength-multiplexed beam on the input side is changed, is output. Thus, a wavelength selector switch that is independent of the polarization and enables all-optical cross-connect which does not depend on the polarization of the incident beam, can be realized.

In other words, among the wavelength components that form the wavelength-multiplexed beam that is input from the optical fibers 57-1 and 57-3, the polarization control element 56-1 in a position corresponding to the wavelength component for which an output path is not changed (not changed at the wavelength selector switch 50), is put OFF by the control signal (the mode in which the polarization is not changed). Therefore, for a wavelength component of the optical signals S02 and S12 for example, that is not changed by the wavelength selector switch 50, as shown in FIGS. 18 and 19, the angle of polarization is not turned at the polarization control element 56-1 that reflects and the wavelength component from the optical fiber 57-1 that forms the wavelength-multiplexed beam is output to the optical fiber 57-4 via the output port 52-4. The wavelength component from the optical fiber 57-3 that forms the wavelength-multiplexed beam, is output to the optical fiber 57-2 via the output port 52-2.

When the output path is not changed by the wavelength selector switch 50, for example the optical signals S02 and S12 in FIG. 16 are input by the optical fibers 57-1 and 57-3 respectively to the wavelength selector switch 50 and output to the optical fibers 57-4 and 57-2 respectively. At this time, a corresponding polarization control element 56i is OFF, i.e. the corresponding polarization control element 56i is in the mode in which the polarization is not changed and the optical path is as shown in FIGS. 18 and 19.

In other words, in the polarization control elements array 56, by putting the polarization control element 56i that corresponds to the optical signal of wavelength λ2 OFF, the optical signal S02 is input from the optical fiber 57-1 via the port 52-1 and is output to the optical fiber 57-4 via the port 52-4. At the same time, the optical signal S12 is input from the optical fiber 57-3 via the port 52-3 and is output to the optical fiber 57-2 via the port 52-2.

Among the wavelength components that form the wavelength-multiplexed beam that is input from the optical fibers 57-1 and 57-3, the polarization control element 56-1 in a position corresponding to the wavelength component for which an output path is changed (changed at the wavelength selector switch 50), is put ON by the control signal (the mode in which the polarization is changed). Therefore, for a wavelength component of the optical signals S01 and S11 for example that is switched by the wavelength selector switch 50, as shown in FIGS. 20 and 21, the angle of polarization is turned at the polarization control element 56-1 that reflects and the wavelength component from the optical fiber 57-1 that forms the wavelength-multiplexed beam is output to the optical fiber 57-2 via the output port 52-2. The wavelength component from the optical fiber 57-3 that forms the wavelength-multiplexed beam is output to the optical fiber 57-4 via the output port 52-4.

When the output path is switched by the wavelength selector switch 50, for example, the signals S01 and S11 in FIG. 16 are input by the optical fibers 57-1 and 57-3 respectively to the wavelength selector switch 50, and output to the optical fibers 57-2 and 57-4 respectively. At this time, the corresponding polarization control element 56-1 is ON, i.e. the corresponding polarization control element 56-1 is in the mode in which the polarization is changed and the optical path is as shown in FIGS. 20 and 21.

In other words, in the polarization control elements array 56, by putting the polarization control element 56-1 that corresponds to the optical signal of wavelength λ1 ON, the optical signal S01 is input from the optical fiber 57-1 via the port 52-1 and is output to the optical fiber 57-2 via the port 52-2. At the same time, the optical signal S11 is input from the optical fiber 57-3 via the port 52-3 and is output to the optical fiber 57-4 via the port 52-4.

Thus, the polarization-control wavelength-selector switch 50 according to the sixth embodiment realizes the all-optical cross-connect.

Since the magneto-optical element is used as the polarization control element 56-1, a change of a few hundreds of micro seconds of the magnetic field is possible in the polarization control element 56-1 of a changing signal in the magnetic field condition, which is a wavelength switching signal. The response speed of the wavelength selector switch 50 is much faster than that of the wavelength selector switch in which the MEMS mirror is used. By using a self-maintaining (self-holding) Faraday rotator as the polarization control element 56-1, a trigger signal which rises only during changing of the magnetic field condition may be used. As a result, the electric power for maintaining the changing condition of the switch is required only during switching. Thus, as compared to the wavelength selector switch that uses the MEMS mirror, the electric power required can be reduced to a great extent.

Thus, the polarization-control wavelength-selector switch 50 according to the sixth embodiment of the present invention includes the polarization splitting/wavelength splitting member and the polarization coupling/wavelength multiplexing members 52 to 55 that are in common, and the polarization control elements array 56. According to the change in the angle of polarization of each wavelength-split optical signal from each polarization control element 56-1 in the polarization control elements array 56, the output ports 52-2 and 52-4 for each wavelength component of the input side wavelength-multiplexed optical signal from the input ports 52-1 and 52-3 are changed and the output side wavelength-multiplexed optical signal for which the wavelength component of the input side wavelength-multiplexed optical signal is changed, can be output respectively. Therefore, as compared to the wavelength selector switch that uses the MEMS mirror, a high speed operation can be achieved with a simple structure and a simple control. Moreover, the electric power required to operate the switch can be reduced to a great extent and the all-optical cross-connect can be achieved.

In other words, in a diagrammatic structure where input optical signals of same wavelength from the two ports are controlled by a same micro mirror unit, the all-optical cross-connect cannot be achieved. To realize the all-optical cross-connect by using the MEMS, a two dimensional control of a micro mirror is necessary. Due to this, the structure and the control become complicated. However, the polarization-control wavelength-selector switch 50 according to the sixth embodiment includes the polarization control elements array 56, the diffraction grating 55, and the polarization beam splitter 53, which are structured simply. Due to the simple structure, the all-optical cross-connect can be realized just by a simple ON/OFF control of the polarization control element 56-1 for each wavelength.

According to the present invention, the polarization control elements 56-1 that form the polarization control elements array 56 are structured such that the output optical signal of each wavelength-split beam is output after being reflected from the incident edge surface. Thus, the polarization beam splitter 53, the diffraction grating 54, and the lens 55 have the functions of the polarization splitting/wavelength splitting member and the polarization coupling/wavelength multiplexing member in common. Therefore, in addition to the advantages mentioned earlier, the number of components in the structure of the equipment can be reduced, thereby reducing the manufacturing cost and the size of the equipment.

Further, the two optical fibers 57-1 and 57-3 for input are connected to the two input ports 52-1 and 52-3 and the two optical fibers 57-2 and 57-4 for output are connected to the two output ports 52-2 and 52-4. Therefore, the structure can be made such that an optical circulator is not required, thereby further reducing the manufacturing cost.

Figure 24:
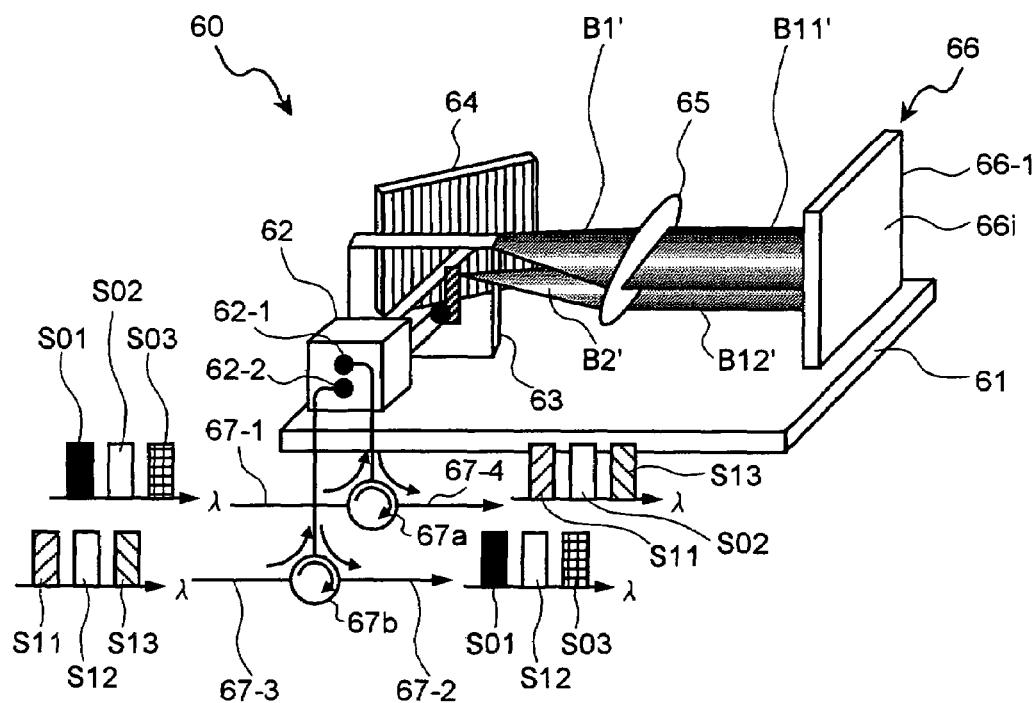
FIG. 24 is a schematic perspective view of a polarization-control wavelength-selector switch according to a seventh embodiment.

FIG. 24 is a schematic perspective view of a polarization-control wavelength-selector switch 60 according to a seventh embodiment of the present invention. In the polarization-control wavelength-selector switch 60 shown in FIG. 24, unlike in the polarization-control wavelength-selector switch 50 according to the sixth embodiment, two optical fibers 67-1 and 67-3 for input and two optical fibers 67-4 and 67-2 for output are connected to a fiber collimator 62 via optical circulators 67a and 67b.

The optical circulator 67a is installed between the optical fibers 67-1 and 67-4 for input. The optical circulator 67a propagates an input side wavelength-multiplexed optical signal from the optical fiber 67-1 to an input port 62-1 and propagates an output side wavelength-multiplexed optical signal to the optical fiber 67-4 that is in a direction opposite to an optical path of the input side wavelength-multiplexed optical signal.

Similarly, the optical circulator 67b is installed between the optical fibers 67-3 and 67-2 for output. The optical circulator 67b propagates the input side wavelength-multiplexed optical signal from the optical fiber 67-3 to an input port 62-2 and propagates an output side wavelength-multiplexed optical signal to the optical fiber 67-2 that is in a direction opposite to an optical path of the input side wavelength-multiplexed optical signal.

The fiber collimator 62 receives wavelength-multiplexed optical signals from the optical fibers 67-1 and 67-3. The fiber collimator 62 includes the input port 62-1 and the output port 62-2 for guiding the wavelength-multiplexed optical signal that is to be output to the optical fibers 67-4 and 67-2. In other words, the input port 62-1 and the output port 62-2 have in common, functions of the two input ports 52-1 and 52-3 and the two output ports 52-2 and 52-4 according to the sixth embodiment.

The fiber collimator 62 collimates the wavelength-multiplexed optical signal from the optical fibers 67-1 and 67-3 to roughly parallel beams. The fiber collimator 62 collimates the output beam of the wavelength-multiplexed optical signal to roughly parallel beams and outputs to the optical fibers 67-4 and 67-2.

In the polarization-control wavelength-selector switch 60 shown in FIG. 24, optical signals S01 to S03 of the wavelength-multiplexed beam are incident from the optical fiber 67-1 and optical signals S11 to S13 of the wavelength-multiplexed beam are incident from the optical fiber 67-3. The optical signals S01 and S11 have same wavelength λ1. The optical signals S02 and S12 have same wavelength λ2. The optical signals S03 and S13 have same wavelength λ3.

In FIG. 24, due to the polarization-control wavelength-selector switch 60, the optical signals S02 and S12 of wavelength λ2 are transmitted from the optical fibers 67-1 and 67-3 to the optical fibers 67-4 and 67-2 respectively. The optical signals S01 and 11 of wavelength λ1 are transmitted upon changing the output paths, from the optical fibers 67-1 and 67-3 to the optical fibers 67-2 and 67-4 respectively. The optical signals S03 and S13 of wavelength λ3 are transmitted upon changing the output paths, from the optical fibers 67-1 and 67-3 to the optical fibers 67-2 and 67-4 respectively.

A polarization beam splitter 63, a diffraction grating 64, and a lens 65 have functions of the polarization splitting/wavelength splitting member and the polarization coupling/wavelength multiplexing member similar to the polarization beam splitter 53, the diffraction grating 54, and the lens 55 in the sixth embodiment. However, unlike in the sixth embodiment, the lens 65 outputs the two polarization components of the wavelength-split optical signal directed to each polarization control element that forms a polarization control elements array 66 such that the polarization components are reflected in the same optical path at a reflecting film.

The polarization control elements array 66, similar to the polarization control elements array 56 according to the sixth embodiment, includes a plurality of polarization control elements 66-1 (refer to reference numeral 56-1) disposed in the form of an array and each polarization control element is provided with a reflecting film (refer to reference numeral 56a).

In each polarization control element 66-1 of the polarization control elements array 66, when vertical polarization beams or horizontal polarization beams of the wavelength-split optical signal are incident from the lens 65, the vertical polarization beams or the horizontal polarization beams are reflected at the reflecting film on the polarization control element 66-1. However, similarly as in the sixth embodiment, the angle of polarization of each wavelength-split beam is changed by a control signal such that the angle of polarization is turned through 90°. By changing the angle of polarization, the vertical polarization beam can be reflected and output as a horizontal polarization beam and the horizontal polarization beam can be reflected and output as a vertical polarization beam.

The polarization control element 66-1, similar to the polarization control element 56-1 in the sixth embodiment includes magneto-optical elements, desirably Faraday rotators. In this case, the polarization control element includes a Faraday rotator in which the angle of polarization can be changed to 0° or 45° by the control signal. The structure is such that when an optical signal passes through the polarization control element 66-1, the reflecting film, and the polarization control element 66-1, the plane of polarization turns through either 0° or 90° at an entrance and at an exit of the polarization control element 66-1.

The lens 65, similar to the lens 55 in the sixth embodiment, functions as a first lens and a second lens. The vertical polarization beam and the horizontal polarization beam of the wavelength-split optical signal that is reflected from each polarization control element are incident through the same optical path as that of the incident beam. However, similar to the case in the sixth embodiment, all wavelength-split beams that are divided in to two polarization elements are gathered together and output to the diffraction grating 64.

The diffraction grating 64, similar to the diffraction grating 54 in the sixth embodiment, functions as the wavelength splitter and the wavelength coupler. The diffraction grating 64 wavelength-splits the wavelength-multiplexed optical signal for which the polarization component from the polarization beam splitter 63 is split. The diffraction grating 64 wavelength-multiplexes the wavelength-split optical signal for which the polarization component from the lens 65 is split, and outputs to the polarization beam splitter 63.

The polarization beam splitter 63 has a structure similar to the polarization beam splitter 53 according to the sixth embodiment. The polarization beam splitter 63 functions as the polarization splitter and the polarization coupler. The polarization beam splitter 63 performs polarization-splitting of the wavelength-multiplexed optical signal that is input through the two ports 62-1 and 62-2 of the fiber collimator 62 into a beam of a vertical polarization component and a beam of a horizontal polarization component, and outputs. The polarization beam splitter 63 performs polarization-coupling of the wavelength-multiplexed optical signal in which the polarization component from the diffraction grating 64 is split, into its original condition and outputs by changing the output ports 62-1 and 62-2 for each wavelength for which the angle of polarization is changed at the polarization control element 66-1.

In other words, for the wavelength-multiplexed optical signals that are input from the optical fibers 67-1 and 67-3 via the ports 62-1 and 62-2, when the optical fibers 67-4 and 67-2 to which the optical signals are output for each wavelength component that forms the wavelength-multiplexed optical signal, are to be changed, the polarization control element 66-1 on which the wavelength-split optical signal that forms the wavelength component is incident, is controlled such that the angle of polarization of each polarization element of the wavelength-split optical signal that is incident is turned through 90°. By controlling in such a manner, the ports 62-1 and 62-2 to which output is made for each wavelength component for which the angle of polarization is turned through 90° at the polarization beam splitter 63 can be changed.

Thus, from such structure, an operation of the polarization-control wavelength-selector switch 60 according to the seventh embodiment of the present invention is described below with reference to FIGS. 25 to 28.

FIGS. 25 to 28 are illustrations of functions of the polarization beam splitter 63 and an optical combination of the diffraction grating 64, the lens 65, and the polarization control elements array 66 for a polarization component that is split at the polarization beam splitter 63.

Figure 25:
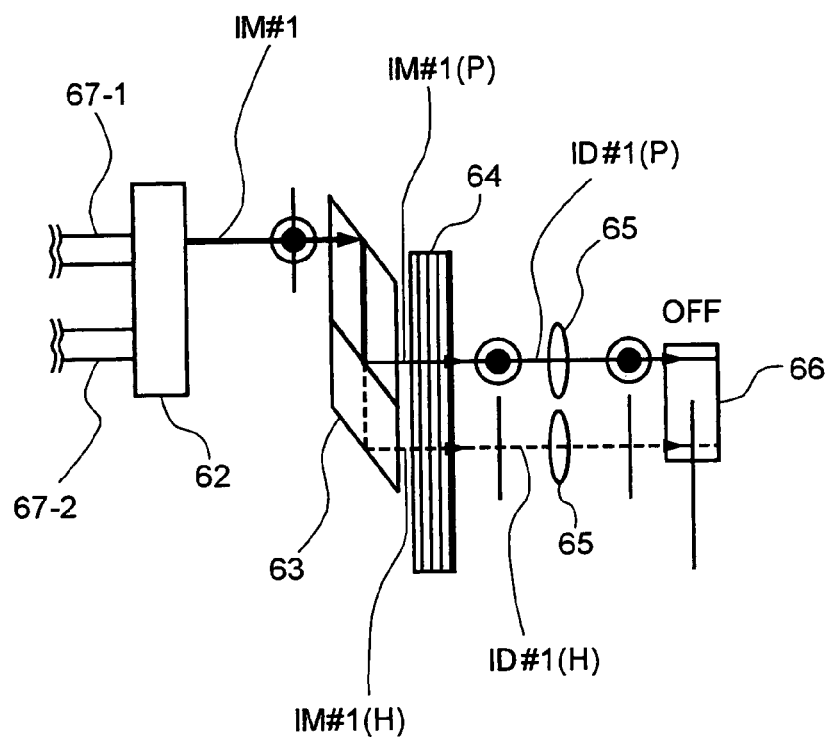
FIG. 25 is an illustration of an operation of the polarization-control wavelength-selector switch according to the seventh embodiment.
Figure 26:
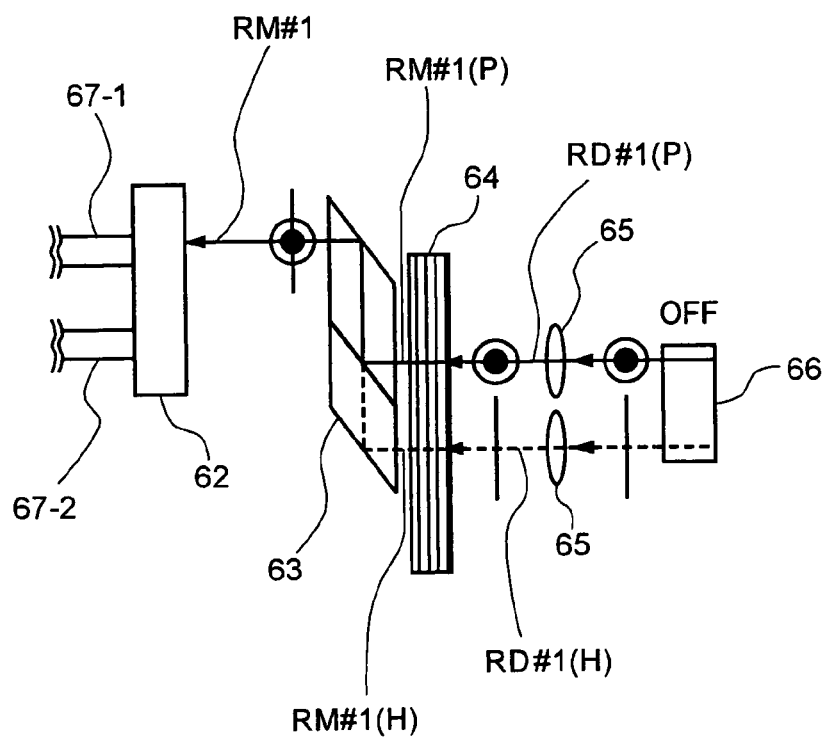
FIG. 26 is an illustration of an operation of the polarization-control wavelength-selector switch according to the seventh embodiment.
Figure 27:
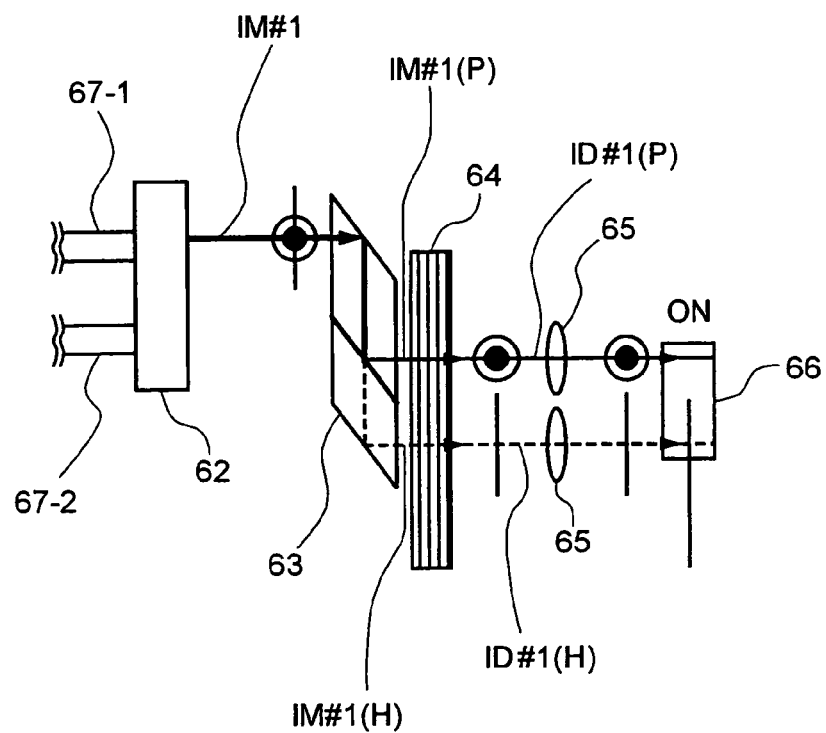
FIG. 27 is an illustration of an operation of the polarization-control wavelength-selector switch according to the seventh embodiment.
Figure 28:
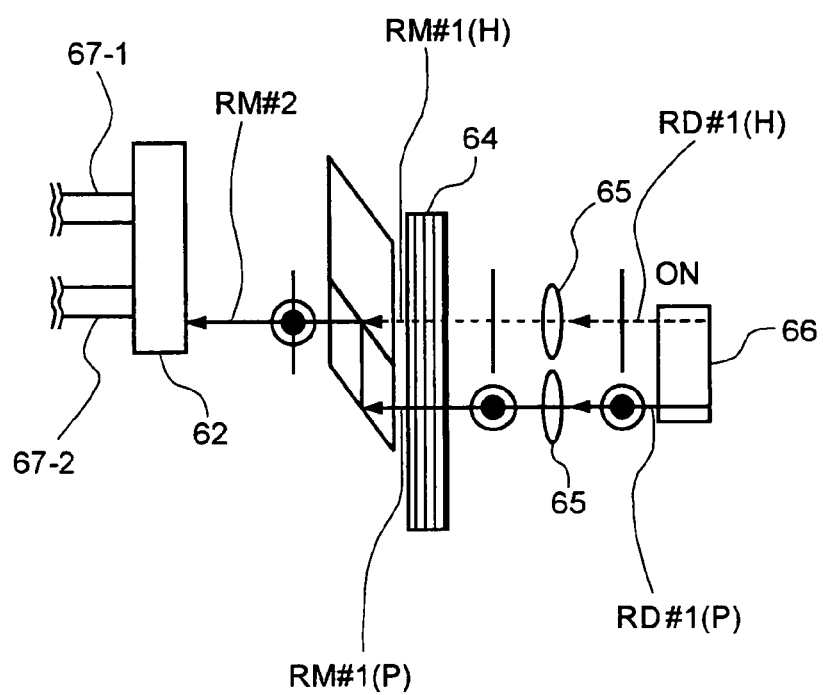
FIG. 28 is an illustration of an operation of the polarization-control wavelength-selector switch according to the seventh embodiment.

FIG. 25 is an illustration of an optical path of an input optical signal from the optical fiber 67-1 when a corresponding polarization control element 66-1 in the polarization control elements array 66 is put OFF. FIG. 26 is an illustration of an optical path of an optical signal reflected. FIG. 27 is an illustration of an optical path of an input optical signal from the optical fiber 67-1 when a corresponding polarization control element 66-1 in the polarization control elements array 66 is put ON. FIG. 28 is an illustration of an optical path of an optical signal reflected.

The polarization beam splitter 63, as shown in FIG. 25 (or FIG. 26), splits a wavelength-multiplexed optical signal IM#1 that is propagated from the optical fiber 67-1 via the fiber collimator 62 into a vertical polarization component IM#1(P) and a horizontal polarization component IM#1(H). The two polarization components are output to the diffraction grating 64 from different output positions (for example, two points that are away from each other in a direction perpendicular to a surface of a substrate 61).

The polarization beam splitter 63 also splits a wavelength-multiplexed optical signal that is propagated from the optical fiber 67-3 via the fiber collimator 62 into a horizontal polarization component and a vertical polarization component. The polarization beam splitter 63 outputs the horizontal polarization component through almost the same optical path as that of the vertical polarization component of the wavelength-multiplexed optical signal from the optical fiber 67-1. The polarization beam splitter 63 outputs the vertical polarization component through almost the same optical path as that of the horizontal polarization component of the wavelength-multiplexed optical signal from the optical fiber 67-1.

The diffraction grating 64 outputs the wavelength-multiplexed optical signals for which the polarization component is split at the polarization beam splitter 63 into IM#1(P) and IM#1(H). The diffraction grating 64 outputs the wavelength-multiplexed optical signals that are roughly parallel to the substrate 61 and at different angle for each wavelength component to the lens 65, thereby splitting the wavelength. The diffraction grating 64 outputs to the lens 65 a similar optical signal with wavelength-split for the polarization-split element of the wavelength-multiplexed optical signal from the optical fiber 67-2.

Thus, as shown in FIGS. 25 and 27, a vertical polarization beam ID#1 in the form of a beam that is spread in (a plane) parallel to the substrate 61 as a wavelength-split optical signal of the vertical polarization beam IM#1(P) is output from the diffraction grating 64 (refer to beam B1' in FIG. 24). Similarly a horizontal polarization beam ID#1(H) (refer to beam B2' in FIG. 24) as a wavelength-split optical signal of the horizontal polarization beam IM#1(H) is output.

The lens 65 collimates beams B1' and B2' that are wavelength-split optical signals, which are output at different angles according to the wavelength component by the diffraction grating 64 and each wavelength component (polarization-split component) is output as belt beams B11' and B12' that are propagated in a belt form.

At the polarization control elements array 66, the wavelength-split optical signal from the lens 65 (for which the polarization component is split) is incident. The angle of polarization of the polarization split component is changed separately for each wavelength component of each wavelength-split optical signal by the control signal.

In this case, when the polarization is not changed, the vertical polarization beam ID#1(P) that forms the beam B11' is reflected without turning the polarization and output as a vertical polarization beam RD#1(P) that forms the beam B11'. The horizontal polarization beam ID#1(H) that forms the beam B12' is reflected and output as a horizontal polarization beam RD#1(H) that forms the beam B12' (refer to FIGS. 24 and 26). Wavelength-split optical signal from the optical fiber 67-4 is reflected similarly.

In a case where the polarization is changed, the vertical polarization beam ID#1(P) that forms the beam B11' is reflected upon turning the angle of polarization and is output as the horizontal polarization beam RD#1(H) that forms the beam B11'. The horizontal polarization beam ID#1(H) that forms the beam B12' is reflected upon turning the angle of polarization and is output as the vertical polarization beam RD#1(P) that forms the beam B12' (refer to FIGS. 24 and 28). Wavelength-split optical signal from the optical fiber 67-4 is reflected similarly upon turning the angle of polarization.

At the diffraction grating 64, the polarization component of each wavelength-split beam that forms the beam B1' (the beam RD#1(P) or the beam RD#1(H) turned through 90°) in which the belt shaped beam B11' is gathered, is wavelength-multiplexed and output to the polarization beam splitter 63. The polarization component of each wavelength-split beam that forms the beam B2' (the beam RD#1(H) or the beam RD#1(P) turned through 90°) in which the belt shaped beam B2' is gathered at the lens 65 is wavelength-multiplexed and output to the polarization beam splitter 63.

At the polarization beam splitter 63, as shown in FIG. 26, a horizontal polarization component RM#1(H) and a vertical polarization component RM#1(P) of the wavelength component for which the polarization is not changed, are incident on positions that are different than those of the output beams IM#1(H) and IM#1(P) output to the diffraction grating 64. These reflected beams are polarization-coupled to original condition and are output as the wavelength-multiplexed beam RM#1 to the optical fiber 67-4 via the port 62-1. Among wavelength components that form the wavelength-multiplexed optical signal from the optical fiber 67-3, the wavelength component for which the polarization is not changed, is polarization-coupled and output to the optical fiber 67-2 via the port 62-2.

When the output path is not changed by the wavelength selector switch 60, for example the optical signals S02 and S12 in FIG. 24 are input by the optical fibers 67-1 and 67-3 respectively to the wavelength selector switch 60, and output to the optical fibers 67-4 and 67-2 respectively. At this time, a corresponding polarization control element 66*i* is OFF, i.e. the corresponding polarization control element is in the mode in which the polarization is not changed (refer to FIG. 25 and 26) In other words, in the polarization control elements array 66, by putting the polarization control element 66i that corresponds to the optical signal of wavelength λ2 OFF, the optical signal S02 is input from the optical fiber 67-1 via the port 62-1 and is output to the optical fiber 67-4 via the port 62-1. At the same time, the optical signal S12 is input from the optical fiber 67-3 via the port 62-2 and is output to the optical fiber 67-2 via the port 62-2.

In the polarization control elements array 66, as shown in FIG. 28, the horizontal polarization component RM#1(H) and the vertical polarization component RM#1 (P) in the wavelength component for which the polarization is changed, are incident. The reflected optical signals of these polarization components are polarization-coupled to their original condition and are output as the wavelength-multiplexed optical signal RM#2 to the output port 62-2 that leads to the optical fiber 67-2. Among the wavelength components that form the wavelength-multiplexed beam, which is input from the optical fiber 67-3, the wavelength component for which the polarization is changed is polarization-coupled similarly as in the previous case and is output as the wavelength-multiplexed optical signal RM#1 for which the output path is changed, to the optical fiber 67-4 via the port 62-1.

When the output path is changed by the wavelength selector switch 60, for example the signal S01 and S11 in FIG. 24 are input by the optical fibers 67-1 and 67-3 respectively to the wavelength selector switch 60 and output to the optical fibers 67-2 and 67-4 respectively. At this time, the corresponding polarization control element 66-1 is ON, i.e. the corresponding polarization control element 66-1 is in the mode in which the polarization is changed (refer to FIGS. 27 and 28).

In other words, in the polarization control elements array 66, by putting the polarization control element 66-1 that corresponds to the optical signal of wavelength λ1 ON, the optical signal S01 is input from the optical fiber 67-1 via the port 62-1 and is output to the optical fiber 67-2 via the port 62-2. At the same time, the optical signal S11 is input from the optical fiber 67-3 via the port 62-2 and is output to the optical fiber 67-4 via the port 62-1.

Thus the polarization-control wavelength-selector switch 60 according to the seventh embodiment realizes the all-optical cross-connect.

Thus, the polarization-control wavelength-selector switch 60 includes the polarization splitting/wavelength splitting member and the polarization coupling/wavelength multiplexing members 62 to 65 that are in common, and the polarization control elements array 66. According to the change in the angle of polarization of each wavelength-split optical signal from each polarization control element 66-1 in the polarization control elements array 66, the output ports 62-1 and 62-2 for each wavelength component of the input side wavelength-multiplexed optical signal from the input ports 62-1 and 62-2 are changed and the output side wavelength-multiplexed optical signal for which the wavelength component of the input side wavelength-multiplexed optical signal is changed, can be output respectively. Therefore, similarly as in the sixth embodiment, as compared to the wavelength selector switch that uses the MEMS mirror, a high speed operation can be achieved with a simple structure and a simple control. Moreover, the electric power required to operate the switch can be reduced to great extent and the all-optical cross-connect can be achieved.

According to the present invention, the polarization control elements 66-1 that form the polarization control elements array 66 are structured such that the output optical signal of each wavelength-split beam is output after being reflected from the incident edge surface. Thus, the polarization beam splitter 63, the diffraction grating 64, and the lens 65 have the functions of the polarization splitting/wavelength splitting member and the polarization coupling/wavelength multiplexing member in common. Therefore, the number of components in the structure of the equipment can be reduced, thereby reducing the manufacturing cost and the size of the equipment considerably.

Figure 29:
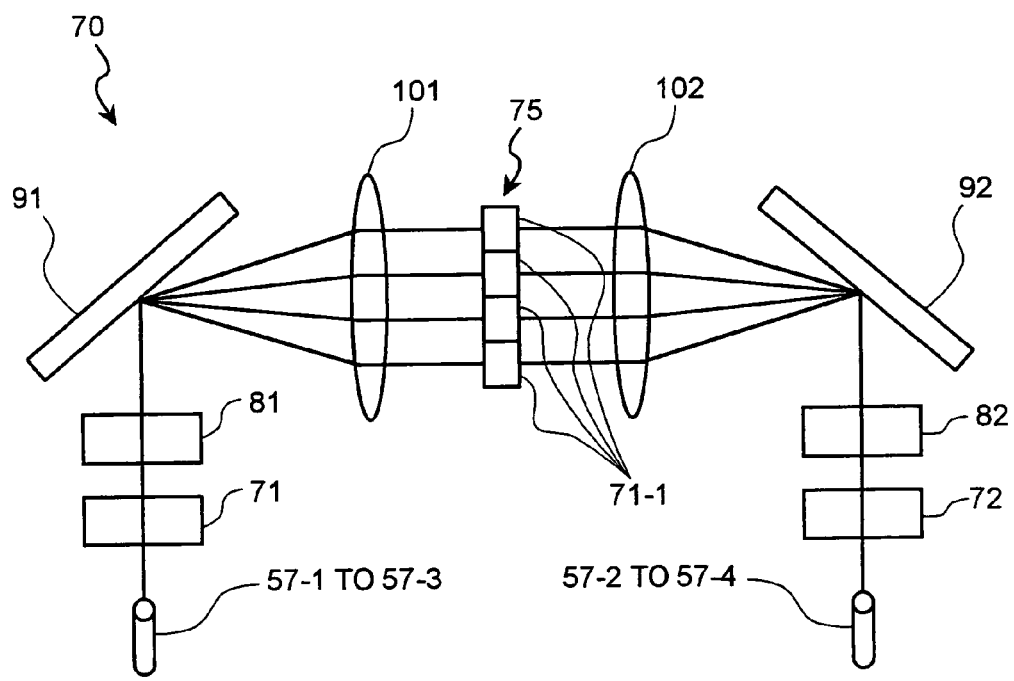
FIG. 29 is a schematic top view of a polarization-control wavelength-selector switch according to an eighth embodiment.
Figure 30:
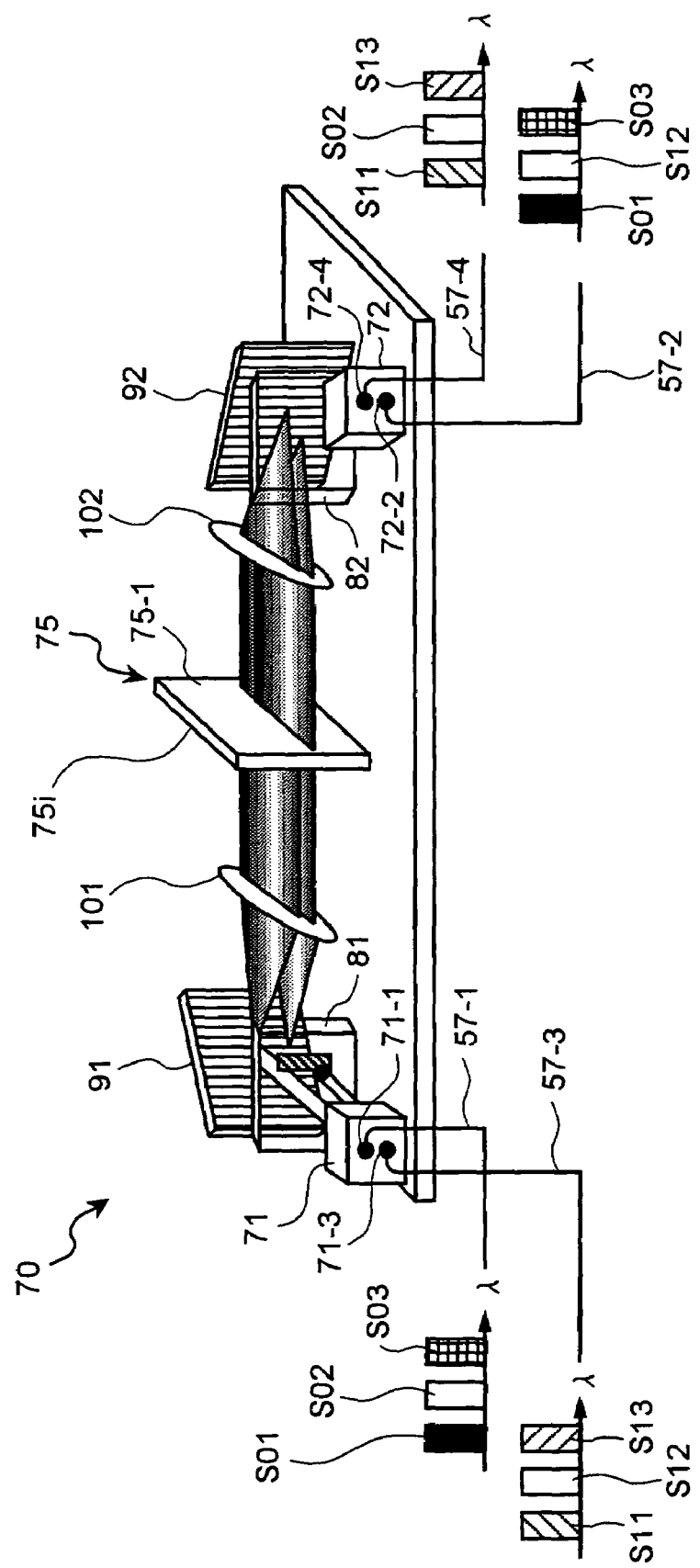
FIG. 30 is a schematic perspective view of the polarization-control wavelength-selector switch according to the eighth embodiment.

FIGS. 29 and 30 are diagrams of an eighth embodiment of the present invention. FIG. 29 is a schematic top view of a polarization-control wavelength-selector switch 70 according to the eighth embodiment. FIG. 30 is a schematic perspective view of the polarization-control wavelength-selector switch 70 according to the eighth embodiment. As shown in FIGS. 29 and 30, the polarization-control wavelength-selector switch 70, unlike the polarization-control wavelength-selector switches according to the sixth and seventh embodiments, includes a polarization control elements array 75 that is formed by transmission-elements. The functions of polarization splitting/wavelength splitting member and the polarization coupling/wavelength multiplexing member are performed by different elements. Reference numerals in FIGS. 29 and 30 identical to those in FIG. 16 indicate the identical components.

Fiber collimators 71 and 72 realize a function of the fiber collimator 52 in FIG. 16. Polarization beam splitters 81 and 82 realize a function of the polarization beam splitter 53. Diffraction gratings 91 and 92 realize a function of the diffraction grating 54. Lenses 101 and 102 realize a function of the lens 55.

The fiber collimator 71, as shown in FIG. 30, includes input ports 71-1 and 71-3 to receive wavelength-multiplexed optical signals from the optical fibers 57-1 and 57-3 for input. The fiber collimator 71 functions as a first collimator that collimates wavelength-multiplexed optical signals from the input ports 71-1 and 71-3 to roughly parallel beams.

The polarization beam splitter 81 functions as a polarization splitter that splits output position of each wavelength-multiplexed optical signal from the fiber collimator 71 according to incident position and the angle of polarization, and outputs as a wavelength-multiplexed optical signal split into two polarization components. The diffraction grating 91 functions as a wavelength splitter that splits each wavelength-multiplexed optical signal from the polarization beam splitter 81 into a wavelength component.

The lens 101 collimates each wavelength-split optical signal that is split by the diffraction grating 91 roughly into parallel beams and functions as a first lens that outputs the optical signal to the polarization control elements array 75. Thus, the fiber collimator 71, the polarization beam splitter 81, the diffraction grating 91, and the lens 101 form the polarization splitting/wavelength splitting member.

The polarization control elements array 75 includes the polarization control elements 75-1 disposed in the array form for which the angle of polarization of the polarization component can be changed by a control signal for each wavelength-split optical signal from the lens 101. Similarly as in the sixth and the seventh embodiments, the polarization control element 75-1 can be formed by magneto-optical elements, desirably by Faraday rotators. In this case, the polarization control element 75-1 includes a Faraday rotator in which the angle of polarization can be changed from 0° to 90°.

The lens 102 functions as a second lens that gathers all wavelength-split optical signals from the polarization control elements array 75. The diffraction grating 92 couples the wavelength-split optical signals that are gathered by the lens 102 and functions as the wavelength coupling element that outputs as the wavelength-multiplexed optical signal.

The polarization beam splitter 82 performs polarization-coupling of the polarization element that is split at the polarization beam splitter 81 to its original condition. The polarization beam splitter 82 functions as the polarization coupling element that outputs upon changing the output ports 72-2 and 72-4 to which an output is made for each wavelength component, for which the angle of polarization is changed at the polarization control elements array 75.

The fiber collimator 72 as shown in FIG. 30 includes output ports 72-2 and 72-4 that are connected to the optical fibers 57-2 and 57-4 respectively on the output side. The fiber collimator 72 functions as a second collimator that collimates two wavelength-multiplexed beams output from the polarization beam splitter 82 to roughly parallel beams, and outputs to the respective output ports.

Thus, the lens 102, the diffraction grating 92, the polarization beam splitter 82, and the fiber collimator 72 form the polarization coupling/wavelength multiplexing member.

In the polarization-control wavelength-selector switch 70 shown in FIGS. 29 and 30, wavelength-multiplexed optical signals S01 to S03 are incident from the optical fiber 57-1 and wavelength-multiplexed optical signals S11 to S13 are incident from the optical fiber 57-3. The optical signals S01 and S11 have same wavelengths $\lambda 1$, optical signals S02 and S12 have same wavelengths $\lambda 2$, and the optical signals S03 and S13 have same wavelengths $\lambda 3$.

In FIGS. 29 and 30, due to the polarization-control wavelength-selector switch 70, the optical signals S02 and S12 of wavelength $\lambda 2$ are transmitted from the optical fibers 57-1 and 57-3 to the optical fibers 57-4 and 57-2 respectively. The optical signals S01 and S11 of wavelength $\lambda 1$ are transmitted from the optical fibers 57-1 and 57-3 to the optical fibers 57-2 and 57-4 respectively upon changing an output path. The optical signals S03 and S13 of wavelengths $\lambda 3$ are transmitted from the optical fibers 57-1 and 57-3 to the optical fibers 57-2 and 57-4 upon changing an output path.

Figure 31:
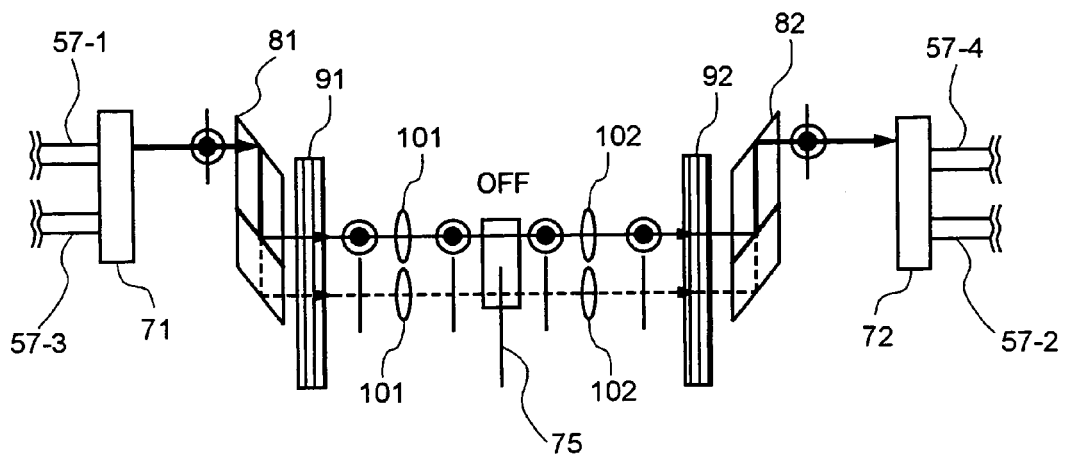
FIG. 31 is an illustration of an operation of the polarization-control wavelength-selector switch according to the eighth embodiment.

Due to such structure, in the polarization-control wavelength-selector switch 70, as shown in FIG. 31, among wavelength components of wavelength-multiplexed optical signals from the optical fiber 57-1, for the wavelength component that is output from the optical fiber 57-4 without changing the output path, the polarization control element 75-1 is controlled such that the angle of polarization is not turned.

When the output path is not changed by the wavelength selector switch 70, for example the optical signals S02 and S12 in FIG. 30 are input by the optical fibers 57-1 and 57-3 respectively to the wavelength selector switch 70, and output to the optical fibers 57-4 and 57-2 respectively. At this time, a corresponding polarization control element 75*i* is OFF, i.e. the corresponding polarization control element 75*i* is in the mode in which the polarization is not changed (see FIG. 31).

In other words, in the polarization control elements array 75, by putting the polarization control element 75*i* that corresponds to the optical signal of wavelength $\lambda 2$ OFF, the optical signal S02 is input from the optical fiber 57-1 via the port 71-1 and is output from the optical fiber 57-4 via the port 72-4. At the same time, the optical signal S12 is input from the optical fiber 57-3 via the port 71-3 and is output to the optical fiber 57-2 via the port 72-2.

Among the wavelength components that form the wavelength-multiplexed beam which is input from the optical fiber 57-1, for the wavelength component for which an optical signal is output upon changing an output path, the corresponding polarization control element 75-1 is controlled such that the angle of polarization is turned through 90°.

Figure 32:
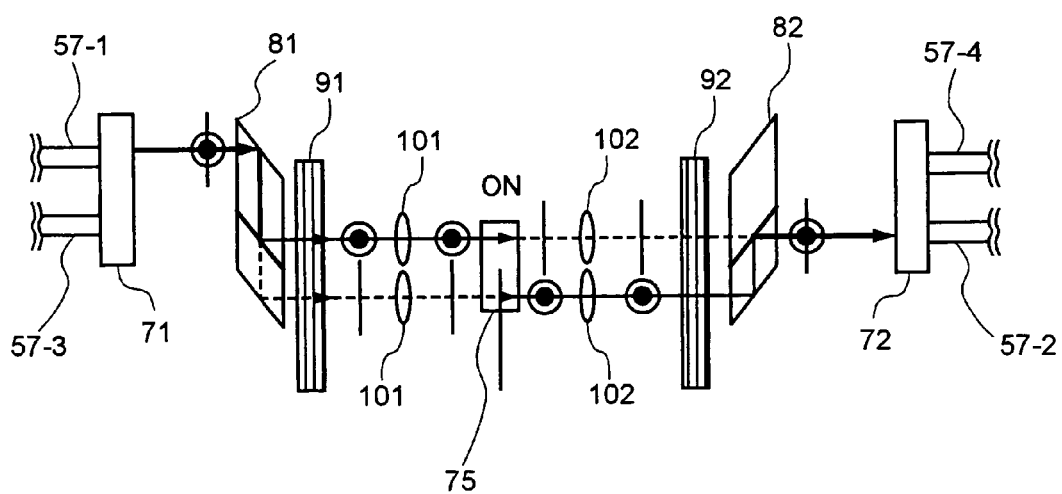
FIG. 32 is an illustration of an operation of the polarization-control wavelength-selector switch according to the eighth embodiment.

When the output path is switched by the wavelength selector switch 70, for example the signals S01 and S11 in FIG. 30 are input by the optical fibers 57-1 and 57-3 respectively to the wavelength selector switch 70 and output to the optical fibers 57-2 and 57-4 respectively. At the same time, the corresponding polarization control element 75-1 is ON, i.e. the corresponding polarization control element 75-1 is in the mode in which the polarization is changed (see FIG. 32).

In other words, in the polarization control elements array 75, by putting the polarization control element 75-1 that corresponds to the optical signal of wavelength $\lambda 1$ ON, the optical signal S01 is input from the optical fiber 57-1 via the port 71-1 and is output to the optical fiber 57-2 via the port 72-2. At the same, the optical signal S11 is input from the optical fiber 57-3 via the port 71-3 and is output to the optical fiber 57-4 via the port 72-4.

Thus, the polarization-control wavelength-selector switch 70 according to the eighth embodiment realizes the all-optical cross-connect.

Due to this, according to the change in the angle of polarization of the wavelength-split optical signal by each polarization control element 75-1 in the polarization control elements array 75, the output ports 72-2 and 72-4 for each wavelength component of the input side wavelength-multiplexed optical signal from the input ports 71-1 and 73-3 are changed and the output side wavelength-multiplexed optical signal for which the wavelength component of the input side wavelength-multiplexed optical signal is changed, can be output. Thus, a wavelength selector switch that is independent of the polarization and enables all-optical cross-connect which does not depend on the polarization of the incident beam can be realized.

Thus, the polarization-control wavelength-selector switch 70 according to the eighth embodiment of the present invention includes the polarization splitting/wavelength splitting members 71 to 101, the polarization coupling/wavelength multiplexing members 72 to 102, and the polarization control elements array 75. According to the change in the angle of polarization of each wavelength-split optical signal from each polarization control element 75-1 in the polarization control elements array 75, the output ports 72-2 and 72-4 for each wavelength component of the input side wavelength-multiplexed optical signal from the input ports 71-1 and 71-3 are changed and the output side wavelength-multiplexed optical signal for which the wavelength component of the input side wavelength-multiplexed optical signal is changed, can be output respectively. Therefore, similarly as in the sixth embodiment, as compared to the wavelength selector switch that uses the MEMS mirror, a high speed operation can be achieved with a simple structure and a simple control. Moreover, the electric power required to operate the switch can be reduced to a great extent and the all-optical cross-connect can be achieved.

Regardless of the embodiments mentioned here, the wavelength selector switch within a scope of modifications and alternative constructions that are not deviated from the basic idea of the present invention can be used.

For example, in the sixth, seventh, and the eighth embodiment, a fiber collimator is used as the first collimator or as the second collimator. However, the present invention is not restricted to the fiber collimator and collimating lens can also be used instead of the fiber collimator.

Figure 33:
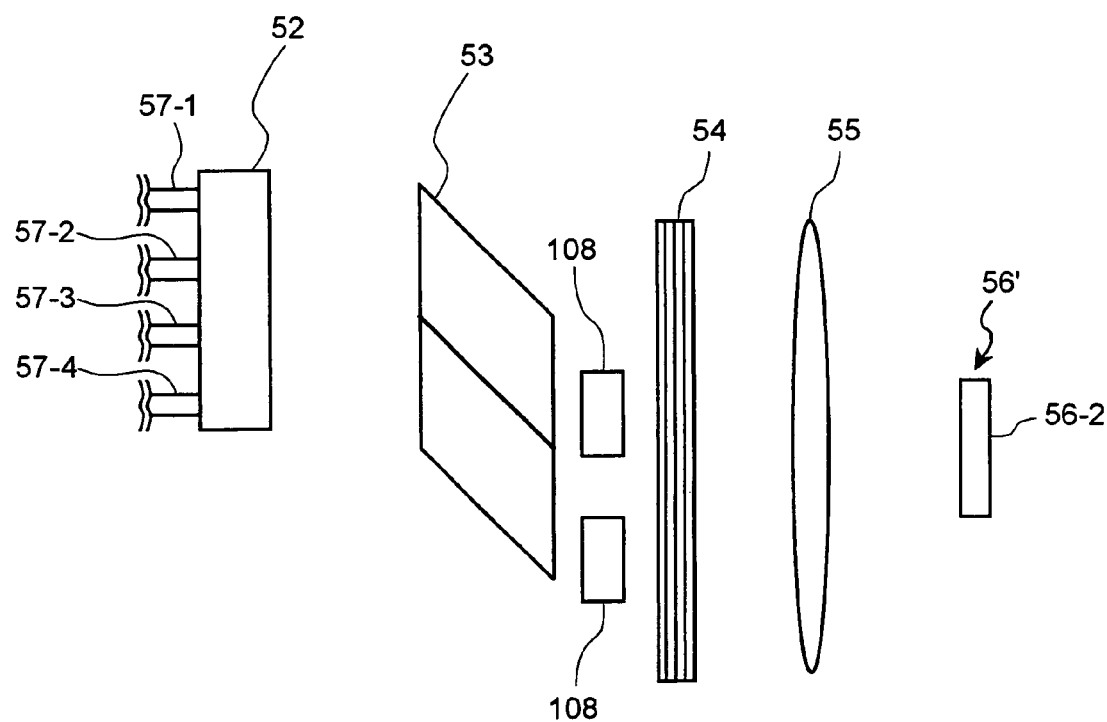
FIG. 33 is an example of a modified polarization-control wavelength-selector switch according to the present invention.
Figure 34:
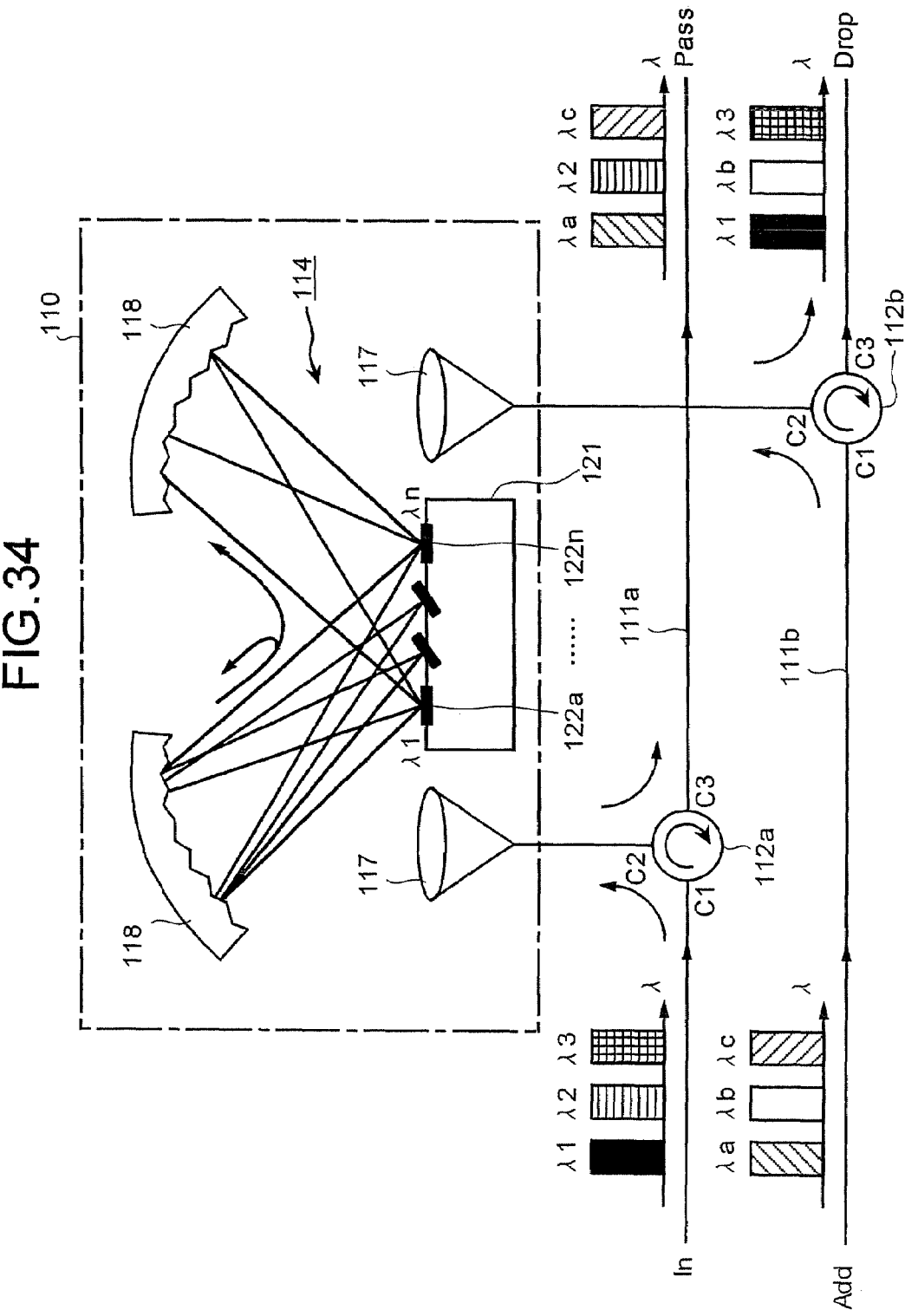
FIG. 34 is a schematic diagram of the wavelength selector switch.
Figure 35:
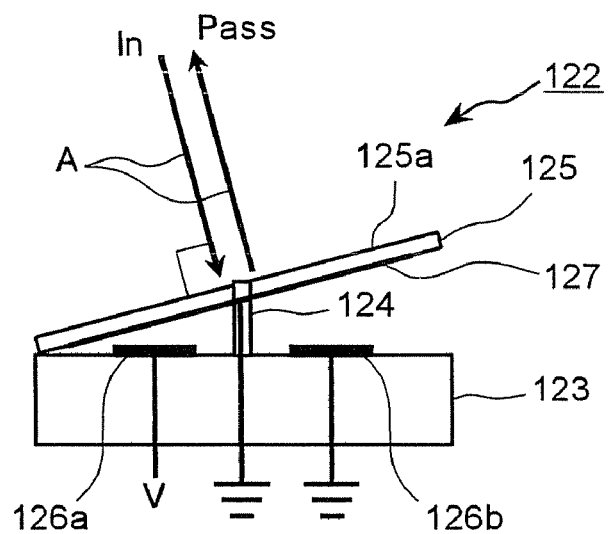
FIG. 35 is a side view of a structure of a micro mirror in a micro mirror array.
Figure 36:
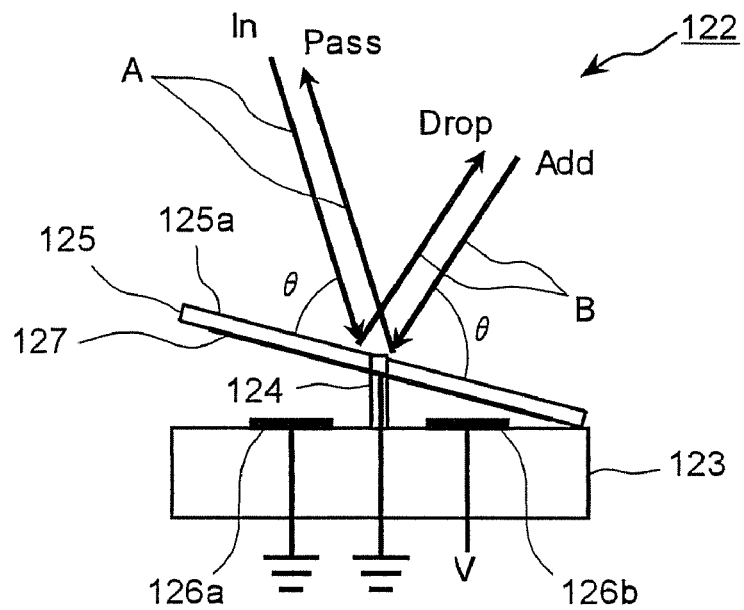
FIG. 36 is an illustration of an operation of the micro mirror.

In the sixth or the seventh embodiment, a variable Faraday rotator that can turn the angle of polarization from 0° to 45° (from 0° to 90° both ways) is used as the polarization control element in the reflection-type polarization control elements arrays 56 and 66. However, the present invention is not restricted to the variable Faraday rotator only. For example, as shown in FIG. 33, instead of the polarization control elements array 56 in the polarization-control wavelength-selector switch 50 according to the sixth embodiment, a polarization control elements array 56' in which the variable Faraday rotators that can turn the angle of polarization from −22.50 to 22.50 (−45° to 45° both ways) are disposed in the form of an array, can be used. Moreover, the angle of polarization may be changed for switching the wavelength by installing a λ/2 wavelength plate 108 in a position where an optical signal reflected from the polarization control element between the polarization beam splitter 53 and the diffraction grating 54 passes and with the combined effect of the polarization control elements array 56' and the λ/2 wavelength plate.

In other words, among the wavelength components which form the wavelength-multiplexed optical signal, for a wavelength component for which the output path is not changed, the angle of polarization in the variable Faraday rotator 56-2 is set to −22.50. By setting the angle to −22.50, when an optical signal passes through the variable Faraday rotator 56-2, a reflecting part, and the variable Faraday rotator 56-2, the polarization plane at an input and an output of the variable Faraday rotator is turned through −45°. Due to this, by passing (the optical signal) through the λ/2 wavelength plate 108, the polarization of each polarization-split component that is reflected to the polarization beam splitter 53 is maintained as it is, adjusting with the turn (45°) in the angle of polarization.

Further, among the wavelength components which form the wavelength-multiplexed optical signal, for a wavelength component for which the output path is not changed, the angle of polarization in the variable Faraday rotator 56-2 is set to 22.50. By setting the angle to −22.50, when the optical signal passes through the variable Faraday rotator 56-2, a reflecting part, and the variable Faraday rotator 56-2, the polarization plane at the input and the output of the variable Faraday rotator is turned through 45°. Due to this, by passing (the optical signal) through the λ/2 wavelength plate 108, the polarization of each polarization split component that is reflected to the polarization beam splitter 53 is turned through 90°, adjusting with the turn (45°) in the angle of polarization.

Apart from this, a variable Faraday rotator that has the polarization angle from −22.50 to 22.50 (−45°to 45° both ways) can be. combined instead of the variable Faraday rotator 56-2 and a fixed Faraday rotator of polarization angle 22.50 installed in the position of the λ/2 wavelength plate 108 shown in FIG. 33.

Moreover, in the eighth embodiment, a variable Faraday rotator that can turn the angle of polarization from 0° to 90° is used as the polarization control element 75-1 in the polarization control elements array 75. However, the present invention is not restricted to the polarization control element 75-1 that includes the variable Faraday rotator. The polarization control element 75-1 can be replaced by a variable Faraday rotator of the angle of polarization from −45° to 45° and the λ/2 wavelength plate (or a fixed Faraday rotator of 45°)can be installed between the polarization beam splitter 81 and the diffraction grating 91 or between the diffraction grating 92 and the polarization beam splitter 82. The angle of polarization can be controlled between 0° to 90° by combined effect of the variable Faraday rotator of the angle of polarization from −45° to 45° and the λ/2 wavelength plate.

In the sixth, seventh, and the eighth embodiments, a diffraction. grating is used as a wavelength-splitting element and a wavelength-coupling element. However, the present invention is not restricted to the use of the diffraction grating only and a virtually imaged phased array can be used instead of the diffraction grating.

Moreover, in the sixth, seventh, and the eighth embodiments, lens that is used as the first lens or the second lens can be formed by a plurality of lenses or a single lens.

According to the present invention, a light beam that is wavelength multiplexed is input to an optical input port and then dispersed by a wavelength dispersing element. Further, a polarization angle of optical components according to different wavelengths is changed by a polarization control device. After a repeated combining, the light beam is output to different ports according the polarization angle of the light beam. As a result, light beams of the desired components of wavelengths can be output after switching to other ports. Moreover, light beams that are input from a plurality of optical input ports can be output to a plurality of optical output ports after switching. according wavelengths. Therefore, it is possible to have an all-optical cross-connect.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A wavelength selector switch comprising:
   a first optical input port to which a first wavelength-multiplexed light beam with a first polarization angle is input;
   a second optical input port to which a second wavelength-multiplexed light beam with a second polarization angle is input;
   a first optical output port;
   a second optical output port;
   a first refracting plate that refracts the second wavelength-multiplexed light beam at a refraction angle;
   an optical splitter that spatially splits into a plurality of wavelength components the first wavelength-multiplexed light beam and the second wavelength-multiplexed light beam refracted, respectively;
   a first optical system that changes the wavelength components into parallel light beams;
   a polarization controller that selectively changes a polarization angle of each of the parallel light beams between the first and second polarization angles, and passes the parallel light beams;
   a second optical system that condenses the parallel light beams which are passed through the polarization controller;
   an optical coupler that multiplexes into a third wavelength-multiplexed light beam the parallel light beams condensed; and
   a second refracting plate that refracts wavelength components, of the third wavelength-multiplexed light beam, having the second polarization angle at a refraction angle to direct the wavelength components having the second polarization angle to the second optical output port and to direct wavelength components, of the third wavelength-multiplexed light beam, having the first polarization angle to the first output port.

2. The wavelength selector switch according to claim 1, wherein the polarization controller is a magneto-optic element array.

3. The wavelength selector switch according to claim 1, wherein the polarization controller is a liquid crystal unit.

4. The wavelength selector switch according to claim 1, wherein each of the optical splitter and the optical coupler is a diffraction grating.

5. The wavelength selector switch according to claim 1, wherein each of the optical splitter and the optical coupler is a virtually imaged phase array.

6. The wavelength selector switch according to claim 1, wherein each of the first and second refracting plates is a polarization beam splitter.

* * * * *

UNITED STATES PATENT AND TRADEMARK OFFICE
CERTIFICATE OF CORRECTION

PATENT NO. : 7,092,594 B2
APPLICATION NO. : 10/811978
DATED : August 15, 2006
INVENTOR(S) : Tsuyoshi Yamamoto et al.

It is certified that error appears in the above-identified patent and that said Letters Patent is hereby corrected as shown below:

Title Page Column 2 item 56 (Other Publications), Line 3, change "Electronics." to --Electronics,--.

Title Page Column 2 item 56 (Other Publications), Line 6, change "Mechnical" to --Mechanical--.

Column 45, Line 5, after "first" (second occurrence) insert --optical--.

Signed and Sealed this

Sixth Day of March, 2007

JON W. DUDAS
*Director of the United States Patent and Trademark Office*